(12) United States Patent
Rubenstein et al.

(10) Patent No.: US 11,093,865 B2
(45) Date of Patent: Aug. 17, 2021

(54) METHODS OF CHEMICAL COMPUTATION

(71) Applicant: BROWN UNIVERSITY, Providence, RI (US)

(72) Inventors: Brenda Rubenstein, Providence, RI (US); Jacob Karl Rosenstein, Providence, RI (US); Christopher Arcadia, Providence, RI (US); Shui Ling Chen, Harrisburg, PA (US); Amanda Doris Dombroski, Cranston, RI (US); Joseph D. Geiser, Barrington, RI (US); Eamonn Kennedy, West Warwick, RI (US); Eunsuk Kim, Providence, RI (US); Kady M. Oakley, North Attleboro, MA (US); Sherief Reda, Barrington, RI (US); Christopher Rose, Providence, RI (US); Jason Kelby Sello, Tiverton, RI (US); Hokchhay Tann, Providence, RI (US); Peter Weber, Barrington, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 17/253,013

(22) PCT Filed: Jun. 20, 2019

(86) PCT No.: PCT/US2019/038301
§ 371 (c)(1),
(2) Date: Dec. 16, 2020

(87) PCT Pub. No.: WO2019/246434
PCT Pub. Date: Dec. 26, 2019

(65) Prior Publication Data
US 2021/0166159 A1    Jun. 3, 2021

Related U.S. Application Data

(60) Provisional application No. 62/791,504, filed on Jan. 11, 2019, provisional application No. 62/687,366, filed on Jun. 20, 2018.

(51) Int. Cl.
*G06N 99/00* (2019.01)

(52) U.S. Cl.
CPC ................ *G06N 99/007* (2013.01)

(58) Field of Classification Search
CPC .................................. G06N 99/0007
See application file for complete search history.

(56) References Cited

U.S. PATENT DOCUMENTS

| 9,582,771 | B2 * | 2/2017 | Perez-Mercader .... G06N 3/002 |
|---|---|---|---|
| 2006/0191319 | A1 | 8/2006 | Kurup |
| 2014/0200716 | A1 | 7/2014 | Perez-Mercader et al. |

FOREIGN PATENT DOCUMENTS

| WO | 1997007440 A1 | 2/1997 |
|---|---|---|
| WO | 2007128804 A2 | 11/2007 |

OTHER PUBLICATIONS

Blount, Drew, et al. "Feedforward chemical neural network: An in silico chemical system that learns xor." Artificial life 23.3 (2017): 295-317. (Year: 2017).*

(Continued)

*Primary Examiner* — Benjamin P Geib
(74) *Attorney, Agent, or Firm* — Adler Pollock & Sheehan P.C.

(57) ABSTRACT

The invention provides methods for computing with chemicals by encoding digital data into a plurality of chemicals to obtain a dataset; translating the dataset into a chemical form; reading the data set; querying the dataset by performing an operation to obtain a perceptron; and analyzing the perceptron for identifying chemical structure and/or concentration (Continued)

of at least one of the chemicals, thereby developing a chemical computational language. The invention demonstrates a workflow for representing abstract data in synthetic metabolomes. Also presented are several demonstrations of kilobyte-scale image data sets stored in synthetic metabolomes, recovered at >99% accuracy.

23 Claims, 32 Drawing Sheets

(56) References Cited

OTHER PUBLICATIONS

International Search Report and Written Opinion of PCT/US2019/038301 dated Nov. 27, 2019 (10 pgs.).
Banda, P. et al. "Online learning in a chemical perception" Artificial Life 19.2 (2013): 195-219.
Hjelmfelt A. et al., "Chemical implementation of neural networks and Turing machines" Proc Natl Acad Sci U S A. 1991;88(24):10983-10987.
Rose, C. et al. "Computing with chemicals: Perceptions using mixtures of small molecules" in 2018 IEEE International Symposium on Information Theory (ISIT) Jun. 17, 2018 (Jun. 17, 2018) (pp. 2236-2240).

* cited by examiner

1. Map Data to Ugi Molecules

*add 2D parity check bits for error correction*

Ugi reaction available R-groups

| R1 (Carboxylic Acid) | R2 (Amine) | R3 (Aldehyde) | R4 (Isocyanide) |
|---|---|---|---|
| $C_4H_7$ | $C_8H_9O$ | $C_3H_7$ | $C_3H_5O_2$ |
| $C_{11}H_{15}O_3$ | $C_5H_{11}$ | $C_5H_4N$ | $C_4H_9$ |
| $C_7H_7$ | $C_{10}H_{17}$ | $C_8H_9$ | $C_6H_4F$ |

*Each pixel maps to one of $3^4=81$ possible molecules.*

2. Synthesize Bits

For example, #23 may be the Ugi molecule having:

R1 = $C_4H_7$
R2 = $C_{10}H_{17}$
R3 = $C_5H_4N$
R4 = $C_4H_9$

3. Analyze Mixture

4. Decoding and Error Correction

*Identify which of the 81 molecules are present. Example errors highlighted.*

*Parity check and correct errors*

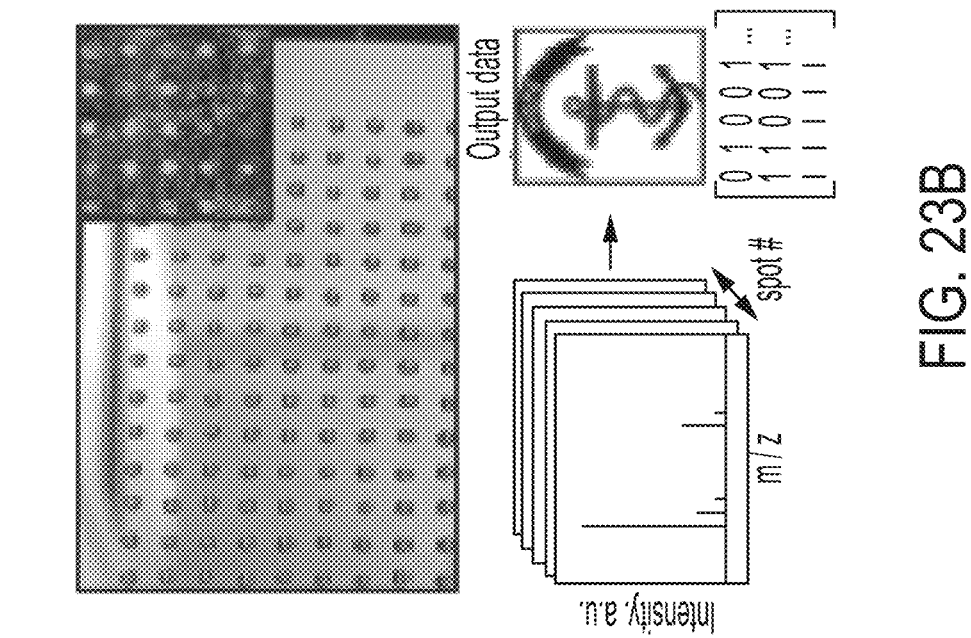
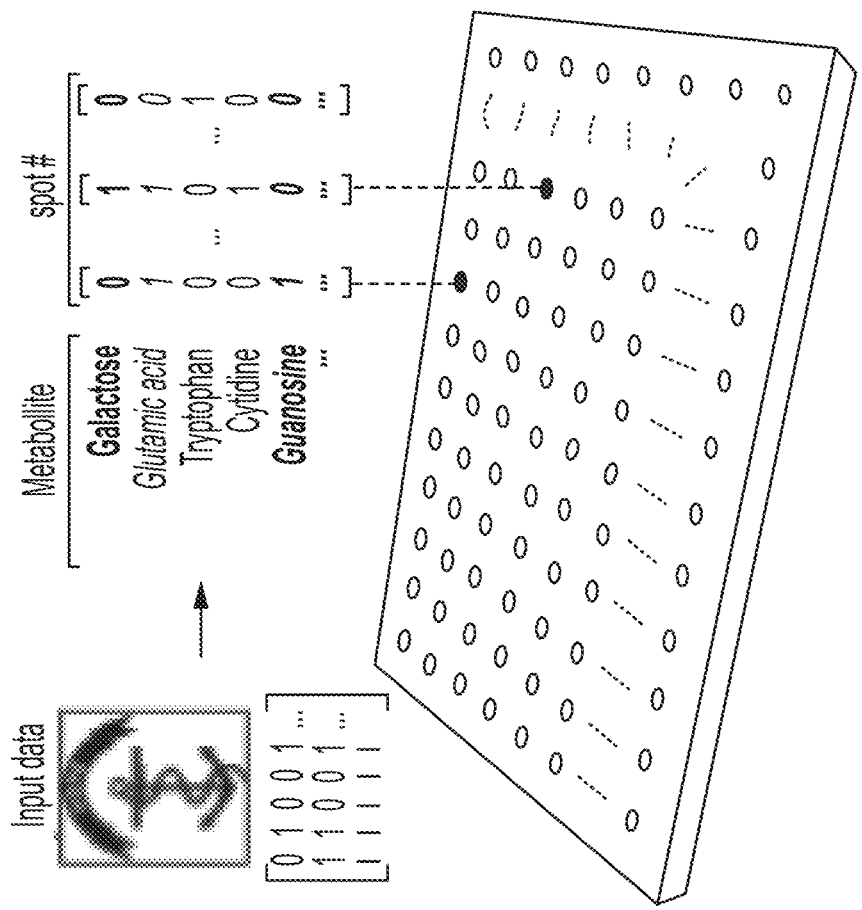
FIG. 23B
FIG. 23A

METHODS OF CHEMICAL COMPUTATION

REFERENCE TO RELATED APPLICATIONS

This application is a national phase filing under 35 U.S.C. § 371 of International Application No. PCT/US2019/038301 filed Jun. 20, 2019, which claims the benefit of priority to patent applications U.S. Ser. No. 62/687,366, filed Jun. 20, 2018, and U.S. Ser. No. 62/791,504 filed Jan. 11, 2019, the entire contents of which are hereby incorporated by reference herein.

STATEMENT REGARDING FEDERALLY SPONSORED RESEARCH OR DEVELOPMENT

This invention was made with government support under grant number W911NF-18-2-0031 awarded by the U.S. Army Research Office. The government has certain rights in the invention.

FIELD OF THE INVENTION

This invention generally relates to chemoinformatics, i.e., data processing methods or systems for the retrieval, analysis, visualization, or storage of data, and specifically storage of data within molecules or chemicals.

BACKGROUND OF THE INVENTION

Biology provides a robust model for molecular memory. RNA and DNA molecules are information-dense, stable over long periods of time, and energy efficient. Reading information from RNA or DNA is cumbersome using stochastic methods, for example by polymerase chain reaction (PCR) and shotgun sequencing, or by using sequential methods, for example, nanopores.

Biomolecular information systems offer many potential advantages over conventional semiconductor technologies. Researchers have used DNA for long-term archival information storage. See, U.S. Pat. No. 9,384,320 (Church); Church, Gao & Kosuri, Science 337(6102), 1628 (September 2012); De Silva & Ganegoda, Biomed. Res. Int. 8072463 (2016). One advantage of molecular storage over silicon-based devices is density; DNA achieves about 214 petabytes per gram. Erlich & Zielinski, Science 355, 950-954 (2017).

The metabolome is an information-rich molecular system with diverse chemical dimensions that could be harnessed for information storage and manipulation. The metabolome has an amplified and dynamic relationship to the genome, the transcriptome, the proteome, and the environment. Kell & Oliver, Metabolomics 12(9), 148 (Sep. 2, 2016). This relationship makes the metabolome an information-rich system, with diverse chemical, structural and biological dimensions, and properties. The molecular computing art is formalizing methods for mitigating errors arising from metabolic chemical and structural diversity. Gowda & Djukovic, Methods Mol. Biol. 1198, 3{12 (2014); Matsuda, Mass Spectrom. (Tokyo) 5(2), S0052 (2016).

The molecular computing art has recently made progress in proteomic and metabolic profiling. Cox & Mann, Ann. Rev. Biochem. 80, 273-299 (2011); Nagaraj et al., Molecular Systems Biology 7(1), 548 (2011); Roumpeka et al., Front. Genet. 8, 23 (2017). Thus, it is timely to explore the use of metabolites for more dynamic postgenomic information representations, and whether to make use of the higher dimensions of complexity inherent in metabolism to improve data storage in fundamental ways.

Therefore, there is a need for molecular and chemical information storage with high information density, and parallel speedy memory interrogation.

SUMMARY OF THE INVENTION

The invention provides, in the first embodiment, a method for computing with chemicals, including the steps of encoding an abstract digital data into a plurality of liquid volumes of a plurality of chemicals to obtain a dataset; translating the dataset into a chemical form; reading the data set using spectrometry, spectroscopy, or both analytical methods; querying the dataset by performing a volumetric operation to obtain a perceptron; and analyzing the perceptron for identifying chemical structure, concentration, or both characteristics, of at least one of the chemicals, thereby developing a chemical computational language.

In the second embodiment, the abstract digital data includes a binary computer language. The computer language is selected from the group consisting of programming language, command language, general-purpose language, machine language, markup language, style sheet language, configuration language, construction language, query language, modeling language and simulation language. In the third embodiment, the translating step further includes assembling a library of chemicals in the dataset.

In the fourth embodiment, the volumetric operation is performed robotically. In the fifth embodiment, the volumetric operation further includes a programmed standard volumetric transfer. In the sixth embodiment, the plurality of liquid volumes of the plurality of chemicals is a mixture of different chemical molecules. In the seventh embodiment, the abstract digital data corresponds to the presence or the absence of chemical molecules in the mixture.

In the eighth embodiment, the spectrometry is mass spectrometry. In the ninth embodiment, the type of spectroscopy is selected from ultraviolet-visible spectroscopy, Rydberg spectroscopy, infrared spectroscopy, fluorescence spectroscopy, and absorption spectroscopy.

The invention also provides, in the tenth embodiment, a method for molecular computing using a chemical perceptron, including the steps of preparing a plurality of distinct mixtures of molecules to obtain a chemical data set, such that the mixtures of molecules are an input unit of the perceptron; writing the data set on an array; applying an operation to the data set for transduction of the input unit; combining the input unit by an operation to obtain an operation product; and detecting a threshold of the operation product, thereby obtaining a product of the chemical perceptron.

In the eleventh embodiment, the array is a micro-well plate or a Matrix-Assisted Laser Desorption/Ionization (MALDI) plate. The array is located in or is arrayed in a micro-well plate or a MALDI plate. In the twelfth embodiment, the method further includes the step of applying a chemical multiply accumulate (MAC) operation to obtain the mathematical equivalent of the perceptron. In the thirteenth embodiment, the chemical multiply accumulate operation is $z = L_i w_i \cdot x_i + b$, such that z is the output of the multiply accumulate operation, $w_i$ is the weight of a species, $X_i$ is the initial amount of the species, and b is the bias.

The invention further provides, in the fourteenth embodiment, a chemical perceptron including a plurality of analytes; an array spectrum; a fluid handling robot; a computer; and a molecule quantifier or a molecule identifier.

In the fifteenth embodiment, the molecule quantifier or molecule identifier is a high performance liquid chromatography (HPLC) machine, a mass spectrometer, or both assay machines. In the sixteenth embodiment, the array spectrum is at least one selected from a micro-well plate or a MALDI plate.

The invention provides, in a seventeenth embodiment, a method for obtaining an output of a linear classification operation, including the steps of encoding binary data into a chemical composition of a plurality of liquid samples; receiving an input of binary data; performing multiplication operation by a plurality of fractional volume transfers of the liquid samples into a plurality of micro-wells corresponding to the input and pooling the liquid samples to obtain an output; and analyzing the concentration of the chemicals in the output by HPLC, thereby obtaining the output for the linear classification operation.

In the eighteenth embodiment, the method further including scaling a classifier weight corresponding to maximum available volume in each of the micro-wells. In the nineteenth embodiment, the classifier weight corresponds to amount of the plurality of fractional volume transfers of the liquid samples.

In the twentieth embodiment, the method further includes performing the plurality of fractional volume transfers by a robot (i.e., a robot performs the transfers). In the twenty-first embodiment, the liquid samples are nonreactive. In the twenty-second embodiment, the liquid samples are reactive. In the twenty-third embodiment, the method further includes performing parallel computing to obtain the output for the linear classification operation.

The invention provides, in the twenty-fourth embodiment, a method for coding information with a mixture of product molecules, including the steps of mapping of a plurality of each pixels on an array corresponding to a plurality of known organic chemical entity molecules each in a known location within the array to obtain a pixel map; reacting a selected subset of the molecules corresponding to the pixel map thereby synthesizing the mixture of product molecules; and analyzing the mixture of product molecules to identify the product molecules.

In the twenty-fifth embodiment, reacting further includes performing an Ugi reaction to obtain an Ugi product molecule or a first Ugi molecules, or at least one product molecule. In the twenty-sixth embodiment, the method further includes creating a new Ugi product molecule or a second product molecule. In the twenty-seventh embodiment, the plurality of known organic chemical entity molecules includes a chemical scaffold.

In the twenty-eighth embodiment, the plurality of known organic chemical entity molecules include reaction groups. In the twenty-ninth embodiment, the groups are selected from carboxylic acid, ester, acid chloride, amide, nitrile, aldehyde, ketone, alcohol, thiol, amine, alkene, alkyne, alkane, ether, alkyl halide, and nitro. In the twenty-ninth embodiment, reacting further includes substituting the reaction groups. In the thirtieth, the reacting step further includes changing pH of at least one of the plurality of known organic chemical entity molecules.

The invention provides, in the thirty-first embodiment, a method for computing with chemicals, including the steps of encoding digital data into a plurality of chemicals to obtain a dataset and translating the dataset into a chemical form; reading the data set using spectrometry, spectroscopy, or both assay methods; querying the dataset by performing an operation to obtain a perceptron; and analyzing the perceptron for identifying the chemical structure, concentration, or both characteristics of at least one of the chemicals, thereby developing a chemical computational language.

In the thirty-second embodiment, the operation further includes at least one of a volumetric transfer or a chemical reaction. In the thirty-third embodiment, the operation further includes measuring a rate constant, an equilibrium constant of the chemical reaction, or both characteristics. In the thirty-fourth embodiment, the chemical reaction further includes an Ugi reaction to obtain at least one Ugi product molecule.

In the thirty-fifth embodiment, the method further includes synthesizing a new chemical entity. In the thirty-sixth embodiment, digital data includes a computer language. In the thirty-seventh embodiment, the plurality of chemicals further includes a plurality of liquid volumes. In the thirty-eighth embodiment, the plurality of chemicals are a mixture of different chemical molecules.

In the thirty-ninth embodiment, the digital data includes presence or absence of chemical molecules in the mixture. In the fortieth embodiment, spectrometry includes mass spectrometry. In the forty-first embodiment, the spectroscopy method is selected from ultraviolet-visible spectroscopy, Rydberg spectroscopy, Infrared spectroscopy, fluorescence spectroscopy, and absorption spectroscopy. In the forty-second embodiment, the plurality of chemicals include reaction groups.

In the forty-third embodiment, reacting further includes substituting the reaction groups. In certain embodiments of the method, reacting further includes changing a pH of at least one of the plurality of chemicals.

The invention provides, in a forty-fourth embodiment, for the purposeful encoding of information in a metabolome or another mixture of chemicals. The invention provides an implementation using encoded synthetic metabolome. The invention thus provides post-genomic data storage and demonstrates a workflow for representing abstract data in metabolomes, synthetic metabolomes, and molecular mixtures. The invention can use robotic liquid handling for producing chemical data mixtures and mass spectrometry for inherently parallel data readout. Also presented are several demonstrations of kilobyte-scale image data sets stored in synthetic metabolomes, recovered at >99% accuracy.

In the forty-fifth embodiment, embodiment, the invention provides an information storage system, comprising a solid surface with a plurality of addressable locations, wherein each addressable location comprises a mixture of small molecules, and each mixture contains one set of small molecules per addressable location. In the forty-sixth embodiment, the small molecules are metabolomic elements. Each of the mixtures of small molecules may be selected from a synthetic metabolome. In the forty-seventh embodiment, the solid surface is a MALDI plate.

In the forty-eighth embodiment, the addressable locations comprise at least 1024 independent mixture spots. The inventors have written more than 100 kbits of image data into synthetic metabolomes; this number is conservative and can be expanded. In the forty-ninth embodiment, the addressable locations comprise thousands of spatially arrayed nanoliter spots. In the fiftieth embodiment, the storage system comprises more than 100 kbits of data. In the fifty-first embodiment, the storage system comprises a gigabyte of data. Diversified small-molecule approaches have intrinsic capacities for gigabyte-scale data storage. The invention thus provides increased storage density. Increased diversity of chemical information systems has applications where sensitive information should be physically encoded, transported, and easily overwritten in small, zero-power devices.

In the fifty-second embodiment, the invention provides a method of storing information in a plurality of metabolomic elements. The steps of the method are (a) converting a format of information into a plurality of digital sequences; (b) converting the plurality of digital sequences into a plurality of corresponding metabolomic elements using one bit per metabolomic element, and (c) storing the plurality of corresponding metabolomic elements on a solid surface, where the location of a metabolomic element is an addressable location. In the fifty-third embodiment, The converting the plurality of digital sequences into a plurality of corresponding metabolomic elements Is performed using robotic liquid handling.

In the fifty-fourth embodiment, the invention provides a method of retrieving a format of information from a plurality of metabolomic elements encoding digital sequences of the format of information. The steps of the method are (a) assaying a solid surface comprising a set of metabolomic elements, where the location of a metabolomic element is an addressable location; (b) converting the metabolomic elements to digital sequences; and (c) converting the digital sequences to a format of information. Molecular information can be 'read' using a variety of analysis techniques including mass spectrometry, sequencing, chromatography, or spectroscopy, as shown in FIG. 18. In the fifty-fifth embodiment, the assay method is mass-spectroscopy. In the fifty-sixth embodiment, the mass-spectroscopy is MALDI mass spectroscopy.

In the fifty-seventh embodiment, retrieving a format of information from a plurality of metabolomic elements results in an information recovery at >99% accuracy. The inventors have demonstrated kilobyte-scale image data sets stored in synthetic metabolomes, recovered at >99% accuracy.

In the fifty-eighth embodiment, the method has a further step of visualizing the format of information.

In the fifty-ninth embodiment, the method has a further step of mitigating errors in the converting of the metabolomic elements to digital sequences. In a sixteenth embodiment, mitigating the errors includes a logistic regression analysis.

In the sixty-first embodiment, converting the digital sequences to a format of information is performed using one m/z peak selected per metabolomic element. In the sixty-second embodiment, converting the digital sequences to a format of information is performed using multiple m/z peaks selected per metabolomic element.

In the sixty-third embodiment, the invention provides a chemical perceptron, comprising the mathematical framework described herein for quantifying chemical memory. In a sixtieth embodiment, the chemical perceptron has autocatalytic thresholding.

In one aspect, the invention provides a path to quantifying the information capacity available from the exponentially larger non-genomic chemical space.

In another aspect, the invention provides a general mathematical framework for quantifying chemical memory, which extends to mixtures of molecules of all types. The theoretical limit for molecular information storage is two orders of magnitude denser by mass than DNA memory storage.

In yet another aspect, the invention provides a general theory of information storage in molecules and in mixtures of molecules. This theory provides a unified description of mixtures of molecules, e.g., small molecules.

As a proof-of-principle of chemical data storage, the inventors chemically encoded several MNIST images of handwritten digits and demonstrate successful chemical-domain classification of the digits using volumetric perceptrons. LeCun et al., "Gradient-based learning applied to document recognition." Proc. of the IEEE, 86(11), 2278-2324 (1998). The inventors quantified the performance of the method with a larger dataset of binary vectors and compare the experimental measurements against predicted results.

As a proof-of-principle of postgenomic data storage, the inventors encoded abstract binary data into the chemical composition of thousands of spatially arrayed nanoliter volumes. See, EXAMPLE 6 and FIG. 23. Each volume ('spot') contains a prescribed mixture of metabolites from a synthetic metabolome library. The presence or absence of each library element in a spot encodes one bit of information. Therefore, the total number of bits stored by one spot is equal to the number of library elements. See, Arcadia, et al., "Parallelized linear classification with volumetric chemical perceptrons," in, Proceedings of the IEEE Conference on Rebooting Computing (ICRC) (2018) [EXAMPLE 2]. The inventors recover the encoded data from metabolic mixtures using mass spectrometry. See, FIG. 23. Cf. Duncan et al., "Applications of MALDI Mass Spectrometry in Clinical Chemistry," Clinical Chemistry 62(1), 134-143 (Nov. 19, 2015); Spraggins et al., "Next-generation technologies for spatial proteomics: Integrating ultra-high speed MALDI-TOF and high mass resolution MALDI FTICR imaging mass spectrometry for protein analysis" Proteomics 6(11-12), 1678-89 (2016). Strategies for optimizing data recovery are presented, along with several examples of chemically encoded digital images. Raw error rates <1% are achieved with kilobyte-scale data sets, demonstrating the viability of both writing and reading metabolomic information.

BRIEF DESCRIPTION OF THE DRAWINGS

FIG. 3(a) shows the application of reagent 001010 with input 001010. FIG. 3(b) shows the application of reagent 101000 with input 001010. FIG. 3(c) shows the application of reagent 101000 with input 001010.

FIG. 23 is a set of images showing the apparatus and methods for writing and reading data encoded in mixtures of metabolites. Image (a) shows that binary data from the flag of the State of Rhode Island and Providence Plantations is mapped onto a set of metabolite mixtures, with each bit determining the presence/absence of one compound in one mixture. For example, a spot mapped to four bits with values [0 1 0 1] may contain the $2^{nd}$ and $4^{th}$ metabolite at that location. Image (b) shows small volumes of the mixtures that have been spotted onto a MALDI steel plate, and with the solvent evaporated. This chemical dataset is analyzed by MALDI mass spectrometry. See, the bottom of the image of FIG. 23(b). Using the observed mass spectrum peaks, one can make decisions about which metabolites are present. These decisions are then assembled from the array of spots to recover the original flag.

DETAILED DESCRIPTION OF THE INVENTION

Industrial Applicability

Figure 1:
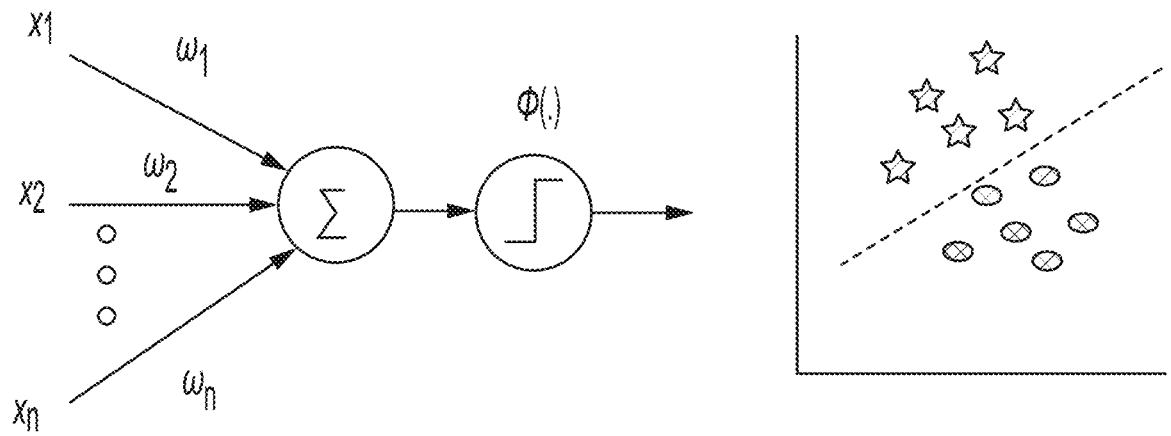
FIG. 1 is a representation showing a perceptron classifier with inputs $x_j$ and weights $w_j$, $j=1, 2, \ldots, J$ and output nonlinearity $\varphi(\ )$. The "perceptron," consists of a single multiply accumulate primitive, followed by a nonlinearity, as shown in this drawing.

An ever-increasing worldwide demand for digital data storage, alongside a looming slowdown of semiconductor technology scaling, has led to growing interest in molecular-scale platforms for information storage and computing. Molecular data systems have the potential to store information at a dramatically higher density than existing electronic media. Some of the first experimental demonstrations of this idea have used DNA, but nucleic acids are only one of the ways to use chemicals to preserve, process, and transmit information.

Chemical computation will be useful in ultra-low-power systems, extreme environments, and as complements to electronic computing systems. Adleman, "Molecular computation of solutions to combinatorial problems," Science, 266(5187), 1021-1024 (1994). Similarly to how DNA archival data storage may complement traditional electronic media and neural-inspired computing has revolutionized how to process large datasets, chemical-domain computations may provide entirely new ways of leveraging the information processing capabilities of the natural world.

Modern information technology is moving towards a more unified vision of computation and memory, and fluid molecular mixtures offer an intriguing space for future generations of computing systems that take advantage of the natural complexity and intrinsic statistics of chemical systems. Arcadia et al., in, Proceedings of the IEEE Conference on Rebooting Computing (ICRC) (2018) [EXAMPLE 2]; Chen et al., Natural Computing, 13(4), 517-534 (2014); Jiang et al., IEEE Design and Test of Computers 21-31 (May/June 2012); Kennedy et al., Applied Physics Letters, 112(26), 264103 (June 2018); Rose et al., "Computing with Chemicals: Perceptrons Using Mixtures of Small Molecules," in 2018 IEEE International Symposium on Information Theory (ISIT) (Vail, Colo., June 2018), pp. 2236-2240, doi: 10.1109/ISIT.2018.8437814 [EXAMPLE 1]; and Soloveichik et al., Proceedings of the National Academy of Sciences, U.S.A., 107(12), 5393-5398 (2010). Quantifying the information capacity of chemical mixtures is an advance in this direction.

A molecule contains enough molecular information to be a secret input to a chemical hash function. Boukis et al., Nature Communications, 9(1), 1439 (2018); Sarkar et al., Nature Communications, 7:11374 (May 2016). Two-dimensional arrays containing single compounds per grid position can encode digital data by photochemical or electrochemical means. Green et al., Nature, 445:414 (January 2007); Malinakova, Reports in Organic Chemistry, pages 75-90 (2015); Thomas et al., Proceedings of the National Academy of Sciences, U.S.A., 106(23), 9147-9150 (June 2009).

DNA sequences have previously been useful for storing abstract digital data. Church, Gao & Kosuri, Science 337 (6102), 1628 (September 2012); Zhirnov et al., Nature Materials, 15:366 (March 2016). DNA can be an information carrier because of the combinatorial complexity that can exist within one molecule. Cartwright et al., Phil. Trans. Roy. Soc. of London A: M., Phys. and Eng. Sci. 374(2064) (2016). Scientists have synthesized complex pools of DNA oligomers representing hundreds of megabytes of text, images, videos, and other media files and retrieved the data using commercial high-throughput sequencing instruments. Blawat et al., Procedia Computer Science, 80:1011-1022 (2016); Erlich & Zielinski, Science, 355(6328), 950-954 (March 2017); Goldman et al., Nature, 494:77, (January 2013); Grass et al., Angewandte Chemie International Edition, 54(8), 2552-2555 (February 2015); Organick et al., Nature Biotechnology, 36:242 (February 2018).

DNA memory studies often offer net bits per nucleotide (nt) as a metric for comparison, but reaching 2 bits/nt is not the final goal. Demonstrations of DNA data storage have exceeded 200 megabytes or 3.2 million unique ≈110-nt sequences. Organick et al., Nature Biotechnology, 36:242 (February 2018). Although this amount stretches today's synthesis capabilities, it represents a tiny fraction of the potential of molecular data storage. This is a mixture with a sparsity (S) of only one out of every 1059 molecules from the library.

The metabolome is diverse and contains many coexisting molecules that can interact and react in complex ways. Sung et al., Nature Communications 8, 15393 (2017). DNA achieves about 214 petabytes/gram, while an encoded metabolome written using a large metabolic library could theoretically improve on this number by up to two orders of magnitude. Erlich & Zielinski, Science 355, 950-954 (2017); Rosenstein et al., Theory of Information Storage in Molecular Mixtures; EXAMPLE 6. The intuition underlying this potential is similar to that which posits that information density can be increased by expanding beyond the four canonical DNA bases. The higher degrees of chemical diversity, afforded by large metabolic libraries, can increase information capacity. While a polymer is processed serially, a metabolome is an inherently parallel system, with many energetic dimensions (each of the independent reactions having their own free energy barriers) of varying coupling. While DNA and proteins are often large molecules which exist in relatively small numbers, metabolites are smaller in mass, higher in number, and more structurally diverse.

By developing a formal theory of the information capacity of mixtures of molecules, the inventors show how information can be represented by any chemical library. For new synthetic molecular information systems, the inventors show that long polymers are neither required nor necessarily desirable to maximize total information capacity. Mixtures of molecules offer far greater potential capacity, even when the constituent molecules are polymers themselves.

In non-genomic (or "post-genomic") chemical space, working within the assumptions that led to an estimate of 1060 drug-like small molecules (see, Bohacek et al., Medicinal Research Reviews, 16(1), 3-50 (September 1996.), the selection of one 500 Da molecule could represent as much as $\log_2$ 1060=200 bits. To represent the same amount of information in DNA requires a molecule with a mass of 65,000 Da. Thus, there are opportunities for chemical information systems with up to two orders of magnitude lower mass than DNA, and with far greater chemical diversity.

Definitions

"Abstract digital data" or "digital data" is data that is represented using the binary number system of ones (1) and zeros (0), as opposed to analog representation. Abstract digital data can correspond to real objects.

"Address" has the computer art-recognized meaning. An address is a location for data. Each location has an address (a unique number) assigned to it. By specifying a memory address, those skilled in the molecular computing art can access particular data. An "addressable location" can be a location on a solid surface containing a mixture of molecules, e.g., small molecules.

"Addressable locations" has the computer art-recognized meaning. An addressable location is a location whose position in a storage medium is precisely defined and can be accessed.

"Array spectrum" has the computer art-recognized meaning. An array spectrum is an array of entities ordered in accordance with the magnitudes of a common physical property.

"Binary code" has the computer art-recognized meaning. Binary code represents text, computer processor instructions, or any other data using a two-symbol system. The two-symbol system used is often "0" and "1" from the binary number system. The binary code assigns a pattern of binary digits, also known as bits, to each character, instruction, etc. In computing and telecommunications, binary codes are used for various methods of encoding data, such as character strings, into bit strings. Those methods may use fixed-width or variable-width strings. In a fixed-width binary code, each letter, digit, or other character is represented by a bit string of the same length; that bit string, interpreted as a binary number, is usually displayed in code tables in octal, decimal or hexadecimal notation. There are many character sets and many character encodings for them.

"Binary computer language" is a computer language written in binary code. The computer language can be selected from the group consisting of programming language, command language, general-purpose language, machine language, markup language, style sheet language, configuration language, construction language, query language, modeling language and simulation language.

"Binary data" has the computer art-recognized meaning. Binary data is data whose unit can take on only two possible states, traditionally labeled as 0 and 1 in accordance with the binary numeral system and Boolean algebra. Binary data occurs in many different technical and scientific fields, where it can be called by different names: "bit" (binary digit) in computer science, "truth value" in mathematical logic and related domains, "binary variable" in statistics.

"Chemical perceptron" is the implementation of a perceptron in an artificial (simulated) chemistry. A perceptron is a machine learning algorithm that helps provide classified outcomes for computing. A perceptron is the simplest system capable of learning (inspired by the functioning of a biological neuron). See, Banda et al., Online Learning in a Chemical Perceptron. Artificial Life, 19(2), 195-219, (Spring 2013); Banda et al., "Training an Asymmetric Signal Perceptron Through Reinforcement in an Artificial Chemistry." Journal of the Royal Society Interface, 11(93) (April 2014). A perceptron algorithm is a supervised classification because the computer is aided by the human classification of data points. See, Arcadia, et al., "Parallelized linear classification with volumetric chemical perceptrons," in, Proceedings of the IEEE Conference on Rebooting Computing (ICRC) (2018) [EXAMPLE 2] and Rose et al., "Computing with Chemicals: Perceptrons Using Mixtures of Small Molecules," in 2018 IEEE International Symposium on Information Theory (ISIT) (Vail, Colo., June 2018), pp. 2236-2240, doi: 10.1109/ISIT.2018.8437814 [EXAMPLE 1].

"Chemical scaffold" has the chemical art-recognized meaning. A chemical scaffold is a molecular core to which functional groups are attached.

"Dataset" is, when working with machine learning methods, a collection of instances.

"Ground truth" has the computer art-recognized definition. In machine learning, the term refers to the accuracy of the training set's classification for supervised learning techniques. This is used in statistical models to prove or disprove. The related term "ground truthing" refers to the process of gathering the proper objective (provable) data for this test. A synthetic metabolome has ground truth. A metabolome form a living organism may obtain ground truth as a result of the progress of science and the useful arts.

"HPLC" is high-pressure liquid chromatography. In HPLC, a liquid sample is injected into a stream of solvents. Together, the sample and solvents are forced, at high pressure, through an analytical column. Depending on the type of column and solvents, some chemicals will exit the column at different times. At the end of the column is an ultraviolet (UV) light source and a photodetector. When an appropriate wavelength is selected, the analyte can be detected by a change in absorbance as it exits the column. The absorbance is plotted over time as a chromatogram. See, Karger, "HPLC: Early and recent perspectives," Journal of Chemical Education, 74(1), 45 (1997).

"Linear classification" is the identification to which class (or group) it belongs based upon an object's characteristics, where the classification decision is based upon on the value of a linear combination of the characteristics.

Figure 17:
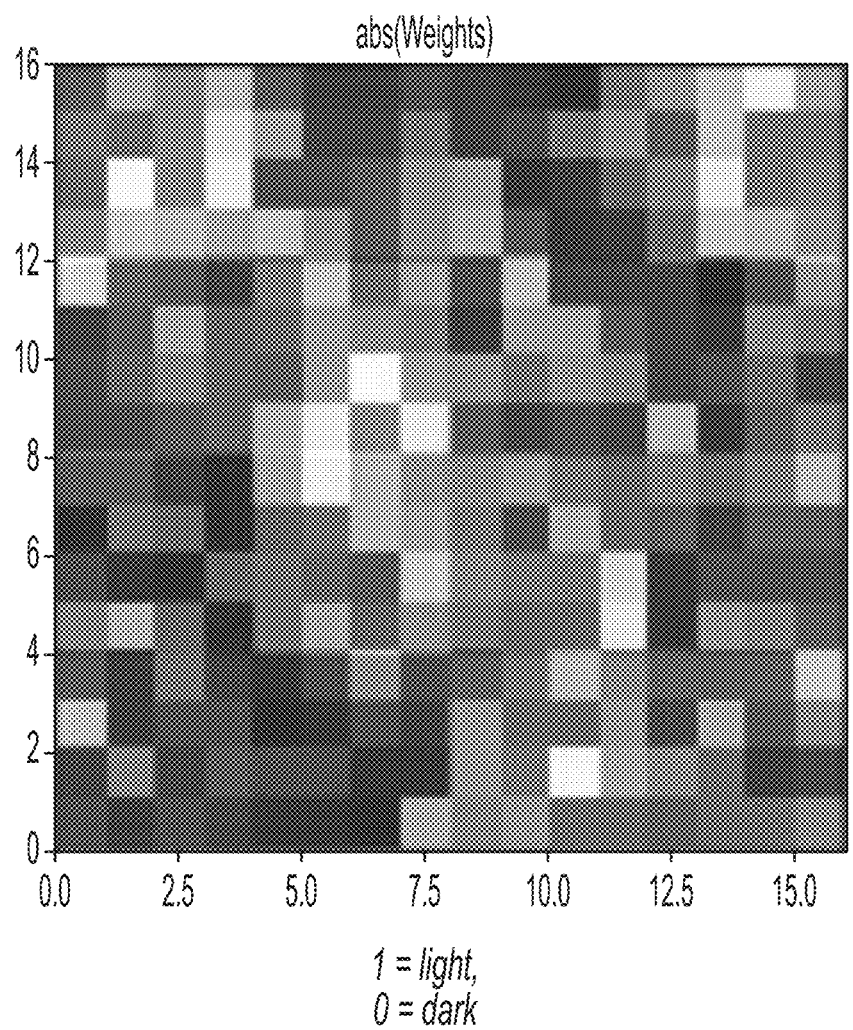
FIG. 17 shows perceptron weight matrices. The images are binary, but the perceptron weight matrix is real-valued. Each pixel has a weight which is a real number between −1 and +1. These matrices are trained in simulation to separate the target classes. (The weight magnitude will be linearly mapped to a volume, e.g. 0 to 10 microliters). Pixels with positive weights will be pooled separately from pixels with negative weights. See, Arcadia, et al., "Parallelized linear classification with volumetric chemical perceptrons," in, Proceedings of the IEEE Conference on Rebooting Computing (ICRC) (2018) [EXAMPLE 2].

"Logistic regression" analyses are computer art-recognized algorithms to solve a classification problem, where the algorithm involves a linear discriminant separating the classes. A classification problem occurs when independent variables are continuous, and a dependent variable is in categorical form, i.e., in classes like positive class and negative class. To check the performance of logistic regression analyses, those skilled in the molecular computing art can use a confusion matrix (see, FIG. 22) or an Area Under The Curve-Receiver Operating Characteristics (AUC-ROC) Curve. See, EXAMPLE 4, FIG. 14 and FIG. 17.

"MALDI mass spectroscopy" is described in U.S. Pat. No. 7,084,396 (Schneider). "Mass spectrometry (MS) fundamentally consists of three components: ion sources, mass analyzers, and ion detectors. The three components are interrelated; some ion sources may be better suited to a particular type of mass analyzer or analyte. Certain ion detectors are better suited to specific mass analyzers. Electrospray (ESI) and matrix-assisted laser-induced desorption (MALDI) ionization sources are widely used for organic molecules, particularly biomolecules and are generally preferred for the ionization of non-volatile organic species. ESI is widely practiced because it can be readily coupled with liquid chromatography and capillary electrophoresis for added discrimination capability. MALDI techniques are widely practiced on large molecules (e.g., proteins) that can be difficult to solubilize and volatize in ESI. The principle advantage of MALDI is the small number of charge states that arise from molecules with a multiplicity of ionizable groups."

"Mass spectrometry" (MS) is an analytical technique that ionizes chemical species and sorts the ions based on their mass-to-charge ratio. Accordingly, a mass spectrum measures the masses within a sample. Mass spectrometry is useful for broad and high-throughput metabolic screening. Zampieri et al., Current Opinion in Chem. Bio. 36, 15-23 (2017). Advances in statistical tools and databases support mass spectrometry. Brown et al., Analyst. 134(7), 1322-32 (2009); Wishart et al., Nucleic Acids Res. 4(46), 608{617 (2018).

"Metabolome" is all of the molecules (e.g., small molecules) present in a given organism, including metabolites and the products of catabolism. See, U.S. Pat. No. 7,329,489 (Kaddurah-Daouk et al.). The metabolome refers to the complete set of small-molecule chemicals found within a biological sample. The biological sample can be a cell, a cellular organelle, an organ, a tissue, a tissue extract, a biofluid or an entire organism. Metabolites are biologically ubiquitous, and their primary pathways and processes are highly conserved across species and historical epoch. Peregrin-Alvarez et al., Genome Biol. 10(6), R63 (2009). The whole human metabolome has ~125,000 elements. Wishart et al., HMDB 4.0: the human metabolome database for 2018. Nucleic Acids Res. 4(46), 608-617 (2018). By analogy, if DNA is the 'hard drive' of living systems, then the surrounding molecules are the logic and RAM. DNA represents only ≈1% of the mass of a cell. The remaining 99% also confers important information.

"Metabolomic element" is an element (e.g., a small molecule) in a metabolome.

"Microwell plate" is a flat plate with multiple "wells" used as small test tubes. A microplate is a standard tool in analytical research and clinical diagnostic testing laboratories. Robots have been developed specifically to handle microplates for high-throughput assays. Ultra-low attachment (ULA) plates that support 3D cell culture are commercially available, e.g., from Thermo Fisher Scientific, Waltham, Mass., USA.

"Multiply accumulate" (MAC) operation is a common step in computing, especially digital signal processing, that computes the product of two numbers and adds that product to an accumulator.

"Nanoscale" refers to having dimensions measured in nanometers ($10^{-9}$ meters). "Nanomolar" (nM) is $10^{-9}$ mol/L ($10^{-6}$ mol/m$^3$). "Nanoliter" is $10^{-9}$ L.

"One-hit" has the computer art-recognized definition. A one-hit has a single positive bit in a digital sequence. A one-hit is useful as a basis for further molecular computing.

"Parallel computing" is a type of computation in which many calculations or the execution of processes are carried out simultaneously. Large problems can often be divided into smaller ones, which can then be solved at the same time.

"Perceptron" is a flexible and universal pattern classification structure and a key element of neural network systems that handle large data sets. See, Courbariaux et al., "Binarized Neural Networks: Training deep neural networks with weights and activations constrained to +1 or −1." arXiv:1602.02830 (Mar. 17, 2016). Mathematically, a perceptron is a dot product between a real "input" vector x and a real "weight" vector w, both of dimension J, followed by a nonlinearity ø(w•x) where ø(•) is a "sigmoidal," non-decreasing thresholding function with a rapid transition between two discrete levels. Accordingly, a perceptron is a binary classifier which separates inputs into two groups.

"Pixel map" is a video display technique applicable to devices with native fixed pixels, such as LCD monitors and plasma displays. A monitor that has been set to 1:1 pixel mapping will display an input source without scaling it, such that each pixel received is mapped to a single native pixel on the monitor.

"Reaction groups" or "functional groups" has the chemical art-recognized meaning. Reaction groups are specific substituents or moieties within molecules that are responsible for the characteristic chemical reactions of those molecules. The same functional group will undergo the same or similar chemical reaction(s) regardless of the size of the molecule of which it is a part.

"Small molecule" has the biological art-recognized definition. The NCI Dictionary of Cancer Terms defines a small molecule as "A substance that is able to enter cells easily because it has a low molecular weight. Once inside the cells, it can affect other molecules, such as proteins. This characteristic is different from drugs that have a large molecular weight, such as monoclonal antibodies, which are not able to get inside cells very easily."

"Spectrometry" is an instrumental method for identifying the chemical constitution of a substance by means of the separation of gaseous ions according to their differing mass and charge.

"Spectroscopy" is the branch of science concerned with the investigation and measurement of spectra produced when matter interacts with or emits electromagnetic radiation. The term spectroscopy includes ultraviolet-visible spectroscopy, Rydberg spectroscopy, Infrared spectroscopy, fluorescence spectroscopy, and absorption spectroscopy.

"Zettabyte" is $10^{21}$ bytes. See, Cisco, The Zettabyte Era: Trends and Analysis (2016).

REFERENCES

Those skilled in the molecular computing art may rely on the following scientific books and scientific publications:

Adleman, "Molecular computation of solutions to combinatorial problems," Science, vol. 266, no. 5187, 1021-1024, 1994.

Alberts, Molecular Biology of the Cell (Garland Science, 2017).

Banda et al., "Training an Asymmetric Signal Perceptron Through Reinforcement in an Artificial Chemistry." Journal of the Royal Society Interface, 11(93) (April 2014).

Banda et al., Online Learning in a Chemical Perceptron. Artificial Life, 19(2), 195-219, (Spring 2013).

Bloom, "The functional significance of neurotransmitter diversity," American Journal of Physiology-Cell Physiology, 246(3), C184-C194 (1984).

Bornholt et al., "A DNA-based archival storage system," ACM SIGOPS Operating Systems Review, 50(2), 637-649 (2016).

Cheraiet et al., "A simple and eco-sustainable method for the O-Boc protection/deprotection of various phenolic structures under water-mediated/catalyst-free conditions," Green Chemistry Letters and Reviews, vol. 6, no. 3,211-216, 2013.

Cherry & Qian, "Scaling up molecular pattern recognition with DNA-based winner-take-all neural networks," Nature, vol. 559, no. 7714, p. 370, 2018.

Church, Gao & Kosuri, "Next-generation digital information storage in DNA," 337(6102), 1628 (September 2012).

Courbariaux & Bengio. "Binarynet: Training deep neural networks with weights and activations constrained to +I or −1." (2016).

Domling & Ugi, Multicomponent reactions with isocyanides. Angewandte Chemie International Edition, 39(18), 3168-3210 (2000).

Feller, An Introduction to Probability Theory and Its Applications, Volume I. "(Wiley, third edition, 1968).

Fu et al., "Mixing linear SVMs for nonlinear classification," IEEE Transactions on Neural Networks, 21(12), 1963-1975 (2010).

Gibson & Cowan, "On the decision regions of multilayer perceptrons," Proceedings of the IEEE, 78(10), 1590-1594 (1990).

Goelet et al., "The long and the short of long-term memory—a molecular framework," Nature, 322(6078) 419 (1986).

Goldman et al., "Towards practical, high-capacity, low-maintenance information storage in synthesized DNA," Nature, 494(7435) 77 (2013).

Gupta et al., "Deep learning with limited numerical precision." CoRR, abs/1502.02551 (2015).

Karger, "HPLC: Early and recent perspectives," Journal of Chemical Education, 74(1), 45 (1997).

Kuwano & Kuwano, "Benzyl protection of phenols under neutral conditions: Palladium-catalyzed benzylations of phenols," Organic Letters, 10(10), 1979-1982 (2008).

LeCun et al., "Gradient-based learning applied to document recognition." Proc. of the IEEE, 86(11), 2278-2324 (1998).

Lin et al., "Neural networks with few multiplications." CoRR, abs/1510.03009 (2015).

Marchetti & Levine, "Biomimetic catalysis." ACS Catalysis, 1(9), 1090-1118 (2011).

Marshall et al., Fourier transform ion cyclotron resonance mass spectrometry: A primer." Mass Spectrometry Reviews, 17(1), 1-35 (1998).

Mateos et al., "Determination of phenols, flavones, and lignans in virgin olive oils by solid-phase extraction and high-performance liquid chromatography with diode array ultraviolet detection," Journal of Agricultural and Food Chemistry, 49(5), 2185-2192 (2001).

Minsky, Papert, & Bottou, Perceptrons: An Introduction to Computational Geometry (MIT Press, 2017); Bishop, Pattern Recognition and Machine Learning (Springer, 2006).

Montedoro et al., "Simple and hydrolyzable phenolic compounds in virgin olive oil. 1. Their extraction, separation, and quantitative and semiquantitative evaluation by HPLC," Journal of Agricultural and Food Chemistry, 40(9), 1571-1576 (1992).

Morrison & Boyd. Organic Chemistry (Allyn & Bacon, 1966).

Murashige et al., "Comparisons of O-acylation and Friedel—Crafts acylation of phenols and acyl chlorides and Fries rearrangement of phenyl esters in trifluoromethanesulfonic acid: Effective synthesis of optically active homotyrosines," Tetrahedron, 67(3), 641-649 (2011).

Ouk et al., "O-methylation of phenolic compounds with dimethyl carbonate under solid/liquid phase transfer system," Tetrahedron Letters, 43(14), 2661-2663 (2002).

Papoulis. Probability, Random Variables, and Stochastic Processes. (McGraw-Hill, New York, third edition, 1991).

Rastegari et al., "Xnor-net: Imagenet classification using binary convolutional neural networks. CoRR, abs/1603.05279 (2016).

Reece, Campbell Biology (Benjamin Cummings/Pearson, 2011).

Rosenblatt, "The perceptron: A probabilistic model for information storage and organization in the brain." Psychological Review, 65(6), 386 (1958).

Schmidhuber, "Deep learning in neural networks: An overview," Neural Networks, 61, 85-117 (2015).

Sefkow & Kaatz, "Selective protection of either the phenol or the hydroxy group in hydroxyalkyl phenols," Tetrahedron Letters, 40(36), 6561-6562 (1999).

Taga & Bassler, "Chemical communication among bacteria," Proceedings of the National Academy of Sciences, U.S.A., 100(suppl. 2), 14549-14554 (2003).

Ugi et al., Multicomponent reactions in organic chemistry." Endeavour, 18(3), 115 122 (1994).

Ugi et al., The chemistry of isocyanides, their multicomponent reactions and their libraries." Molecules, 8(1), 53-66 (2003).

Methods of the Invention

The invention provides a method of computing using chemical manipulations to store and process abstract digital information. The invention provides methods for chemical encoding, computational processing and readout. The invention provides a method for encoding binary data into the chemical composition of liquid samples. The invention provides a method for storing multiple datasets in parallel by multiple co-existing chemicals. The inventors used programmable robotic liquid handling sequences to perform volumetric multiply accumulate (MAC) operations on parallelized chemical datasets. The inventors used high-performance liquid chromatography (HPLC) to read and verify the results of the chemical MAC calculations. Several images of handwritten digits from the MNIST database (LeCun et al., "Gradient-based learning applied to document recognition." Proc. of the IEEE, 86(11), 2278-2324 (1998)) were chemically encoded and successfully implemented on several single layer volumetric chemical perceptrons to classify the images. The inventors quantified the performance of the methods with a larger dataset of binary vectors. The inventors demonstrate herein the accurate linear classification of several MNIST images and Boolean data vectors.

A perceptron is a simple linear classifier which can be trained to determine whether or not an input belongs to a certain class. Rosenblatt, "The perceptron: A probabilistic model for information storage and organization in the brain." Psychological Review, 65(6), 386 (1958); Minsky et al., Perceptrons: An Introduction to Computational Geometry (MIT Press, 2017); Bishop, Pattern Recognition and Machine Learning (Springer, 2006). A perceptron uses a set of constant coefficients to compute a weighted sum of input features and thresholds the result to produce a Boolean label. The computation can be written as:

$$z = \sum_{i=1}^{N} w_i \cdot x_i + b \qquad \text{[Equation I]}$$

where $N$ is the number of input features (e.g. pixels in an image or dimensions of a vector), $x_i$ and $w_i$ are the $i^{th}$ feature and its corresponding weight, and b is a scalar bias. When the bias is nonzero, it is common to fold b into w by introducing an additional input feature whose value is always 1. The summation result z determines the class label, $\ell$, of the input according to the following threshold:

$$\ell = \begin{cases} \text{match,} & \text{if } z > 0 \\ \text{mismatch,} & \text{otherwise} \end{cases} \qquad \text{[Equation II]}$$

For a linearly separable dataset, the training for a perceptron is guaranteed to converge such that a set of weight values will be found that correctly classify all training points. While a perceptron is a simple classifier, it can be used as a building block for larger discriminative models, such as multilayer perceptrons [Gibson & Cowan, "On the decision regions of multilayer perceptrons," Proceedings of the IEEE, 78(10), 1590-1594, (1990.)] and support vector machines [Fu et al., "Mixing linear SVMs for nonlinear classification," IEEE Transactions on Neural Networks, 21(12), 1963-1975, 2010.] that can realize more complicated decision boundaries.

A perceptron can be designed to classify an MNIST handwritten digit image into one of two groups such as "zero" vs. "not a zero." LeCun et al., "Gradient-based learning applied to document recognition. Proc. of the IEEE, 86(11), 2278-2324 (1998). By controlling the values of the weights, one can change the classification operation. One advantage of using perceptron-based computation is that the weights can be flexibly designed; another advantage is that the computations are error tolerant. For instance, the precision of the weights can be flexibly set in floating point, fixed point, or even binary (−1|1 or 0|1), but nevertheless, the classification outcome can still be accurate because the training process can compensate for the reduction in precision and "heal" the perceptron. See, Rastegari et al., "Xnor-net: Imagenet classification using binary convolutional neural networks." CoRR, abs/1603.05279 (2016); Courbariaux et al., "Binarized Neural Networks: Training deep neural networks with weights and activations constrained to +1 or −1." arXiv:1602.02830 (Mar. 17, 2016); Lin et al., "Neural networks with few multiplications." CoRR, abs/1510.03009 (2015); Gupta et al., "Deep learning with limited numerical precision." CoRR, abs/1502.02551 (2015). Such flexibility and error tolerance are useful given the underlying discrete nature of the input-coding disclosed here and the stochastic nature of chemical reactions.

The following Examples are provided to illustrate the invention, and should not be considered to limit its scope in any way.

EXAMPLES

Example 1

Computing with Chemicals: Perceptrons Using Mixtures of Small Molecules

Introduction and summary. Computation that can exploit the Avogadrian numbers of molecules in heterogeneous solutions, and the even larger number of potential interactions among these molecules, is useful and beneficial. In principle, molecules can be used for realizing levels of parallelism orders of magnitude beyond what is achievable in silica, while requiring substantially less energy. See, Frank. "Throwing computing into reverse." IEEE Spectrum, 54(9), 32-37 (September 2017). However, the lack of precise specificity and control of chemical interactions has previously made computation that can exploit the Avogadrian numbers of molecules in heterogeneous solutions very difficult or impossible. Molecules in solution can react in a stochastic fashion because of diffusion, which depends both upon ambient conditions and also upon what other molecules and reagents are present. This inherent stochasticity has made chemistry a challenging field, but also makes chemical computation useful and beneficial.

For more information, see Rose et al., "Computing with Chemicals: Perceptrons Using Mixtures of Small Molecules," 2018 IEEE International Symposium on Information Theory (ISIT) (Vail, Colo., June 2018), pp. 2236-2240, doi: 10.1109/ISIT.2018.8437814, which is incorporated by reference.

This EXAMPLE 1 provides computational systems that can perform classification and signal processing on massive data sets by exploiting the inherent parallelism of solution phase chemical reactions. The target architecture is the perceptron, which is a flexible and universal pattern classification structure and a key element of neural network systems that handle large data sets. See, Courbariaux et al., "Binarized Neural Networks: Training deep neural networks with weights and activations constrained to +1 or −1." arXiv:1602.02830 (Mar. 17, 2016). In this EXAMPLE 1, the perceptron is a single multiply accumulate primitive followed by a nonlinearity, as shown in FIG. 1. More complex neural networks are buildable from multiple layers of perceptrons.

This EXAMPLE 1 demonstrates how relatively simple chemistry can produce an ubiquitous computational primitive (the multiply accumulate ("MAC") operation) that supports a single layer neural network called a perceptron. Our perceptron is produced using distinct chemical mixtures whose inclusion/exclusion in a pool is controlled by a binary input vector, applying different reagents/processes to the pooled inputs, and reading the result through simple indicators such acidity, alkalinity, or fluorescence emission. Using distinct mixtures as inputs and different reagents as operations, this EXAMPLE 1 shows how to produce the perceptron MAC operation and read out the result using simple indicators such as pH or fluorescence. With a moderately large chemical library, the number of potential inputs can be Avogadrian, so that reagent addition implicitly performs a concomitantly large number of MAC operations in parallel. Because implementations may be noisy, due to stochastic reactions or weight quantization errors, this EXAMPLE derives a signal-to-noise-like figure of merit to predict expected perceptron performance under a weight uncertainty.

This EXAMPLE 1 first reviews perceptron structure. This EXAMPLE 1 then briefly describes the small molecules upon which the scheme is built. Based upon the presence or absence of small molecule mixtures as inputs, this EXAMPLE 1 next describes how, for a given desired perceptron weight set, mixture compositions can be found so their collective interaction with different reagents produces the desired perceptrons and the desired indicator outputs.

This EXAMPLE 1 shows how to implement chemical perceptrons using small molecules composed of reactive groups (R-groups), and reagents which act differentially (but without impractical exquisite specificity) upon them. Given multiple reagents with differing R-group reactivity, we can realize multiple independent perceptrons (one per reagent) assuming there are no more reagents than R-groups. This EXAMPLE 1 has also characterized the effects weight quantization error and reaction uncertainty to perceptron performance by deriving a signal-to-noise-like figure of merit. From the quantization perspective, high fidelity representation of given perceptrons seems possible. To determine whether similarly high fidelity representation is possible under reaction uncertainty, work must be done to identify chemical systems and characterize their associated $\Gamma$ and/or $\Gamma'$ and $K_r$. Data for $\Gamma$ can likely be gathered from the literature, but chemical system characteristics such as $\Gamma'$ and $K_r$ rarely are studied or reported. Chemical training (see, Banda et al., "Online Learning in a Chemical Perceptron." Artificial Life, 19(2), 195-219 (Spring 2013); Banda et al., "Training an Asymmetric Signal Perceptron Through Reinforcement in an Artificial Chemistry." Journal of the Royal Society Interface, 11(93), (April 2014)) and layering into larger networks are the subjects of ongoing work.

The number of possible inputs to our perceptron is combinatorially large. Our ongoing Ugi synthesis work (see EXAMPLES below) will produce a library of about $3 \times 10^4$ different molecules, implying 230000−1 non-empty mixtures. The number of simultaneous multiply accumulate (MAC) operations (inputs×weights to produce an indicator product) implemented by reagent addition can also be extremely large, even after selecting only for mixtures which implement a set of weights. Because small molecules are used and operation relies upon the natural promiscuity of liquid phase chemical reactions, the physical size of these perceptrons is limited only by the amount of indicator product that can be reliably detected.

Larger libraries ($2\times10^6$) are possible. Tan et al., Stereoselective synthesis of over two million compounds having structural features both reminiscent of natural products and compatible with miniaturized cell-based assays." Journal of the American Chemical Society, 120(33), 8565-8566 (1998). The number of simultaneous multiply accumulate (MAC) operations (inputs×weights to produce an indicator product) implemented by reagent addition can also be extremely large even after selecting only for mixtures which implement a given set of weights.

Perceptrons through differential reactivity. Concept overview. De novo design of exquisitely specific reactions that will select for (each of) one and only one molecule has remained an outstanding challenge for synthetic chemistry. Until now, selecting individual molecules from a mixture to react without affecting other molecules has been untenable, meaning that mapping individual molecules to inputs in the perceptron model has been untenable.

Instead of using the presence or absence of distinct molecules as perceptron inputs, this EXAMPLE 1 uses distinct mixtures of molecules as units of input, then combine these mixtures as dictated by the binary input vector x, resulting in a mixture of mixtures (a pool). We then apply a reagent or process to the pool to perform the multiply accumulate (MAC) operations. Next, we follow with a threshold detection of a detectable reaction product to produce the perceptron output.

The individual molecules comprise different "R-groups," which are molecular species with different chemical properties that can be attached to some chemical backbone. The number of R-groups comprising a molecule is some fixed K. While the chemistry may allow for multiple copies of the same R-group per molecule, we make some restrictions, so a R-group can appear only once per molecule. The multiplicity of potential R-groups and the size of K means that the number of different molecules is combinatorial and thus can be very large.

A specific reagent interacts differently with different R-group types. When a reagent $G_i$ reacts with R-group $\mathcal{R}_n$ and replaces $\mathcal{R}_n$ with a different detectable R-group (that may be a fluorophore or have a different acidity, polarity, or charge) with a given yield. Then, $G_i$ is also assumed to affect other R-groups with varying degrees of specificity/affinity. When we assume that the reagent is plentiful and accessible to all molecules in a mixture given sufficient mixing and/or diffusion, then we can define an operator $G_i(\bullet)$ where $G_i(\mathcal{R}_n)=\gamma_{in}\in[0,1]$ is the equilibrium proportion of R-group $\mathcal{R}$ n replaced by indicator $T_i$ under application of reagent $G_i$. Given N different R-groups, any given reagent $G_i$ has an associated R-group replacement "equilibrium/yield vector" $\gamma_i$ defined as:

$$\gamma_i = \left\{ \begin{array}{c} \gamma_i 1 \\ \vdots \\ \gamma_i N \end{array} \right\}.$$

When the skilled artisan could design a reagent $G_i$ that would react only with R-group $\mathcal{R}_n$, always replacing it completely by $T_i$, then $\gamma_i=e_n$, then the canonical unit vector is $\mathcal{R}^N$. However, the lack of precise ligand/receptor specificity between R-groups and reagents makes such a scenario unlikely. So, the replacement vector associated with reagent $G_i$ contains an assortment of non-negative numbers between zero and one. $\gamma$ might be stochastic (with known statistics). $\gamma$ is defined by assuming that all of the related reactions have achieved equilibrium. While $\gamma$ varies with time as reactions proceed, we need only consider final $\gamma$ values in this EXAMPLE 1.

When molecules $\{\mu_m\}$, comprise K R-groups $\mathcal{R}_{m1}$, $\mathcal{R}_{m2}, \ldots \mathcal{R}_{mK}$, each molecule $\mu_m$ is represented as an integer N-vector where nonzero entries in position $\ell$ indicates the number of $\mathcal{R}\ell$ contained in $\mu_m$. For molecules constructed of K R-groups, we must have $\|\mu_m\|_1=K$, but the structure of $\mu_m$ may be further constrained depending upon how molecules are constructed. For instance, perhaps a given R-group can appear only once per molecule so that $\mu_m$ is always a binary vector. Further, we might also have K distinct classes of R-groups where each class may be represented only once.

Reagent-Rich Reactions. We assume throughout that reagent is plentiful relative reaction targets (R-groups). This assumption allows us to effectively decouple competition between R-groups for reagent. We consider the reactions between R-groups A and B and reagent G, developing an approach to realizing perceptrons (and thence more complex neural networks) which does not depend on carefully matched ligand/receptor chemistry is desirable. Thus, instead of using the presence or absence of distinct molecules as perceptron inputs, we use distinct mixtures of molecules as units of input and combine these mixtures as dictated by the binary input vector x resulting in a mixture of mixtures we call a pool. We then apply some reagent (or process) to the pool to perform the necessary multiply-accumulate operations, and follow with threshold detection of a detectable reaction product to produce the perceptron output.

To demonstrate, we consider the reactions between R-groups A and B and reagent G. See:

$$A + G \underset{\mu_X}{\overset{\lambda_X}{\rightleftharpoons}} X, \text{ and} \qquad \text{[Equation 1]}$$

$$B + G \underset{\mu_Y}{\overset{\lambda_Y}{\rightleftharpoons}} Y \qquad \text{[Equation 2]}$$

where the forward and backward reaction rates are specified above and below the $\rightleftharpoons$, respectively.

A "master equation" such as [Equation 1] implies a Markov chain with states A+G and X and the equilibrium yield value $\gamma x$ is the steady state probability of being in state X. For such two state Markov chains, we therefore have:

$$\gamma_X = \frac{\lambda_X}{\lambda_X + \mu_X} = \frac{\rho_X}{\rho_X + 1}, \text{ and} \qquad \text{[Equation 3]}$$

$$\gamma_Y = \frac{\lambda_Y}{\lambda_Y + \mu_Y} = \frac{\rho_Y}{\rho_Y + 1}, \qquad \text{[Equation 4]}$$

after defining $\rho_X=\lambda_X/\mu_X$ and $\rho_Y=\lambda_Y/\mu_Y$.

Now, consider the equation $$A+B+2G \rightleftharpoons X+Y \qquad \text{[Equation 5],}$$

Owing to competition for reagent between A and B, the equilibrium constants for [Equation 5] can differ from the $\gamma_x$ and $\gamma_y$ obtained in isolated reactions. Such equilibrium yield constant coupling (or "interference") would complicate the design problem owing to the combinatorial multiplicity of competing reactions which must be characterized.

Figure 2:
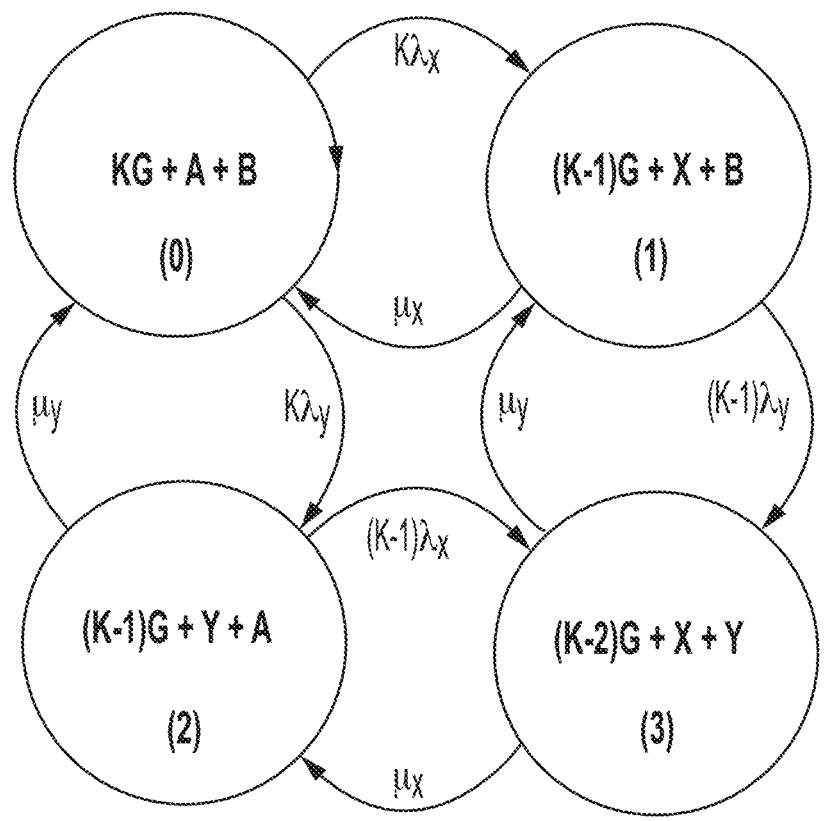
FIG. 2 is a depiction of a Master equation (Markov chain) for two species A and B interacting with reagent G. A surfeit of G (large K) results in approximately decoupled equilibria for X and Y.

So, consider the Markov chain of FIG. 2 which depicts the reaction of [Equation 5] assuming K≥2 available reagent molecules. The diagram implies a differential equation of the form:

$$\dot{\Pi} = A\Pi \qquad \text{[Equation 6]}$$

where $\Pi$ is the 4-vector state probabilities and A is:

$$A = \begin{bmatrix} -K(\lambda_X + \lambda_Y) & \mu_X & \mu_Y & 0 \\ K\lambda_X & -(K-1)\lambda_Y - \mu_X & 0 & \mu_Y \\ K\lambda_Y & 0 & -(K-1)\lambda_X - \mu_Y & \mu_X \\ 0 & (K-1)\lambda_Y & (K-1)\lambda_X & -(\mu_X + \mu_Y) \end{bmatrix} \qquad \text{[Equation 7]}$$

If we define $$\rho_X = \frac{K\lambda_X}{\mu_X} \text{ and } \rho_Y = \frac{K\lambda_Y}{\mu_Y},$$

the zero-eigenvalue eigenvector of A is, $$\phi_0 = \begin{bmatrix} 1 \\ \rho_X \\ \rho_Y \\ \frac{K-1}{K}\rho_X\rho_Y \end{bmatrix} \qquad \text{[Equation 8]}$$

The steady state probability vector $\Pi^*$ is then:

$$\Pi^* = \frac{\phi_0}{1 + \rho_X + \rho_Y + \frac{K-1}{K}\rho_X\rho_Y} \qquad \text{[Equation 9]}$$

However, for large K, as befits a reagent-rich assumption, we have $$\Pi^* \approx \frac{1}{1 + \rho_X + \rho_Y + \rho_X\rho_Y} \begin{bmatrix} 1 \\ \rho_X \\ \rho_Y \\ \rho_X\rho_Y \end{bmatrix} \qquad \text{[Equation 10]}$$

We can then find:

$$\gamma_X = \pi_1^* + \pi_3^* \approx \frac{\rho_X(1+\rho_Y)}{(1+\rho_X)(1+\rho_Y)} = \frac{\rho_X}{1+\rho_X} \text{ and} \qquad \text{[Equation 11]}$$

$$\gamma_Y = \pi_2^* + \pi_3^* \approx \frac{\rho_Y}{1+\rho_Y} \qquad \text{[Equation 12]}$$

The Mathematics of Mixture Composition. In this EXAMPLE 1, we assume the entries are non-negative integers that sum to K. [if reagent-rich R-group reactions are effectively independent, we consider molecules, $\{\mu_m\}$, composed of L R-groups $\mathcal{R}_{m1}, \mathcal{R}_{m2}, \ldots, \mathcal{R}_{mL}$. We represent each molecule $U_m$ as an integer R-vector where nonzero entries in position r indicate the number of $\mathcal{R}_r|$ contained in $U_m$. For molecules constructed of L R-groups, we must have $\|\mu_m\|_1 = L$, but the structure of $U_m$ may be further constrained depending upon how molecules are constructed. For instance, perhaps a given R-group can appear only once per molecule so that $U_m$ is always a binary vector. Further, we might also have L distinct classes of R-groups where each class may be represented only once. However, for now we assume the entries are non-negative integers that sum to L.]

An N×M molecule matrix, U, is:

$$U = [\mu_1, \mu_2, \ldots \mu_M] \qquad \text{[Equation 1] [Equation 13]},$$

which contains our "universe" of M distinguishable molecules, $m_1, \ldots, m_M$.

Each component of a particular group of molecular mixtures, $\{M_j\}, j=1, \ldots, J$, can be defined by a binary M-vector $\theta_j$ whose components are 0|1, corresponding to which molecules are absent|present in $M_j$ (at presumed unit concentration). A matrix $\theta$, each column of which specifies the molecules that comprise input j, can be defined as:

$$\Theta = [\theta_1, \theta_2, \ldots \theta_J] \qquad \text{[Equation 2] [Equation 14]},$$

where $J \leq 2^M$ is the number of inputs to our perceptron. Mixture j is present in the pool when perceptron input $x_j=1$ and is not present when $x_j=0$. [Because M can be very large ($3\times10$ in our work and libraries as large as $2\times10^6$ have been built in other contexts), the number of distinct mixtures (and therefore, potential inputs) is essentially limitless.]

Because reagents act on R-groups, we obtain the results of reagent application by translating $\Theta$ into a corresponding collection of R-group mixtures, $\{r_j\}$, upon whose components the $\gamma_{in}$ can operate. We define the N×J matrix $\mathcal{R}$ as:

$$\mathcal{R} = U\Theta \qquad \text{[Equation 3] [Equation 15]},$$

Note that $$\mathcal{R} = [r_1, \ldots \theta_J], \text{ and } r_j = \begin{bmatrix} r_j 1 \\ \vdots \\ r_j N \end{bmatrix}$$

where the integer $r_{jn}$ indicates the number of $\mathcal{R}_n$'s in mixture j. Because the action of reagent $G_i$ on molecule $\mu_m$ is $\gamma_i{}^T\mu_m$, applying reagent $G_i$ to a given mixture $M_j$ results in non-negative indicator "weight":

$$w_{ij} = \gamma_i^T U \theta_j$$

Finally, when the presence or absence of $M_j$ in the pool is defined by the binary variable $x_j$, the indicator amount produced by applying reagent $G_i$ to the pool is:

$$\|T_i\| = \sum_{j=1}^{J} w_{ij} x_j = w_i^T x = \gamma_i^T U \Theta x, \qquad \text{[Equation 4][Equation 16]}$$

where $$w_i = \begin{bmatrix} w_{j1} \\ \vdots \\ w_{iJ} \end{bmatrix}$$

and each $w_{ij} \geq 0$. Then:

$$w_i = \Theta^T U^T \gamma_i \qquad \text{[Equation 5] [Equation 17]}.$$

To summarize this as a theorem:

Theorem 1 (Chemical Perceptron (Reagent-Rich Decoupling)): Assuming the presence or absence of each of an ensemble of molecular mixtures as binary inputs, $x_j$, the scalar $\|T_i\|$ as given in [Equation 4] [Equation 16] represents a chemical multiply accumulate operation on the $x_j$ using weights $w_{ij} \geq 0$. Applying a threshold operator $\varphi(\ )$ to $\|T_i\|$ results in the mathematical equivalent of the perceptron structure in FIG. 1. [When reagent is plentiful, then the yield of reagent G applied to a mixture of R-groups $\Sigma_m \mathcal{R}_m$ is approximately equal to the sum of individual unmixed-$\mathcal{R}_m$ yields with similarly plentiful reagent.]

Proof [Theorem 1]: See the mathematical development leading to the statement of Theorem 1.

Figure 3:
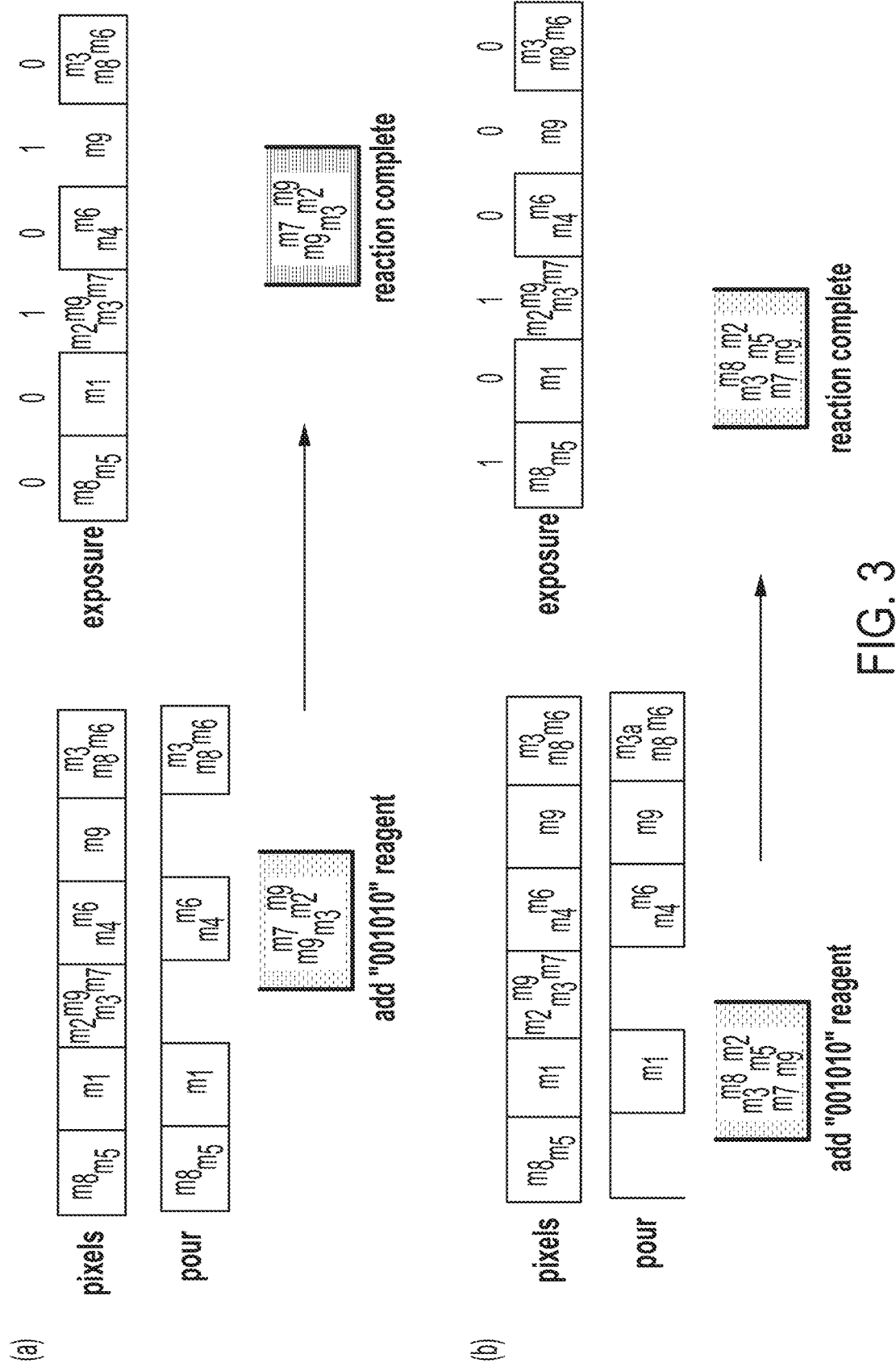
FIG. 3 is a cartoon representation of the chemical perceptron described in EXAMPLE 1, Theorem 1, which can recognize two patterns (001010 and 10100) corresponding to two different reagents. Pixel cells are mixtures composed of different molecules me-Pixels are exposed according to the inputs, $X_j$, $j=1, 2, \ldots, 6$, and then "poured" into the pool. A reagent is added to the pool and the reaction proceeds. Darker boxes (green) represents post-reaction above-threshold indicator detection.
Figure 3:
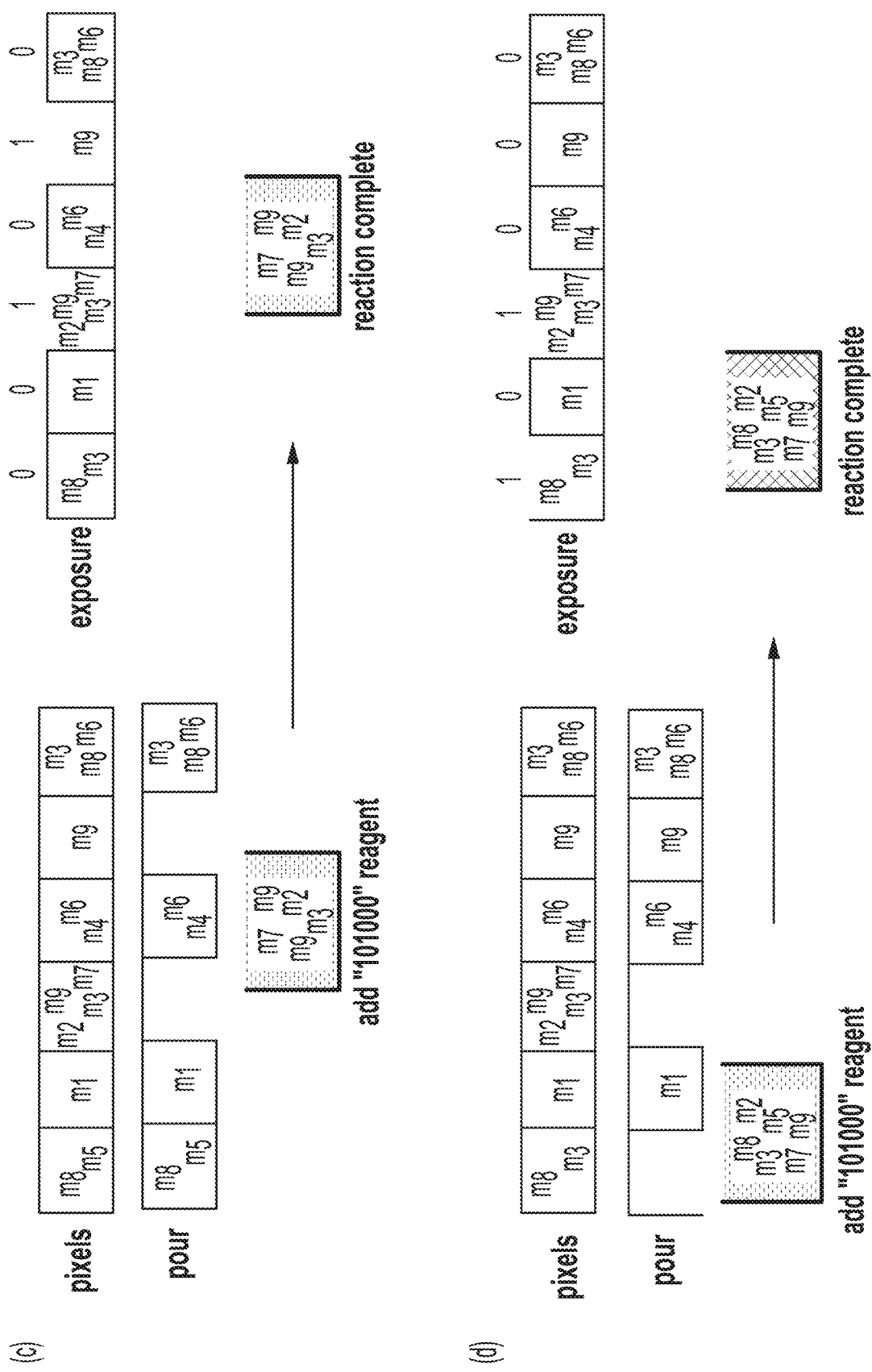

FIG. 3 is a cartoon representation of the chemical perceptron described in Theorem 1. Let us now consider the appropriate design of input mixtures to realize different perceptron weight-sets under the action of different reagents.

Designing the input composition, $\Theta$. Assuming R-groups, molecules, and reagents have been chosen, we are then presented with at least two mathematical problems:

(a) How do we choose input mixture compositions to produce some desired weight pattern $w_i$?

(b) Because the ensemble of input mixture compositions represents real data, can one choose a single input mixture set where application of reagent $\{G_p\}$, $p=1, 2, \ldots, P$ represent P different perceptrons with weight sets $\{w_p\}$, $=1, 2, \ldots, P$?

Let weight set, $w_i$, corresponding to application of reagent $G_i$:

$$\gamma_i^T R = \gamma_i^T U \Theta = [w_{i1} \ldots w_{iJ}] = w_i^T$$

First consider non-negative weight sets. Let $w_P$ correspond to application of reagent $G_P$ so that:

$$\gamma_p^T R = \gamma_p^T U \Theta = [w_{p1} \ldots w_{pJ}] = w_p^T$$

Now, let:

$$\Gamma = [\gamma_1 \ldots \gamma_P]$$

where P is the number of different perceptrons required of a given data set corresponding to the set of input mixtures, $M_1$, $j=1, \ldots, J$. We then have:

$$\Theta^T U^T \Gamma = R^T \Gamma = [w_1 \ldots w_P] = W \qquad \text{[Equation 6] [Equation 20]}$$

and we must solve for $\Theta$.

However, before considering specific approaches, some useful general observations can be made from the structure of [Equation 6] [Equation 20]. When any column of $\Gamma$, $\gamma_q$ depends linearly on another set of columns $\{\gamma\ell\}$, set of constants $\{\alpha\ell\}$ exists so:

$$\gamma_q = \sum_{\ell \neq q} \alpha_\ell \gamma_\ell$$

By [Equation 5] [Equation 17]:

$$w_q = \sum_{\ell \neq q} \alpha_\ell w_\ell \qquad \text{[Equation 7][Equation 21]}$$

so that at least one of the weight sets that comprises W cannot be chosen independently from others.

Note:

$$R = [r_1 \ldots r_J]$$

$$r_j = \begin{bmatrix} r_j 1 \\ \vdots \\ r_j R \end{bmatrix}$$

Theorem 2 (Independent Perceptron Limit): The number, P, of perceptrons that can be independently composed by choice of $\Theta$ is less than or equal to N, the number of R-groups.

Proof [Theorem 2]: By [Equation 7] [Equation 21], the number, P, of independent weight sets $w_p$ that can be composed by choice of $\Theta$ is upper-bounded by the number of independent $\gamma$e which is identically the column rank of $\Gamma$. The number of independent $\{\gamma\ell\}$ is upper-bounded by the dimension, N, of the $\{\gamma\ell\}$ which completes the proof.

U is fixed and $\Gamma$ is a deterministic or random (with known density) vector. In either case, solution of (or approximation to) [Equation 5] [Equation 17] can be approached as an optimization over binary matrices $\{\Theta\}$ using some norm such as component-wise mean square error between $\Theta_T U_T \Gamma$ (or $R^T \Gamma$) and some target W. When the thresholding function $\emptyset(\bullet)$ can be adjusted or when different thresholding functions $-\emptyset_i(\bullet)$ can be used after application of reagent $G_i$ then we can choose a set of nonzero constants $\{a_p\}$, $p=1, 2, \ldots P$ to relax [Equation 5] and obtain:

$$\Theta_T U_T \Gamma = R_T \Gamma = [\alpha_1 w_1 \ldots \alpha_P w_P] = WA \qquad \text{[Equation 8], where}$$

$$A = \begin{bmatrix} \alpha_1 & 0 & \ldots & 0 \\ 0 & \alpha_2 & \ddots & \vdots \\ \vdots & \ddots & \ddots & 0 \\ 0 & \ldots & 0 & \alpha_P \end{bmatrix}$$

Rewriting [Equation 8]:

$$\Theta^T U^T \Gamma = R^T \Gamma = WA \qquad \text{[Equation 9]}$$

Theorem 3 (Chemical Perceptron): Assuming the presence or absence of each of an ensemble of molecular mixtures as binary inputs, x J, the scalar $T_i$ as given in Equation 5] [Equation 16] represents a chemical multiply accumulate operation on the x1 using weights $W_i$J 0. Applying a threshold operator $\emptyset(\ )$ to $T_i$ results in the mathematical equivalent of the perceptron structure in FIG. 1.

Proof: [Theorem 3]: See the mathematical development leading to the statement of Theorem 2 and 3.

Accommodating positive and negative weights is straightforward because any weight vector w can be represented as:

$$w = w^+ - w^- \qquad \text{[Equation 18]}$$

where both $w^+$ and $w^-$ are non-negative as required by the development. We can therefore imagine:

One reagent G applied to two separate and different input mixture ensembles, $e^+$ and $e^-$.

Two regents $G^+$ and $G^+$ applied to duplicates of a single mixture ensemble 8.

In both cases we obtain indicators $T^+=x^Tw^+$ and $T^-=x^Tw^-$, so that:

$$T=T^+-T^-=x^T(w^+-w^-)=x^Tw \qquad \text{[Equation 19]}$$

Before considering specific approaches, some useful general observations can be made from the structure of [Equation 6] [Equation 20]. When any column of $\Gamma$, $\gamma_q$ depends linearly on another set of columns $\{\gamma\ell\}$, set of constants $\{\alpha\ell\}_{exists \, so}$:

$$\gamma_q = \sum_{\ell \neq q} \alpha_\ell \gamma_\ell$$

By [Equation 5]:

$$w_q = \sum_{\ell \neq q} \alpha_\ell w_\ell \qquad \text{[Equation 7][Equation 21]}$$

so that at least one of the weight sets that comprises W cannot be chosen independently from others.
Note:

$$R = [r_1 \, ... \, r_j]$$

$$r_j = \begin{bmatrix} r_j 1 \\ \vdots \\ r_j R \end{bmatrix}$$

$$\gamma_q = \sum_{\ell \neq q} \alpha_\ell \gamma_\ell$$

By [Equation 17] we must then have:

$$w_q = \sum_{\ell \neq q} a_\ell w_\ell \qquad \text{[Equation 21]}$$

so that at least one of the weight sets that comprises W cannot be chosen independently from others. We state the implication of [Equation 21] as a theorem:

Theorem 4 (Independent Perceptron (Weight Set) Limit): The number, P, of weight sets that can be independently composed by choice of e is less than or equal to R, the number of R-groups.

Proof [Theorem 4]: By [Equation 21], the number, P, of independent weight sets $w_P$ that can be composed by choice of $\Theta$ is upper-bounded by the number of independent $\gamma\ell$ which is identically the column rank of r. The number of independent $\{\gamma\ell\}$ is in turn upper-bounded by the dimension, R, of the $\{\gamma\ell\}$ which completes the proof.

U is fixed and $\Gamma$ is a deterministic or random (with known density) vector. In either case, the solution of (or approximation to) [Equation 5] [Equation 17] can be approached as an optimization over binary matrices $\{e\}$ using some norm such as component-wise total square error between $\Theta^TU^T\Gamma$ (or $R^T\Gamma$) and some target W. When the thresholding function $\phi(\cdot)$ can be adjusted or when different thresholding functions $\phi_1(\cdot)$ can be used after application of reagent G; then we can choose a set of nonzero constants $\{\alpha_p\}$, p=1, 2, ... P to relax [Equation 17] and obtain:

$$\Theta^TU^T\Gamma = R^T\Gamma = [\alpha_1 w_1 \, ... \, \alpha_P w_P] = WA \qquad \text{[Equation 22]},$$

where $$A = \begin{bmatrix} \alpha_1 & 0 & \cdots & 0 \\ 0 & \alpha_2 & \ddots & \vdots \\ \vdots & \ddots & \ddots & 0 \\ 0 & \cdots & 0 & \alpha_P \end{bmatrix} \qquad \text{[Equation 23]}$$

When only one threshold function $\phi(\cdot)$ can be used, then we can choose arbitrary $\alpha_p = \alpha \in \mathcal{R}^*$, p=1, 2, ... P.
Rewriting [Equation 22] as:

$$\Theta^TU^T\Gamma = R^T\Gamma = WA \qquad \text{[Equation 24]}$$

so that the total square error, $e^2$, between WA and its approximation $\Theta^TU^T\Gamma$ can be written as:

$$e^2 = \text{Trace}[(\Theta^TU^T\Gamma - WA)^T(\Theta^TU^T\Gamma - WA)] \qquad \text{[Equation 25]}$$

which we can also write as $$e^2 = \text{Trace}[(\Theta^TU^T\Gamma - WA)(\Theta^TU^T\Gamma - WA)^T] \qquad \text{[Equation 26]}$$

because $\text{Trace}[z^Tz] = \text{Trace}[zz^T]$ for any matrix Z. (Equation (25) and Equation (26) are definitions of the Frobenius norm $|e^Tu^Tr - WA|_r^2$.) When we then define $W' = WA$, the optimization is:

$$d_\Theta = \min_{(\Theta,A)} \text{Trace}[(\Theta^TU^T\Gamma - w)(\Theta^TU^T\Gamma - w)^T] \qquad \text{[Equation 12] [Equation 27]}$$

One can also pursue a less constrained optimization over R:

$$d_R = \min_{(R,A)} \text{Trace}[(R^T\Gamma - w)(R^T\Gamma - w)^T] \qquad \text{[Equation 13] [Equation 28]}$$

because the possible R are constrained by the $\Theta$, $d_\Theta \leq d_R$.

While chemical realization constraints confine R and $\Theta$ to be non-negative matrices, nothing in the mathematical development precludes their having both positive and negative elements. Going forward, we relax the non-negativity constraint and show how [Equation 18) can realize general weight sets with positive and negative elements.

Input composition optimization: optimization for fixed A. We first show that for fixed A the minimizations [Equation 13] [Equation 28] and [Equation 12] Equation 27] are convex in continuous R and $\Theta$, respectively, whether or not we restrict their component vectors to the non-negative orthant.

Theorem 5 ($d_R$ and $d_\Theta$: convexity in R and $\Theta$): When A is fixed, $d_R$ and $d_\Theta$ are convex optimizations in continuous R and $\Theta$, respectively, over convex search spaces. $d_R$ and $d_\Theta$ are strictly convex with unique solutions iff there are R linearly independent yield vectors, $\gamma_p$.

Proof [Theorem 5]: Let $A \in (0,1)$. When we set $R = \lambda R_1 + (1-\lambda)R_2$, convexity of $d_R$ requires $$\text{Trace}[(R^T\Gamma - \tilde{w})(R^T\Gamma - \tilde{w})^T] \leq \lambda \text{Trace}[(R_1^T\Gamma - \tilde{w})(R_1^T\Gamma - \tilde{w})^T] + (1-\lambda)\text{Trace}[(R_2^T\Gamma - \tilde{w})(R_2^T\Gamma - \tilde{w})^T] \qquad \text{[Equation 29]}$$

for any two different $R_1$ and $R_2$.

Strict convexity further requires equality iff A=0 or A=1. Expansion and rearrangement of [Equation 29] produces the inequality:

$$-\lambda(1-\lambda)\text{Trace}[(R_1-R_2)^T\Gamma\Gamma^T(R_1-R_2)] \leq 0 \qquad \text{[Equation 30]}$$

which is satisfied because $\text{Trace}[ZZ^T] \geq 0$ for any real matrix Z. Therefore $d_R$ is convex. Furthermore, $d_R$ is strictly convex iff $\Gamma\Gamma^T$ has rank 'R, so as to preclude $(R_1-R_2)^T\Gamma = 0$ for some choice of $R_1 \neq R_2$. $\Gamma\Gamma^T$ has rank $\mathcal{R}$ iff $\exists$ $\mathcal{R}$ linearly independent $\gamma_P$ which comprise r. The structure of $d_\Theta$ is identical to that of $d_R$. So, assuming continuous $\Theta$, the same argument for convexity of $d_\Theta$ applies.

Finally, the $r_j$ and $\theta_j$ which comprise R and $\Theta$, respectively, are confined to the non-negative orthant—a convex search space for R and $\Theta$. When the positivity constraint on R and $\Theta$ is relaxed, the search space is still convex. Thus, $d_R$ and $d_\Theta$ are convex optimizations over convex spaces. Strict convexity implies unique solutions, thus completing the proof.

Because $d_R$ and $d_\Theta$ are convex, efficient numerical methods exist to find optimizing continuous R* and $\Theta^*$. Feasible solutions for [Equation 12] [Equation 27] and [Equation 13] [Equation 28] are integer matrices. But once continuous R* and $\Theta^*$ are identified, the continuity of $d_R$ and $d_\Theta$ in their arguments allow us to examine feasible discrete solutions within the neighborhoods of R* and $\Theta^*$. The quality of these discrete solutions (essentially quantizations) depends upon their coarseness regarding the metrics' variation in the continuous search space. Therefore, solutions can be improved through choice of A.

Choosing A. Consider R' a continuous solution to [Equation 13] [Equation 28] for an arbitrary A which produces minimum error:

$$(e^*)^2 = \text{Trace}[((R^*)^T\Gamma - \tilde{w})((R^*)^T\Gamma - \tilde{w})^T]$$

Then, the integer approximation $\check{R}^*$ to R* is obtained by rounding. We define $\Delta$ so $R^* = \check{R} + \Delta$ and note that each element of $\Delta$ cannot have magnitude larger than 1. Then consider that when $\hat{W}$ is replaced by $\alpha\hat{W}$, the optimizing R* becomes a R* and the integer matrix solution obeys $\alpha R^* = \check{R} + \Delta$. Applying $\check{R}$ to [Equation 13] [Equation 28] produces:

$$e^2 = \text{Trace}\left[\left(\left(R^* - \frac{\Delta}{\alpha}\right)^T \Gamma - \tilde{w}\right)\left(\left(R^* - \frac{\Delta}{\alpha}\right)^T \Gamma - \tilde{w}\right)^T\right]$$

As $\alpha \to \infty$, $e^2 \to (e^*)^2$. Thus, larger $\alpha$ produces better discrete approximation of R*. As [Equation 12] [Equation 27] is structurally equivalent to [Equation 13] [Equation 28], the same argument applies to integer approximations of $\Theta^*$. Therefore, we can seek continuous solutions to [Equation 12] [Equation 27] and [Equation 13] [Equation 28] for A=I and then scale its elements until performing the integer matrix approximation is sufficiently close to that of the optimal continuous solution, at least within practical limits of chemical mixture composition. The choice of the $\alpha_P$ in [Equation 23] depends on the coarseness with which the corresponding $R^T\gamma_p$ and $\Theta_T U^T\gamma_p$ approximate $w_p$. The choice of the $\alpha_p$ depends upon the coarseness with which the corresponding $r_p$ and $\theta_p$ approximate $w_p$.

Optimization with random $\Gamma$. For the case of random equilibrium vectors $\gamma_P$ the optimizations are still convex, as stated in the following lemma:

Lemma 1 (Random $\Gamma$): When r is random with mean f' and correlation $E[\Gamma\Gamma^T] = K_\Gamma$, then the optimizations $d_R$ and $d_\Theta$ remain convex, and strictly convex iff the $K_\Gamma$ is positive definite.

Proof [Lemma 1]: When the equilibrium vectors $\gamma_p$ are random, the optimizations $d_R$ and $d_\Theta$ are replaced with optimizations of $E[d_R]$ and $E[d_\Theta]$ respectively. The optimizations are still convex because $\Gamma\Gamma^T$ in the proof of Theorem 5 is replaced by the positive semi-definite correlation matrix $E[\Gamma\Gamma^T] = K_\Gamma$ so that [Equation 30] is still satisfied. When $K_\Gamma$ is positive definite (full rank) then the optimizations are strictly convex.

We again formulate the optimization problem, because it is important to understand how r randomness can affect perceptron performance. [Equation 13] [Equation 28] becomes $$E[d_R] = \min_{R,A} E[\text{Trace}[(R^T\Gamma - \tilde{W})(R^T\Gamma - \tilde{W})^T]] \quad \text{[Equation 31]}$$

Expanding and regrouping we obtain $$E[d_R] = \min_{R,A} \text{Trace}\left[R^T C_\Gamma R + (R^T\tilde{\Gamma} - \tilde{W})(R^T\tilde{\Gamma} - \tilde{W})^T\right] \quad \text{[Equation 32]}$$

When we require an unbiased W estimator, then the optimizing R* must obey:

$$E[(R^*)^T\Gamma - \tilde{W}] = (R^*)^T\tilde{\Gamma} - \tilde{W} = 0$$

The optimization of [Equation 32] then becomes:

$$E[d_R] = \min_{\substack{R,A \\ R^T\tilde{\Gamma} = \tilde{W}}} \text{Trace}[R^T C_\Gamma R] \quad \text{[Equation 33]}$$

Evaluating [Equation 32] with the optimum R* produces a minimum total squared weight error of:

$$E[d_R] = \text{Trace}[(R^*)^T C_\Gamma R^*] \quad \text{[Equation 34]}$$

The optimization in $\Theta$ [Equation 27] can be similarly formulated and a similar expression for $E[d_\Theta]$ derived.

Realization of Weight Sets With ± Values. While the chemistry precludes single-pot direct realization of W with negative weights ($\gamma$ elements cannot be negative), the preceding mathematical development was general. When we allow two pots—one representing positive weights and the other representing negative weights as in [Equation 18] and [Equation 19]—we can realize general weight matrices by:
 using one input mixture set and two reagents per perceptron, or
 using two different input mixture sets and one reagent per perceptron.

Because reaction characterization could be time-intensive, we consider only the second possibility of duplicate multiple input mixtures.

Thus, let $R = R^+ - R^-$ where the $R^\pm$ are non-negative. Substituting $R = R^+ - R^-$ into [Equation 28] produces:

$$\text{Trace}[(R^+ - R^-)^T\Gamma - \tilde{w})((R^+ - R^-)^T\Gamma - \tilde{w})^T] \quad \text{[Equation 35]}$$

Given the optimization of [Equation 28] is convex, the optimization in non-negative orthant $R^+$ is convex for fixed $R^-$, as is the optimization of non-negative orthant $R^-$ for fixed $R^+$. The joint optimization in $R^+$ and $R^-$ is convex. The same argument applies to the optimization of [Equation 27] for $\Theta = \Theta^+ - \Theta^-$.

To implement W with positive and negative values we can either find an unconstrained R which minimizes [Equation 28] and decompose it directly into non-negative $R^+$ and $R^-$ (as opposed to separately approximating $W^\pm$ with non-negative $R^\pm$ which in general could be suboptimal). Alternatively, we could:
 fix $R^-(\Theta^-)$ and find the corresponding optimal non-negative $R^+(\Theta^+)$ fix $R^+(\Theta^+)$ and find the corresponding optimal non-negative $R^-(\Theta)^-$)

repeat until convergence.

Direct decomposition is efficient while iterative search can allow additional chemistry-related constraints to be applied to where the $\mathcal{R}^{\pm}$ separately.

Noisy Weight Sets. Weight approximation can be coarse and chemical reactions are stochastic processes. Thus, $R^T T$ realization may not be identically equal to the target W owing to approximation error, yield randomness, or both causes. The weights will likely be noisy and such noise can cause misclassification of inputs.

Assuming a simple weight noise model and an equally simple binary classification problem, we derive an expression for the excess error imposed by noisy weights.

To begin, consider that a perceptron distinguishes between two classes A and B by the decision rule:

$$x^T w \overset{A}{\underset{B}{\gtreqless}} \beta \qquad \text{[Equation 36]}$$

Where $\beta \in E\mathcal{R}$ is some threshold. With no loss of generality, we assume $\beta=0$. Thus, the weight set vector w defines a plane:

$$x^T w = 0 \qquad \text{[Equation 37]}$$

above or below which we assign inputs to A and B, respectively. The $\{x\}$ which satisfy [Equation 37] are orthogonal to w. Thus, the vector:

$$\hat{p} = \frac{w}{|w|}$$

is exactly the unit normal to the decision plane, P, and a given input's distance to P is then:

$$d(x,P)=x^T \hat{p}$$

When the training set inputs are drawn from the following simple i.i.d. Gaussian distributions centered on $\pm z$ as in:

$$f_X(x \mid A) = \left(\frac{1}{\sqrt{2\pi\sigma^2}}\right)^J e^{-\frac{|x-z|^2}{2\sigma^2}}, \text{ and:} \qquad \text{[Equation 38]}$$

$$f_X(x \mid B) = \left(\frac{1}{\sqrt{2\pi\sigma^2}}\right)^J e^{-\frac{|x+z|^2}{2\sigma^2}} \qquad \text{[Equation 39]}$$

where z=bp, b>0 being a measure of how distinguishable the hypotheses are.

When the hypotheses are equiprobable, the optimal decision rule for guessing A or B is exactly [Equation 3] and the irreducible probability of classification error is:

$$P_e = \frac{1}{\sqrt{2\pi}} \int_{\frac{b}{\sigma}}^{\infty} e^{-s^2/2} ds \equiv Q\left(\frac{b}{\sigma}\right) \qquad \text{[Equation 40]}$$

We define the ratio $b/\sigma$ as the classification signal-to-noise ratio, $\chi$.

For simplicity, the weight set is perturbed by a zero mean i.i.d. Gaussian noise vector n, each element of variance $N_0$. Then the perturbed weight set w is:

$$f_N(n) = \left(\frac{1}{\sqrt{2\pi N_0}}\right)^J e^{-\frac{|n|^2}{2N_0}} \qquad \text{[Equation 41]}$$

The perturbation effectively rotates the nominal decision plane so given n, the probability of error becomes:

$$P_{e|n} = \frac{1}{2} \int_{x^T(w+n)<0} \left(\frac{1}{\sqrt{2\pi\sigma^2}}\right)^J e^{-\frac{|x-z|^2}{2\sigma^2}} dx + \qquad \text{[Equation 42]}$$

$$\frac{1}{2} \int_{x^T(w+n)>0} \left(\frac{1}{\sqrt{2\pi\sigma^2}}\right)^J e^{-\frac{|x+z|^2}{2\sigma^2}} dx$$

However, taking the decision plane perspective, we see that noise rotates the antipodal points $\pm z$ regarding the decision plane. Symmetry (noise and point set) dictate that the probability of misclassification depends only on the distance between the points $\pm z$ and the noisy plane P':

$$d(z, P') = z^T \hat{p}' \text{ where } \hat{p}' = \frac{\tilde{w}}{|\tilde{w}|}.$$

And such rotation can only increase the probability of misclassification.

Therefore, the probability of misclassification becomes above or below which we assign inputs to A and B, respectively. The $\{x\}$ which satisfy [Equation 37] are orthogonal to w. Thus, the vector is exactly the unit normal to the decision plane, P, and a given input's distance to P.

The probability of misclassification becomes:

$$P_{e|n} = Q\left(\frac{z^T \hat{p}'}{\sigma}\right) = Q\left(x\left(\frac{|w| + w^T \frac{n}{|w|}}{|w+n|}\right)\right) \qquad \text{[Equation 43]}$$

Rewriting:

$$\frac{|w| + w^T \frac{n}{|w|}}{|w+n|} = \frac{1 + \hat{p}^T \frac{n}{|w|}}{\left|\hat{p} + \frac{n}{|w|}\right|},$$

and then noting that because $|\hat{p}^T n| \leq |n|$, $$\left(\frac{1 + \hat{p}^T \frac{n}{|w|}}{\left|\hat{p} + \frac{n}{|w|}\right|}\right)^2 = \frac{1 + 2\frac{\hat{p}^T n}{|w|} + \frac{(\hat{p}^T n)^2}{|w|^2}}{1 + 2\frac{\hat{p}^T n}{|w|} + \frac{|n|^2}{|w|^2}} \leq 1, \qquad \text{[Equation 44]}$$

we can define:

$$\delta(n) = \frac{1 + \hat{p}^T \frac{|n|}{|w|}}{\left|\hat{p} + \frac{n}{|w|}\right|}$$

as the excess error factor which multiplies the minimum error coefficient x so that:

$$P_{e|n} = Q(\lambda \delta(n))$$

We see that $P_{e|n}$ is minimized when $\delta(n)=1$, maximized when $\delta(n)=-1$, and for $\delta(n)=0$, classification is random ($P_{e|n}=0.5$).

Owing to noise symmetry, we can with no loss of generality set $w=|w|e_1$ where $e_k$ is the $k^{th}$ canonical unit vector with 1 in the $k^{th}$ dimension and zero elsewhere. [For exquisite classification (x=8), weight imprecision much beyond 9% results in poor performance. However, when the perceptron is only 98% accurate to start (x=2), then only 25% weight precision is necessary.] We then have $p=e_1$ so that:

$$P_{e|n} = Q\left(x\left(\frac{1+\frac{n_1}{|w|}}{\left|e_1 + \frac{n}{|w|}\right|}\right)\right) \qquad \text{[Equation 45]}$$

where $n_1$ is the first component of n. The magnitude term in the denominator of [Equation 45] can then be written as:

$$\left|e_1 + \frac{n}{|w|}\right|^2 = \left[\left(1+\frac{n_1}{|w|}\right)^2 + \sum_{j=2}^{J}\left(\frac{n_j}{|w|}\right)^2\right]$$

However, for very large J, the law of large numbers implies that:

$$\frac{1}{J}\left|e_1+\frac{n}{|w|}\right|^2 \approx \frac{1}{J}\left(1+\frac{n_1}{|w|}\right)^2 + \frac{N_0}{|w|^2},$$

so that when we define:

$$\xi^2 = \frac{|w|^2}{E[|n|^2]} = \frac{|w|^2}{JN_0}, \text{ then}$$

$$\frac{\frac{1}{J}\left(1+\frac{n_1}{|w|}\right)^2}{\frac{1}{J}\left|e_1+\frac{n}{|w|}\right|^2} \approx \frac{\left(1+\frac{n_1}{|w|}\right)^2}{\left(1+\frac{n_1}{|w|}\right)^2 + \frac{1}{\xi^2}},$$

so the overall expected probability of error owing to weight approximation noise is roughly:

$$P'_e \approx \left(\frac{\xi^2}{2\pi}\right)^{1/2} \int_{-\infty}^{\infty} Q\left(\frac{x(1+x)}{\sqrt{(1+x)^2+\frac{1}{\xi^2}}}\right)e^{-\frac{x^2\xi^2}{2}}dx \qquad \text{[Equation 46]}$$

We can also apply [Equation 46] when weight uncertainty is owed to stochastic reactivity rather than quantization (or other estimation) error. When r is a random matrix, the total square error from [Equation 34] provides a measure of how well the perceptron implementation is likely to perform. When we equate $E|d_R|+PJN_0$, and define the average weight energy as:

$$|\overline{w}|^2 = \frac{1}{P}\sum_{p=1}^{P}|w_p|^2 = \frac{1}{P}|W|_f^2,$$

then we can write $$\xi^2 = \frac{|W|_f^2}{\text{Trace}[(R^*)^T C_\Gamma R^*]} \qquad \text{[Equation 47]}$$

and use [Equation 46] as a performance predictor of chemical perceptron realizations with random yield matrices as well input composition construction imprecision.

Figure 4:
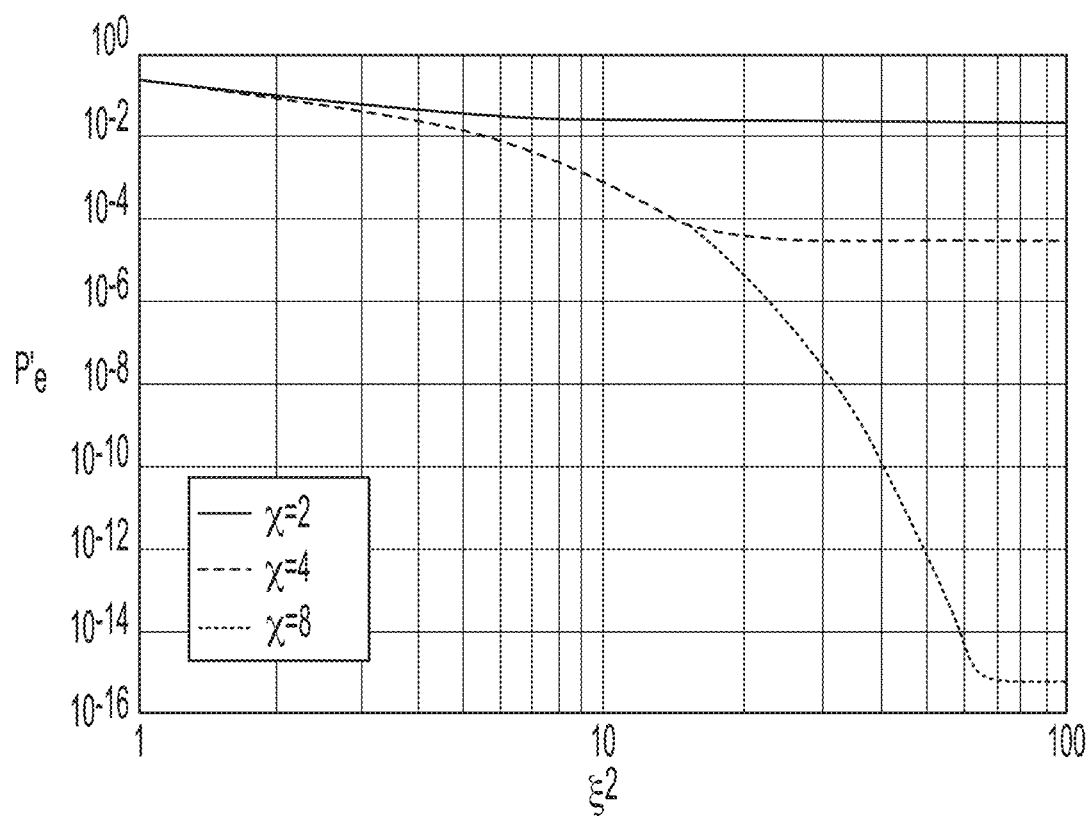
FIG. 4 is a graph showing $P_e'$ vs. $\zeta^2$ for $\chi \in \{2, 4, 8\}$. Misclassification error rates $P_e$ with zero weight noise ($N_0=0$) are $2.27\times10^{-2}$, $3.17\times10^{-6}$ and $6.22\times10^{-16}$ for x=2, 4, 8, respectively. The plots of in this drawing show that performance degradation depends on the baseline (zero weight noise) reliability of the given perceptron.

Plots of [Equation 46] are provided in FIG. 4, where we see performance degradation depends on the baseline (zero weight noise) reliability of the given perceptron. For instance, for exquisite classification (x=8), weight imprecision much beyond 9% results in poor performance. When the perceptron is only 98% accurate to start (x=2), then only 25% weight precision is necessary.

Thus, [Equation 46] serves both as a guide for the choice of A to keep quantization noise within accept-able bounds, and as an indicator of achievable performance when reaction yields are uncertain.

Numerical example. For a two-perceptron system based on 8 available R-groups and two reagents $G_1$ and $G_2$ with reaction product matrix $\Gamma$:

$$\Gamma = \begin{bmatrix} \frac{1}{8} & \frac{1}{4} & \frac{3}{8} & \frac{1}{2} & \frac{5}{8} & \frac{3}{4} & \frac{7}{8} & 1 \\ 1 & \frac{7}{8} & \frac{3}{4} & \frac{5}{8} & \frac{1}{2} & \frac{3}{8} & \frac{1}{4} & \frac{1}{8} \end{bmatrix}$$

The $\Gamma$ is illustrative, but exact r values may be taken from the literature for different types of reactions. Then assume that molecules $m_m$ are 2-mers with distinct R-groups, so that the total number of different molecules is 28 (i.e., $_2^8$) and the total number of (non-zero) mixtures is $2^{28}-1$.

A weight matrix for 4-input perceptrons with values chosen randomly between zero and one can be:

$$(W)^T = \begin{bmatrix} 0.40 & 0.76 & 0.50 & 0.39 \\ 0.77 & 0.55 & 0.12 & 0.68 \end{bmatrix}$$

Numerically solving the implicit quadratic programming problem of [Equation 13] [Equation 28] with A=I yields:

$$R^* = \begin{bmatrix} 0.462 & 0.013 & 0 & 0.294 \\ 0 & 0.356 & 0 & 0.0125 \\ 0.129 & 0.0005 & 0 & 0.0074 \\ 0.046 & 0.0001 & 0 & 0.516 \\ 0.2799 & 0.238 & 0 & 0.0635 \\ 0.0968 & 0.014 & 0.009 & 0.00005 \\ 0.0193 & 0.261 & 0.39 & 0.055 \\ 0.00595 & 0.281 & 0.152 & 0.0005 \end{bmatrix}, \text{ so that:}$$

$$\hat{W}^T = \begin{bmatrix} 0.3995 & 0.759488 & 0.5 & 0.389 \\ 0.769319 & 0.549563 & 0.119875 & 0.678569 \end{bmatrix}$$

Producing the integer matrix approximation to R* is then a matter of scaling. Scaling by $10^5$ will produce the same precision as the original in this EXAMPLE, though scaling by a smaller number may also provide sufficient weight approximation given the robustness of neural networks.

When the number of R-groups is set at $\mathcal{R}=10$, the number of perceptron inputs J=10 and the number of perceptrons P=2. Then, for the following J×P weight matrix W, each element chosen i.i.d. N(0,1):

$$W = \begin{bmatrix} 0.78 & 1.368 \\ 1.743 & 0.387 \\ -0.101 & 0.078 \\ 0.627 & 0.453 \\ -0.866 & -1.16 \\ -1.45 & -0.297 \\ -2.847 & 0.222 \\ 1.851 & -2.177 \\ 0.867 & 0.744 \\ 0.372 & 0.291 \end{bmatrix}$$

Reagent yield matrix Γ, each element chosen i.i.d. from a uniform distribution on (0,1):

$$\Gamma = \begin{bmatrix} 0.613 & 0.426 \\ 0.287 & 0.703 \\ 0.836 & 0.91 \\ 0.098 & 0.068 \\ 0.653 & 0.707 \\ 0.13 & 0.183 \\ 0.544 & 0.617 \\ 0.897 & 0.01 \\ 0.962 & 0.862 \\ 0.219 & 0.648 \end{bmatrix}$$

Numerical calculation of the optimal continuous $\mathcal{R}^\pm$ according to [Equation 35] (shown here to three decimal places) yields:

$$(R^+)^T = \begin{bmatrix} 0.078 & 0.372 & 0.324 & 0.012 & 0.251 & 0.078 & 0.228 & 0 & 0.251 & 0.358 \\ 0.365 & 0 & 0.183 & 0.059 & 0.145 & 0 & 0.094 & 1.123 & 0.387 & 0 \\ 0 & 0.051 & 0.01 & 0 & 0.007 & 0.008 & 0.01 & 0 & 0 & 0.063 \\ 0.108 & 0.022 & 0.13 & 0.017 & 0.101 & 0.018 & 0.083 & 0.195 & 0.16 & 0.01 \\ 0 & 0 & 0 & 0 & 0 & 0 & 0 & 0.088 & 0 & 0 \\ 0 & 0.271 & 0 & 0 & 0 & 0.011 & 0 & 0 & 0 & 0.298 \\ 0 & 0.877 & 0 & 0 & 0 & 0.078 & 0 & 0 & 0 & 0.929 \\ 0.573 & 0 & 0 & 0.094 & 0 & 0 & 0 & 2.921 & 0.244 & 0 \\ 0.142 & 0.081 & 0.203 & 0.023 & 0.158 & 0.033 & 0.133 & 0.101 & 0.228 & 0.065 \\ 0.063 & 0.023 & 0.081 & 0.01 & 0.064 & 0.012 & 0.053 & 0.1 & 0.096 & 0.016 \end{bmatrix}$$ and $$(R^-)^T = \begin{bmatrix} 0 & 0 & 0 & 0 & 0 & 0 & 0 & 0.295 & 0 & 0 \\ 0 & 0.313 & 0 & 0 & 0 & 0.011 & 0 & 0 & 0 & 0.345 \\ 0.028 & 0 & 0 & 0.005 & 0 & 0 & 0.132 & 0.016 & 0 \\ 0 & 0 & 0 & 0 & 0 & 0 & 0 & 0 & 0 & 0 \\ 0.112 & 0.259 & 0.287 & 0.0180 & 0.223 & 0.062 & 0.197 & 0 & 0.255 & 0.243 \\ 0.306 & 0 & 0.147 & 0.049 & 0.117 & 0 & 0.074 & 0.951 & 0.831 & 0 \\ 0.658 & 0 & 0.125 & 0.107 & 0.104 & 0 & 0.021 & 2.405 & 0.578 & 0 \\ 0 & 1.441 & 0.331 & 0 & 0.249 & 0.192 & 0.302 & 0 & 0 & 1.475 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix}$$

Note that:

$$W^+ = \begin{bmatrix} 0.78 & 1.368 \\ 1.743 & 0.387 \\ 0 & 0.078 \\ 0.627 & 0.453 \\ 0 & 0 \\ 0 & 0 \\ 0 & 0.222 \\ 1.851 & 0 \\ 0.867 & 0.744 \\ 0.372 & 0.291 \end{bmatrix} \text{ differs from: } (R^+)^T\Gamma = \begin{bmatrix} 1.044 & 1.371 \\ 1.910 & 0.832 \\ 0.051 & 0.106 \\ 0.627 & 0.453 \\ 0.079 & 0.001 \\ 0.144 & 0.385 \\ 0.465 & 1.233 \\ 3.217 & 0.49 \\ 0.867 & 0.744 \\ 0.372 & 0.291 \end{bmatrix}$$

although there may exist some $R_\pm$ which separately provide good approximations to $W^\pm$ besides providing jointly good approximations to W.

Then, consider the weight estimation accuracy $|R^T\Gamma - W|_f^2$ for different R precisions and the corresponding $\zeta^2$ as shown in TABLE I. According to FIG. 4 (via [Equation 46]), multiplying W by 100 ($A=10^2 I$) and rounding the optimal $R^\pm$ results to the nearest integer would yield an accurate integer implementation of perceptrons designed for high quality classification.

TABLE I

| $R^\pm$-precision | $|R^T\Gamma - W|_f^2$ | $\xi^2$ |
|---|---|---|
| Full | $2.1 \times 10^{-30}$ | $1.4 \times 10^{31}$ |
| 3 decimal digit | $5.5 \times 10^{-6}$ | $5.2 \times 10^{6}$ |
| 2 decimal digit | $4.4 \times 10^{-4}$ | $6.5 \times 10^{4}$ |

Weight error and for different precision approximations to the optimal continuous R.

Now consider $\Theta^\pm$ which we produce by assuming each molecule is formed with 4 of 10 different R-groups for a total of 210 molecules. We compose the binary (10×210) matrix U to obtain the least squares solution to [Equation 27].

TABLE II is the analog to TABLE I for different precision $\Theta^{\pm}$ derived from the continuous $\Theta$. Here, according to FIG. 4 (via [Equation 46]), multiplying W by 1000 ($A=10^3 I$) and rounding the optimal $\Theta$ result to the nearest integer would yield an accurate integer implementation of perceptrons designed for near perfect classification. We attribute the poorer precision tolerance of $\Theta$ relative R to the granularity induced by the relative paucity of different molecules (210) in this 10 R-group construction.

TABLE II

| $\Theta^{\pm}$-precision | $|\Theta^T U^T T - W|_f^2$ | $\xi^2$ |
|---|---|---|
| Full | $1.1 \times 10^{-29}$ | $4.8 \times 10^{29}$ |
| 3 decimal digit | $2.5 \times 10^{-3}$ | $1.1 \times 10^4$ |
| 2 decimal digit | 2.5 | 11 |

Weight error and $\xi^2$ for different precision approximations to the optimal continuous $\Theta$.

Example 2

Parallelized Linear Classification with Volumetric Chemical Perceptrons"

Introduction and summary. This EXAMPLE 2 introduces a linear classifier that is implemented in a chemical form. This EXAMPLE 2 also discloses an encoding technique that simultaneously represents multiple datasets in an array of microliter-scale chemical mixtures. Parallel computations on these datasets are performed as robotic liquid handling sequences. These outputs are analyzed by high-performance liquid chromatography.

This invention combines aspects of chemical and electrical information systems. Paired with appropriate chemical analysis tools, this approach can operate with increasingly parallel datasets. This invention provides computational efficiency and massive parallelism comes with computing in chemical domains.

For more information, see Arcadia, et al., "Parallelized linear classification with volumetric chemical perceptrons," in, Proceedings of the IEEE Conference on Rebooting Computing (ICRC) (2018), which is incorporated by reference.

This EXAMPLE 2 presents a method for implementing linear classification operations using chemical mixtures. Binary input data is encoded in the chemical composition of an array of liquid samples, and a robotic fluid handler is programmed to perform multiplications and additions as fractional volume transfers and pooling operations. The chemical coding enables parallel computation and allows for increased information density. The result of the volumetric operations is represented in the concentration of chemicals in output pools, which are analyzed using high performance liquid chromatography. The inventors used this system for parallel classification of several 16×16 binary MNIST images of handwritten digits (see, LeCun et al., "Gradient-based learning applied to document recognition." Proc. of the IEEE, 86(11), 2278-2324 (1998)), as well as a set of pseudo-random binary vectors. Thus, the inventors demonstrated the overall accuracy of the method, producing 55 correct classifications out of 57 tests.

This EXAMPLE 2 provides a class of chemical-domain computational engines which can operate on increasingly parallel datasets. Chemical computation will find applications in ultra-low-power systems, extreme environments, and as complements to electronic computing systems. Adleman, "Molecular computation of solutions to combinatorial problems," Science, 266(5187), 1021-1024 (1994). DNA archival data storage can complement traditional electronic media. See, Church, Gao & Kosuri, Science, 337(6102), 1628 (September 2012); Bornholt et al., "A DNA-based archival storage system," ACM SIGOPS Operating Systems Review, 50(2), 637-649, (2016); and Goldman et al., "Towards practical, high-capacity, low-maintenance information storage in synthesized DNA," Nature, 494(7435), 77 (2013). Neural-inspired computing provided the ability for those skilled in the molecular computing art to process large datasets. See, Krizhevsky et al., "Imagenet classification with deep convolutional neural networks," in Advances in Neural Information Processing systems, (2012), pp. 1097-1105; Graves et al., "Speech recognition with deep recurrent neural networks," in Acoustics, Speech and Signal Processing (ICASSP), 2013 IEEE International Conference on. IEEE (2013), pp. 6645-6649; Lawrence et al., "Face recognition: A convolutional neural-network approach," IEEE Transactions on Neural Networks, 8(1), 98-113 (1997); Tann et al., "Flexible deep neural network processing," arXiv, 2018. Available: http://arxiv.orq/abs/1801.07353. Chemical-domain computation thus provides an advantageous ways of leveraging the information processing capabilities of natural elements.

An electrical system cannot fully recreate the massive parallelism and emergent properties that come from the diversity of subtle molecular interactions and coexistence of thousands of unique chemical compounds. See, Rose et al., "Computing with chemicals: Perceptrons using mixtures of small molecules," in 2018 IEEE International Symposium on Information Theory (ISIT), (June 2018), pp. 2236-2240 [EXAMPLE 1]; Kennedy et al., "Spatiotemporal information preservation in turbulent vapor plumes," Applied Physics Letters, 112(26), 264103 (2018); Huang et al., "Molecular neuron: From sensing to logic computation, information encoding, and encryption," Sensors and Actuators B: Chemical, 239, 704-710 (2017); Salehi et al., "Molecular Sensing and Computing Systems," IEEE Transactions on Molecular, Biological and Multi-Scale Communications, 1(3), 249-264 (2015). See also, Erlich & Zielinski, "DNA fountain enables a robust and efficient storage architecture," Science, 355(6328), 950-954 (2017); Shipman et al., "CRISPR-Cas encoding of a digital movie into the genomes of a population of living bacteria," Nature, 547(7663), 345 (2017). Organick et al., "Random access in large-scale DNA data storage," Nature Biotechnology, 36(3); 242 (2018).

Accordingly, this EXAMPLE 2 is directed toward develop a computational framework to concurrently process digital information represented in solutions of chemical compounds. This EXAMPLE 2 provides methods for chemical encoding, computation, and readout.

This EXAMPLE 2 also provides an approach to computing with chemical solutions. This EXAMPLE 2 provides a method to encode binary data into the chemical composition of liquid samples. This EXAMPLE 2 provides shows that multiple datasets can be stored in parallel with multiple coexisting chemicals.

This EXAMPLE 2 uses programmable robotic liquid handling sequences to perform volumetric multiply accumulate (MAC) operations on parallelized chemical datasets. This EXAMPLE 2 uses high-performance liquid chromatography to read and verify the results of the chemical calculations. This EXAMPLE 2 provides a description of the system developed to perform these functions.

This EXAMPLE 2 demonstrates linear classification of several MNIST images and Boolean test vectors. This EXAMPLE 2 demonstrates the chemically encoding of several images of handwritten digits from the MNIST database, and implements several single layer volumetric chemical perceptrons which successfully classify the images. This EXAMPLE 2 additionally quantifies the performance of our method with a larger set of binary vectors.

This EXAMPLE 2 provides ways to scale and extend our chemical computation scheme.

This EXAMPLE 2 is intended as an advance towards realizing general-purpose chemical-domain computational tools. By demonstrating that the proposed method can reliably perform these operations, chemical mixtures are shown to provide an interesting basis for alternative computing.

Mass Conservation in Chemical Mixtures. When working with well-mixed solutions and there are no chemical reactions in these solutions, then the simplest constraint is the conservation of mass. When two or more volumes containing the same chemical are combined, the final mixture will have a concentration that is a linear function of the concentrations of that chemical in each of the sources.

When a mixture of N sources, each containing a concentration $C_i$ of a certain chemical, is formed by transferring a volume $V_i$ from each source to a common destination, then the final concentration will be given as:

$$C_f = \sum_{i=1}^{N} \frac{V_i}{V_f} \cdot C_i \quad \text{[Equation A]}$$

where $V_i \cdot C_i$ is the total mass of the chemical added to the destination and $V_f$ is the final total volume in the destination. Compare this [Equation A] to [Equation I]. This [Equation A] can be extended through linear superposition to mixtures of different chemical species, as long as they do not interact with each other. This simple relationship forms the basis for our parallel chemical computation.

Figure 5:
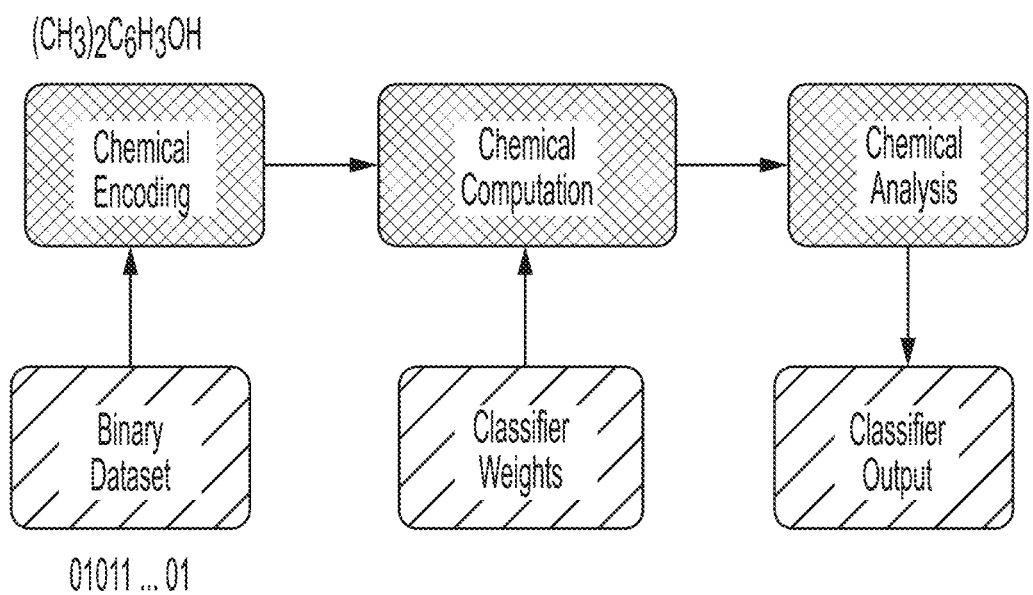
FIG. 5 is a conceptual block diagram of the chemical computation scheme. Binary datasets are encoded into discretized mixtures of chemicals. Computations can be performed on these chemical mixtures through quantitative sampling, based on the desired classifier's weights, and mixing of their contents. The computation output is initially in the chemical domain, and can be assessed using analytical chemistry techniques.

Method for chemical computing. A high-level summary of the proposed computation scheme is shown in FIG. 5, which shows the encoding the ones and zeros of a binary dataset into a pattern of chemicals in an array of isolated fluid volumes. After translating the data to chemical form, we query the chemical dataset by performing the volumetric MAC operations needed to implement a single layer perceptron. The chemical output of the MAC stage is analyzed to measure the concentrations of its information-carrying compounds. Finally, we threshold the concentrations of each compound in the output pools to produce the perceptron's Boolean labels.

Analogies between electrical and chemical domains. In TABLE I, "ANALOGIES BETWEEN ELECTRICAL AND CHEMICAL DOMAINS," the parameters of a chemical mixture-based system relate to familiar electrical terms. An advantage of data storage and processing with chemicals is the parallelism that can be achieved by operating with multiple coexisting chemical species.

| ANALOGIES BETWEEN ELECTRICAL AND CHEMICAL DOMAINS | | |
|---|---|---|
| Domain | Electrical | Chemical |
| Information Carrier | Electrons | Molecules |
| Digital '1' | High Voltage | High Concentration |
| Digital '0' | Low Voltage | Low Concentration |
| Transport Medium | Conductor | Solvent |

This potential is realized in many biological contexts, such as in bacterial communication [Taga & Bassler, "Chemical communication among bacteria," Proceedings of the National Academy of Sciences, U.S.A., 100(suppl. 2), 14549-14554, (2003)] and neural signaling [Bloom, "The functional significance of neurotransmitter diversity," American Journal of Physiology-Cell Physiology, 246(3), C184-C194 (1984)]. Another benefit of chemical data storage is its potentially high information density, as has been noted for DNA [Church et al, "Next-generation digital information storage in DNA," Science, p. 1226355, 2012; Bornholt et al., "A DNA-based archival storage system," ACM SIGOPS Operating Systems Review, 50(2), 637-649 (2016)].

Encoding Data in Chemical Mixtures. To carry out computation in the chemical mixture domain, we first create a representation for our data. Because chemically expressed data is stored in microwell plates, we map each well position to one bit in the input data. The value of the data at a given position is represented by a high concentration ('1') or low concentration ('0') of a designated chemical. This strategy can be extended to multi-bit concentration coding schemes, with the trade-off of reduced noise margin.

Figure 6:
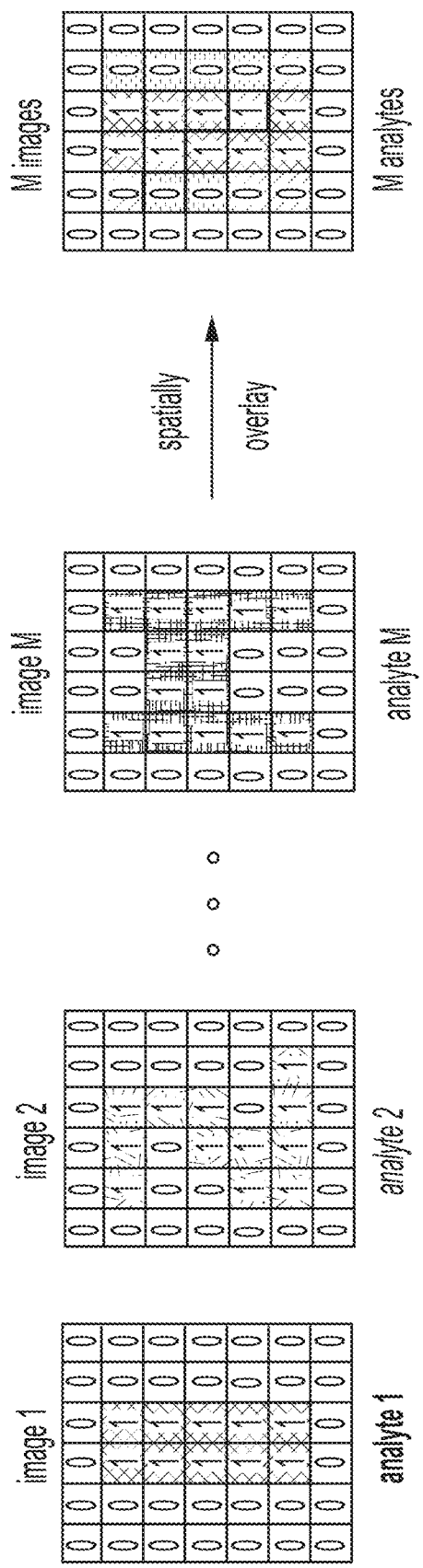
FIG. 6 shows that data can be stored in isolated wells containing quantitative chemical mixtures. The concentrations of these chemicals reflect the values of the binary input data. Each bit address in the input data is assigned to one grid location on a microplate, while the value of each bit is encoded in the concentration of a particular chemical compound at that position. Multiple datasets can be simultaneously stored in the same fluid containers by using multiple distinct chemicals.

To enable parallel data storage and processing, we use the diversity of chemical compounds and overlay (concurrently encode) features from multiple input datasets in the same set of microplate wells. We can take many binary images and realize all pixels with the same position in a single well, by assigning a unique chemical species to each image. FIG. 6 shows this multiple input storage format for M binary image inputs.

To construct data in this parallel format, we obtain a set of compatible chemical compounds. The following criteria should be met by all species in a chemical set for the proposed data storage scheme:

The chemicals should be miscible in the chosen solvent.
The chemicals should be stable, relatively inert, and should not react with one another.
The chemicals should be compatible with analytical chemistry tools that can quantify their concentrations.

The advantages of computing with chemical mixtures stem from the ability for many datasets to coexist in parallel. In the case of overlaid chemical images, any operation on a single well will simultaneously be applied to the corresponding pixel in all images. As such, this encoding scheme can support massively parallel storage and computation.

TABLE II, "COMPUTATIONAL COST OF CLASSIFYING M BINARY INPUTS, EACH CONTAINING N BITS, IN A TRADITIONAL VERSUS VOLUMETRIC PERCEPTRON" shows a comparison of the number of operations for a perceptron with a traditional computer versus the proposed mixture-based technique. The number of operations to be performed with chemical mixtures scales only with the number of input features and is independent of the number of input instances.

| Operations | Scalar Single Core Silicon | Parallel Chemical Mixtures |
|---|---|---|
| Additions | M · N − 1 | N |
| Multiplications | M · N | |
| Total | 2 · M · N − 1 | N |

Figure 7:
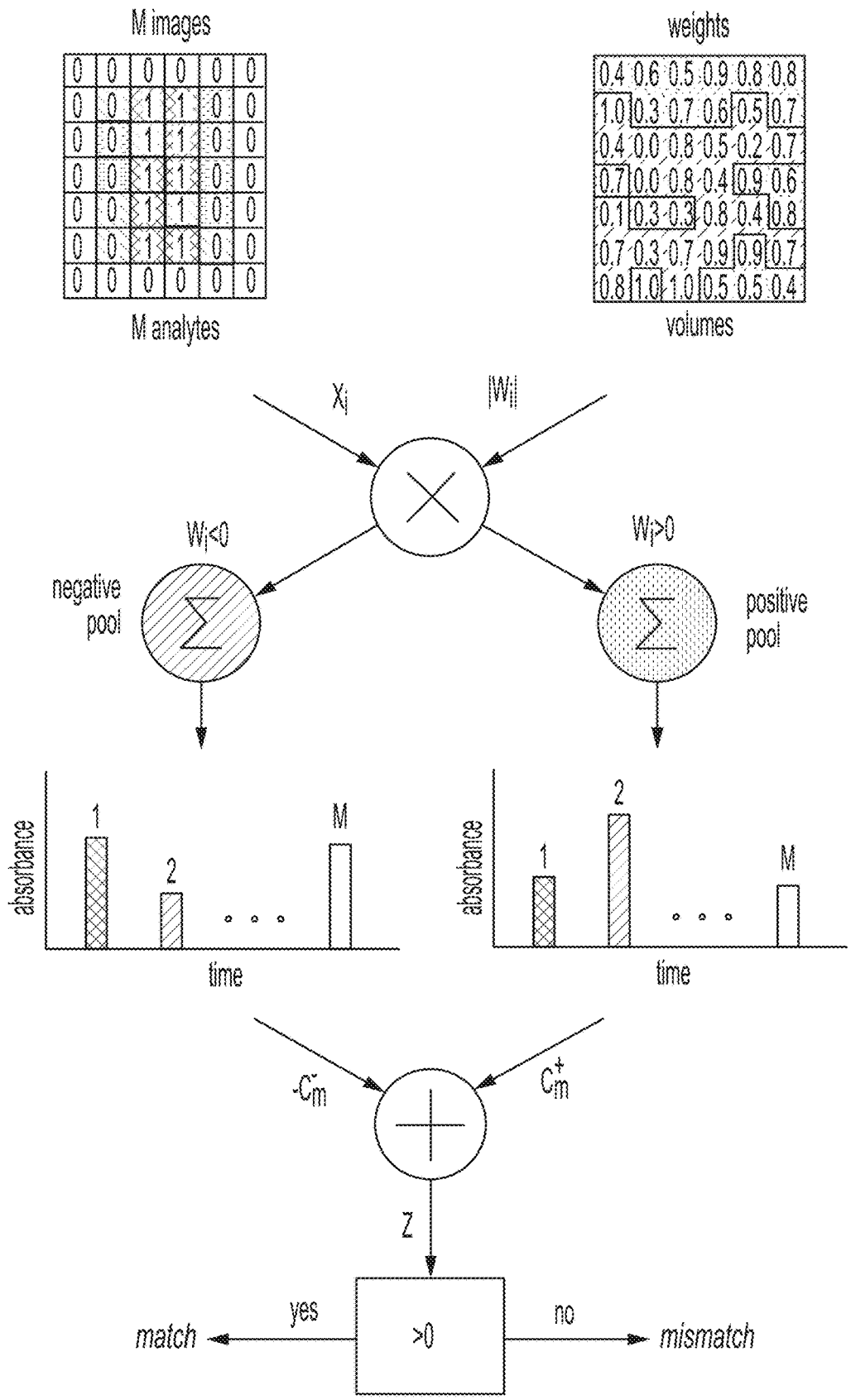
FIG. 7 is a schematic of the chemical computation procedure for the chemical mixture based perceptron, as implemented for pattern classification. The perceptron weights ($w_i \in [-1, 1]$) are scaled to correspond to a maximum volume $V_o$, which is chosen based on the available volume in the data wells. All spatially concurrent chemical datasets (x) are operated on in parallel by a single weight matrix (w), whose values are realized as volumetric fluid transfers. Because weights can be positive and negative ($w_i \in [-1, 1]$), a pool for each polarity is made. Each pool is analyzed by liquid chromatography to measure the concentrations of each analyte species. The differential concentration of each analyte is calculated in post-processing and used to determine the appropriate label for the input data. This figure shows the computational scheme for the proposed chemical mixture based perceptron. The perceptron weights ($w_i E [-1, 1]$) are scaled to correspond to a maximum volume $V_o$, which is chosen based on the available volume in the data wells. Because one can only transfer positive liquid volumes, wells are pooled with positive and negative weights in two separate MAC operations.
Figure 8:
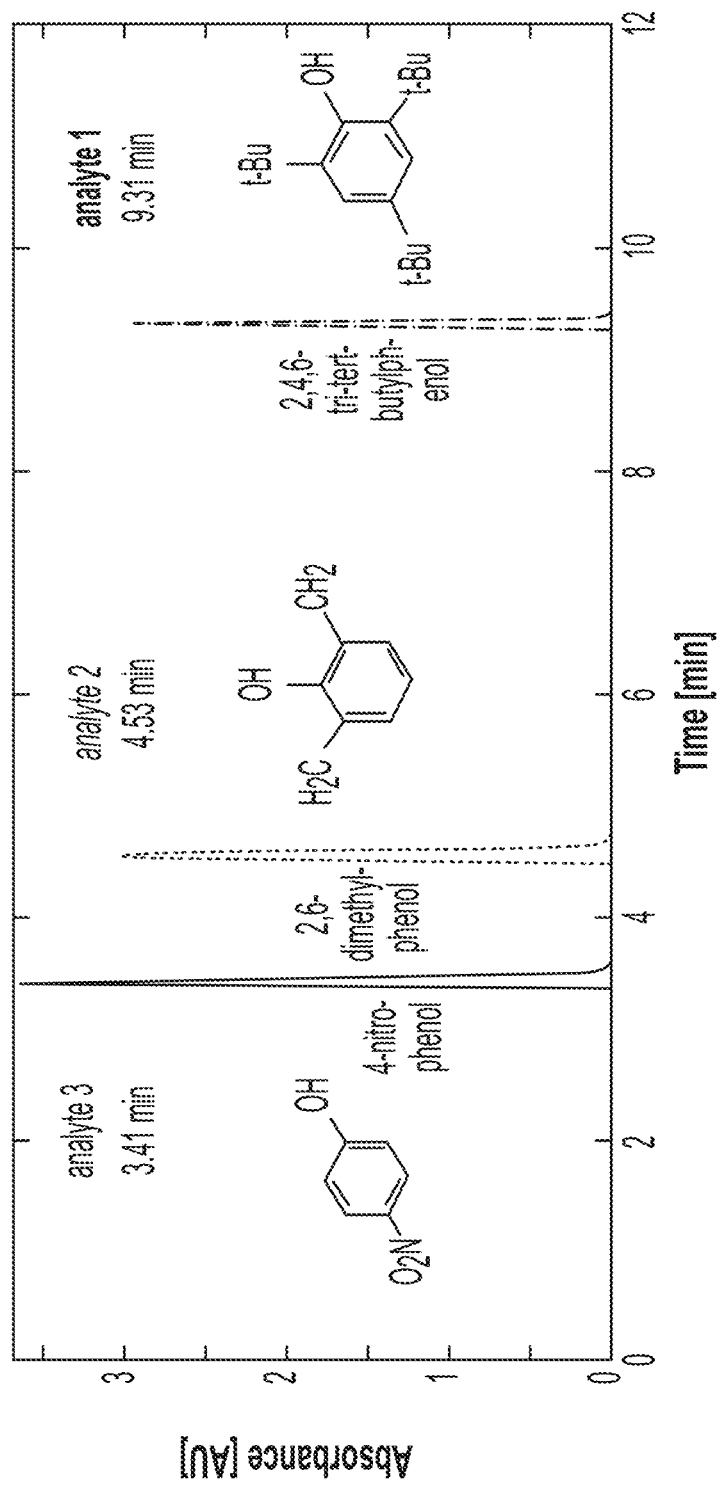
FIG. 8 shows three HPLC chromatograms for the three phenols used to encode data in this study. The chemical concentrations in these three samples were 7 mg/mL for analyte 1, 5 mg/mL for analyte 2, and 8.5 mg/mL for analyte 3. The absorbances were measured at 214 nm. The elution time can be used to identify the analyte, while the area under each peak can be related to the amount of the compound in the sample.

Computing with Chemical Mixtures. FIG. 7 shows the computational scheme for the proposed chemical mixture based perceptron. The perceptron weights ($w_i \in [-1, 1]$) are scaled to correspond to a maximum volume $V_o$, which is chosen based on the available volume in the data wells. Because we can only transfer positive liquid volumes, we pool wells with positive and negative weights in two separate MAC operations.

The total volume transferred from the $i^{th}$ well will be: $V_i = |w_i| \cdot V_o$. The scaling of the transfer volume represents a multiplication and the pooling of volumes into a common well represents an addition. Because bits from different datasets may be stored in the same well, these pooling operations allow for parallel multiply accumulate operations on all concurrently stored datasets. There is zero marginal computational cost to increasing parallelism, because, regardless of the complexity of the chemical mixtures, we can perform the pooling transfers once. To show that the system shown in FIG. 7 realizes the perceptron classifier, it is instructive to work backwards from the output of the system. We can write the output for the data represented by molecular species m as:

$$z_m = \Delta C_m = C_m^+ - C_m^- \quad \text{[Equation B]}$$

where $C_m^+$ and $C_m^-$ are the concentrations of species m in the positive and negative weight pools, respectively. According to [Equation A] the concentration of molecule m at the output of each MAC can be expressed as:

$$C_m^+ = \sum_{\substack{i=1 \\ \omega_i > 0}}^{N} \frac{V_i}{V_p^+} \cdot C_{mi} = \sum_{\substack{i=1 \\ \omega_i > 0}}^{N} \frac{|w_i| \cdot V_o}{V_p^+} \cdot C_{mi}, \text{ and} \quad \text{[Equation C]}$$

$$C_m^- = \sum_{\substack{i=1 \\ \omega_i < 0}}^{N} \frac{|w_i| \cdot V_o}{V_p^-} \cdot C_{mi} \quad \text{[Equation D]}$$

where $V_p^+$ and $V_p^-$ are the total volumes in each pool, i is the index of the data well, $V_i = |w_i| \cdot V_0$ is the weighted volume transferred from the $i^{th}$ well, and $C_{mi}$ is the concentration of molecule m in the $i^{th}$ well. We can then expand [Equation B] as:

$$z_m = \sum_{\substack{i=1 \\ \omega_i > 0}}^{N} \frac{|w_i| \cdot V_o}{V_p^+} \cdot C_{mi} - \sum_{\substack{i=1 \\ \omega_i < 0}}^{N} \frac{|w_i| \cdot V_o}{V_p^-} \cdot C_{mi} \quad \text{[Equation E]}$$

As long as the pooled volumes are intentionally set to be equal after weighted pooling ($V^+ = V^- = V_p$), by appropriately adding pure solvent, we can collect the summations as:

$$z_m = \sum_{i=1}^{N} \frac{w_i \cdot V_o}{V_p} \cdot C_{mi} = \sum_{i=1}^{N} w_i \cdot x_{mi} \quad \text{[Equation F]}$$

where our features have been defined to be the scaled data [pixel] concentrations: $x_{mi} = (V_0/V_p) \cdot c_{mi}$. This yields the original form of the pre-classification output that we sought to generate.

Reading the Results of Chemical Mixture Computations. To verify the output of the computations, we determine the amount of each component present in the liquid samples. We chose to employ high performance liquid chromatography (HPLC). A liquid sample is injected into a stream of solvents known as the mobile phase. The mobile phase, now containing the sample to be analyzed, flows through a column containing a solid adsorbent, the stationary phase. Components in the sample interact with the adsorbent to varying degrees based on their chemical properties, causing different chemicals to leave the column (to 'elute'), at different times. These retention times are used to identify individual components. When a compound that absorbs UV light elutes from the column and passes the detector, a peak in optical absorbance is observed, and the area of this peak is proportional to the relative abundance of the compound in the sample. The resulting absorbance time series, known as a chromatogram, can be used to both identify and quantify the chemicals in a mixture.

The laboratory setup and data flow used for the assays in this EXAMPLE 2. Weight matrices were trained in simulation and then converted, along with test data, into sequences of pipetting instructions for a robotic liquid handler. Analytes were dispensed into a 384-well microplate to form the chemical dataset and then collected in volume fractions corresponding to the classifier weight matrix. The outputs were analyzed by HPLC to produce class labels.

Operational setup. Binary input data and classifier weights are first trained through simulations on a desktop computer, in a Python environment. Before chemically encoding the input data, concentrated stock solutions are prepared of each analyte, at 62.5 mg/mL in dimethyl sulfoxide (DMSO, Macron Fine Chemicals 4948-02). To write the chemical data to a 384-well plate, the binary datasets are converted to pipetting instructions for a fluid handling robot (Andrew Alliance 1000G pipetting robot). For each input data bit whose value is '1', the robot is instructed to transfer 20 μL of the corresponding analyte to the appropriate well. When the input data is '0', it transfers 20 μL of solvent (DMSO) instead. After the chemical datasets are created, the classifier weights are converted into additional pipetting instructions which the robot uses to perform the weighted-summation operations, placing the pooled outputs into an empty well plate.

Weighted pools. After the positive and negative weight pools are generated, each output is analyzed using high performance liquid chromatography (HPLC). The analytes representing each dataset exit the instrument at different times, allowing separate estimations of the output concentration of each component. For each paired output [analyte], the differential concentration (($\Delta C_m$) is calculated. When the differential concentration is greater than zero, then the data contained in the well plate is classified as a match; otherwise, the data is classified as mismatch.

Chemical selection. We selected three similar phenol compounds to encode the data in our experiments: 2,4,6-tritert-butylphenol (analyte 1, 98%, Sigma Aldrich T49409), 2,6-dimethylphenol (analyte 2, ≥99.5%, Sigma Aldrich D174904), and 4-nitrophenol (analyte 3, ≥99%, Sigma Aldrich 241326). Phenols were selected due to their established UV absorbance and well-defined HPLC peak shapes. Mateos et al., "Determination of phenols, flavones, and lignans in virgin olive oils by solid-phase extraction and high-performance liquid chromatography with diode array ultraviolet detection," Journal of Agricultural and Food Chemistry, 49(5), 2185-2192 (2001); Montedoro et al., "Simple and hydrolyzable phenolic compounds in virgin olive oil. 1. Their extraction, separation, and quantitative and semiquantitative evaluation by HPLC," Journal of Agricultural and Food Chemistry, 40(9), 1571-1576 (1992) We initially also considered benzoates and other aromatics. However, phenol compounds also offer a range of chemical functionalization options through acylation [Murashige et al., "Comparisons of O-acylation and Friedel—Crafts acylation of phenols and acyl chlorides and Fries re-arrangement of phenyl esters in trifluoromethanesulfonic acid: Effective synthesis of optically active homotyrosines," Tetrahedron, 67(3), 641-649 (2011)], protection with benzyl [Kuwano & Kuwano, "Benzyl protection of phenols under neutral conditions: Palladium-catalyzed benzylations of phenols," Organic Letters, 10(10), 1979-1982 (2008)] or tert-butyloxycarbonyl [Cheraiet et al., "A simple and eco-sustainable method for the O-Boc protection/deprotection of various phenolic structures under water-mediated/catalyst-free conditions," Green Chemistry Letters and Re-views, 6(3), 211-216 (2013)], silylation [Sefkow & Kaatz, "Selective protection of either the phenol or the hydroxy group in hydroxyalkyl phenols," Tetrahedron Letters, 40(36), 6561-6562 (1999)], or even methylation [Ouk et al., "O-methylation of phenolic compounds with dimethyl carbonate under solid/liquid phase transfer system," Tetrahedron Letters, 43(14), 2661-2663 (2002)]. This introduces the possibility of increasing parallelism through simple chemical manipulations, which would generate numerous related compounds with similar UV sensitivity.

Figure 10:
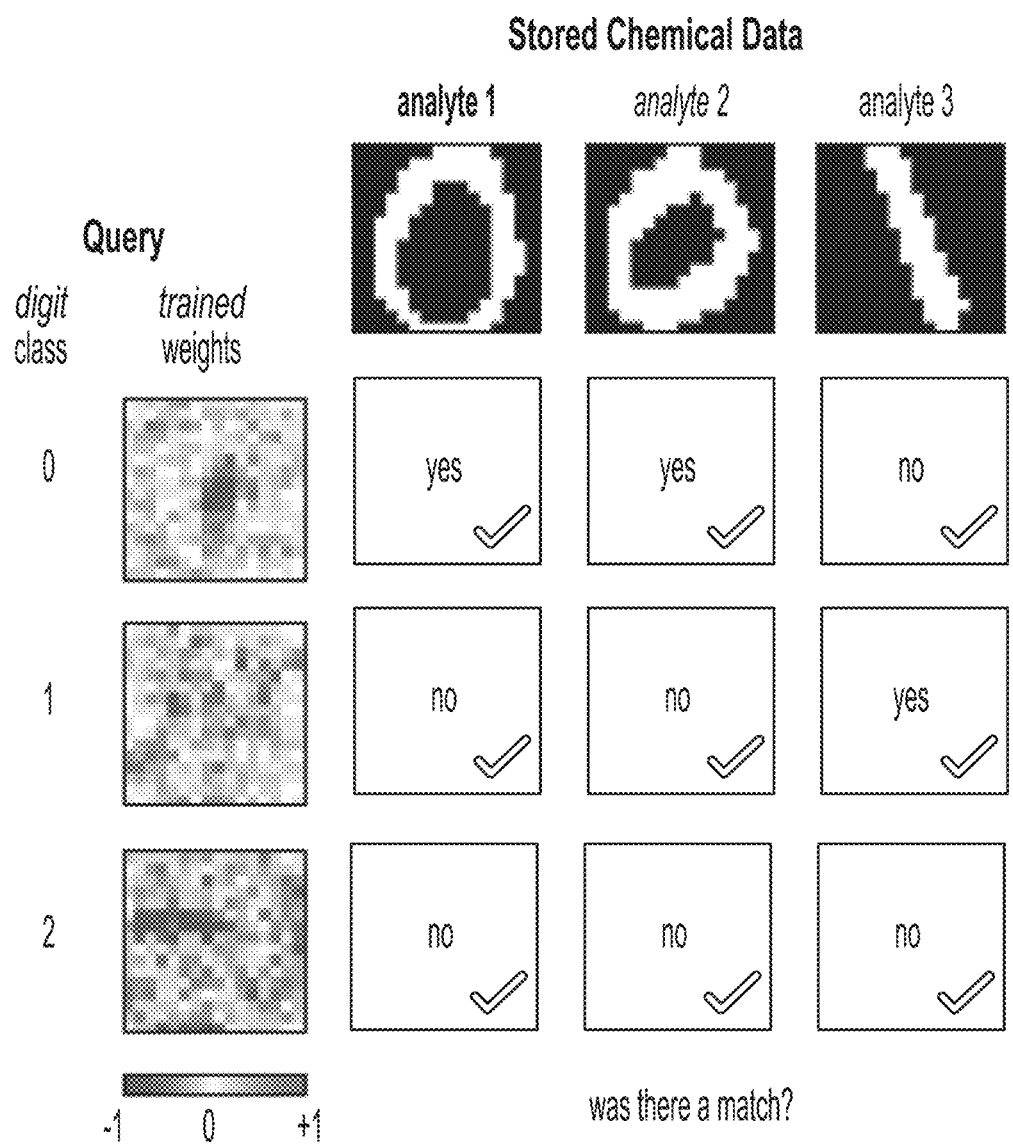
FIG. 10 shows a chemical classification of MNIST handwritten digits. Three 16×16 (256-bit) binary images were chemically encoded, in parallel, on a 384-well plate. The overlaid chemical images were then classified by three different perceptrons which had been previously trained to identify either digit '0', '1', or '2'. The results are shown in a table format as class matches ($z_m > 0$) or mismatches ($z_m < 0$). All nine chemical classifier outputs were correct (3 true positives, 6 true negatives). The chemical dataset is based upon the results of a microplate, where each well in the plate contains 60 µL of liquid whose chemical composition represents the values of one pixel across three images.

Measurement calibration. The HPLC used in this work was an Agilent 1260 infinity series model with a quaternary pump, a standard autosampler, a thermostatted column compartment, and a variable wavelength detector that was set at 204, 214, and 254 nm with bandwidths of 4 nm. To identify the characteristic elution time of each analyte, the three compounds were measured independently using a C18 reversed phase column (Agilent Poroshell 120 EC-C18, 699975-902, 4.5 mm×50 mm, 2.7 μm particle size). A gradient flow program was run with a two-part mobile phase comprised of water (A) and acetonitrile (B), where the volume ratios at each gradient time endpoint were set to: 95%-A & 5%-B at 0 min, 5%-A & 95%-B at 9 min, 5%-A & 95%-B at 10 min, 95%-A & 5%-B at 11 min, and 95%-A & 5%-B at 12.5 min. Chromatograms for the three analytes are shown in FIG. 10. The elution times were determined to be 3.41 minutes, 4.53 minutes, and 9.31 minutes, and the pulse width for each species was approximately 9 seconds. While our proof of concept experiments used only three analytes, the narrow pulse width implies that as many as eighty analytes could be independently quantified using this HPLC protocol.

Figure 11:
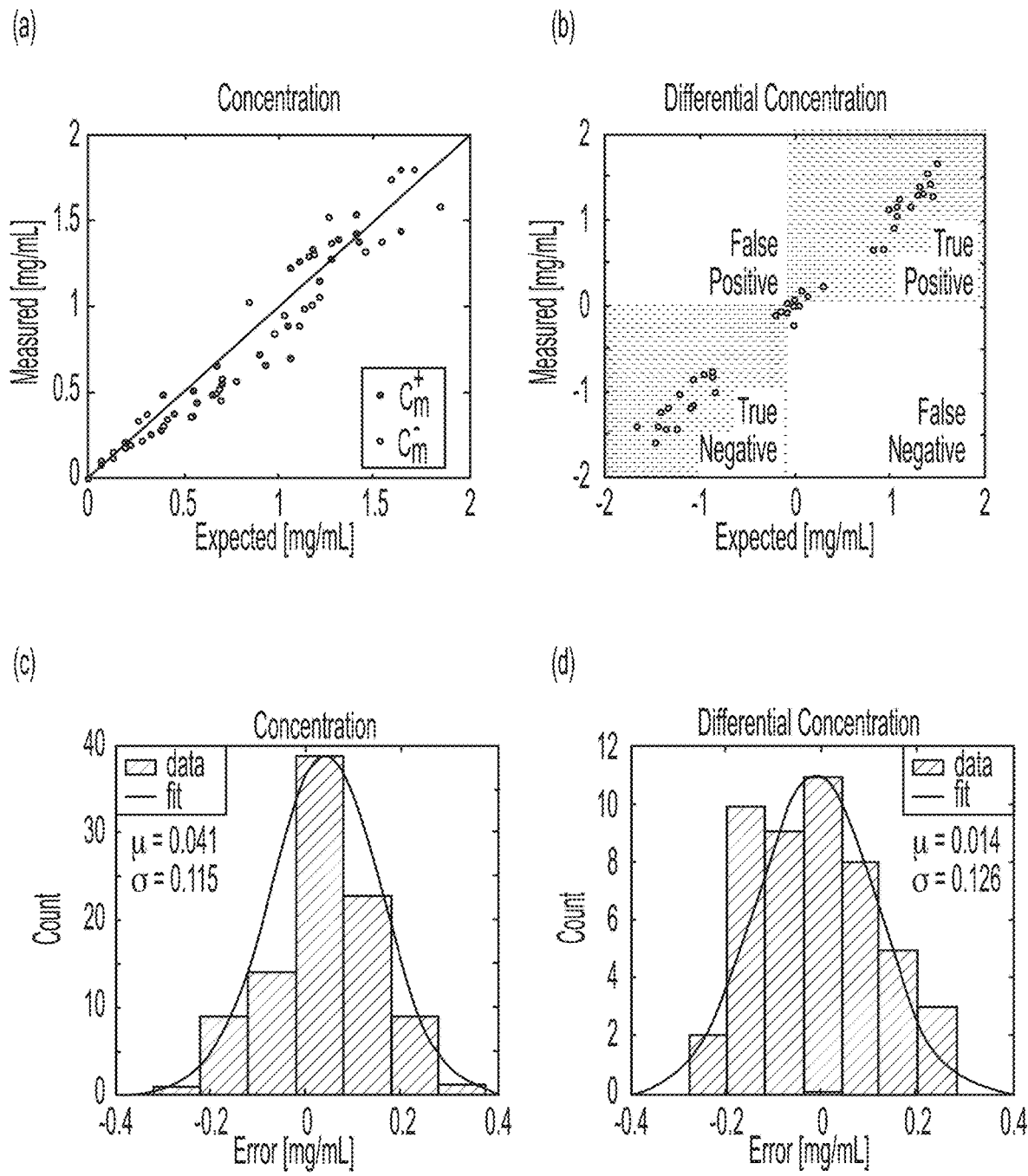
FIG. 11 shows differential concentration, as described by Arcadia, et al., "Parallelized linear classification with volumetric chemical perceptrons," in, Proceedings of the IEEE Conference on Rebooting Computing (ICRC) (2018) [EXAMPLE 2].

FIG. 11 shows calibration curves for the three analytes, which relate the true concentration to the area under the measured HPLC chromatogram peak. A concentrated equimolar mixture (12 mg/mL of each of the three analytes) was prepared and serially diluted to obtain samples with varying concentrations. Using 11 serial 2:1 dilutions, the concentrations were varied from 6 mg/mL to 0.006 mg/mL. Each of the diluted samples was analyzed with HPLC, and the areas of the chromatogram peaks were calculated. For each compound, we performed a simple zero-intercept linear fit to relate peak area and compound abundance. Although photodetector saturation causes noticeable nonlinearity at higher concentrations, our technique relies on differential concentrations, and thus achieving the correct classification output only requires that the detector output be monotonic.

MNIST image classification. For a demonstration, we used images derived from the well-known MNIST database of handwritten digits [LeCun et al., "Gradient-based learning applied to document recognition." Proc. of the IEEE, 86(11), 2278-2324 (1998)]. The original images were grayscale at 28×28 pixel resolution, but for these experiments, we binarized and resized the images to 16×16. We trained three one-versus-all classifiers on a computer a priori for three foreground classes, representing the digits '0', '1', and '2'. Each classifier was trained using 100 foreground class images and 100 background class images which were randomly selected from the MNIST training set. For example, the classifier with the digit '0' foreground class was trained using 100 images of the digit '0' and 100 images of other digits '1' through '9'. Color maps of the trained weight matrices are shown in FIG. 11.

Figure 12:
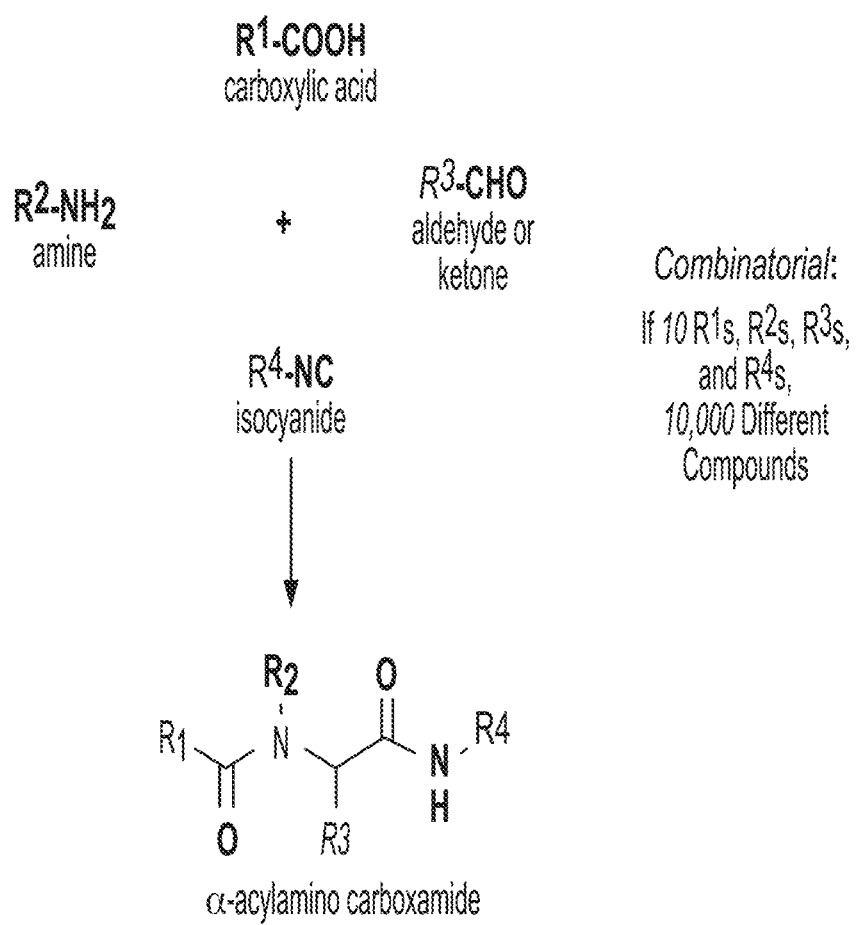
FIG. 12 shows an exemplary Ugi four-component reaction.

We constructed a dataset of three overlaid MNIST images (see, LeCun et al., "Gradient-based learning applied to document recognition." Proc. of the IEEE, 86(11), 2278-2324 (1998)), consisting of two distinct '0' images and one image of '1'. These images were mapped onto a well plate and encoded with the three previously discussed analytes. The resulting microplate is shown in FIG. 12, where the chemically encoded images are faintly visible due to the colors of the analyte solutions (particularly analyte 3). We used the three perceptron classifiers to operate on this chemical data, and the resulting MNIST classifications are shown in FIG. 12. The '0' classifier correctly identified the two images with zeros, and the '1' classifier correctly identified the image of a one. In total, all 9 of the MNIST perceptron outputs were correctly labeled.

We note that while these perceptrons performed well, the exact accuracy of the classifiers is not the main focus of this paper. Rather, our aim is to reproduce the perceptron operations using chemical computations.

Figure 13:
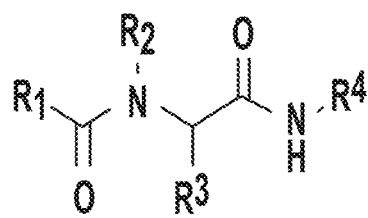
FIG. 13 shows memory demonstration using the methods described. Data useful for training and recognition, e.g., of MNIST handwriting dataset (see, LeCun et al., "Gradient-based learning applied to document recognition." Proc. of the IEEE, 86(11), 2278-2324 (1998)), TIMIT audio recordings, and NOAA sensory datasets. Use molecules to calculate weighted sums, enables classification, filtering, and matrix algebra.
Figure 13:
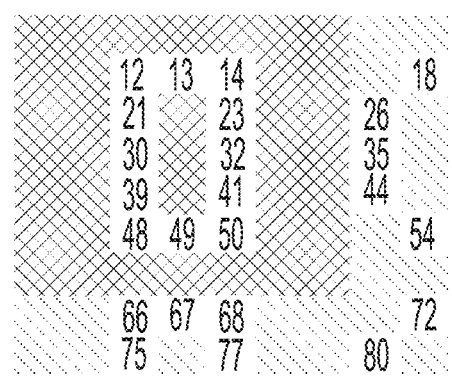
Figure 13:
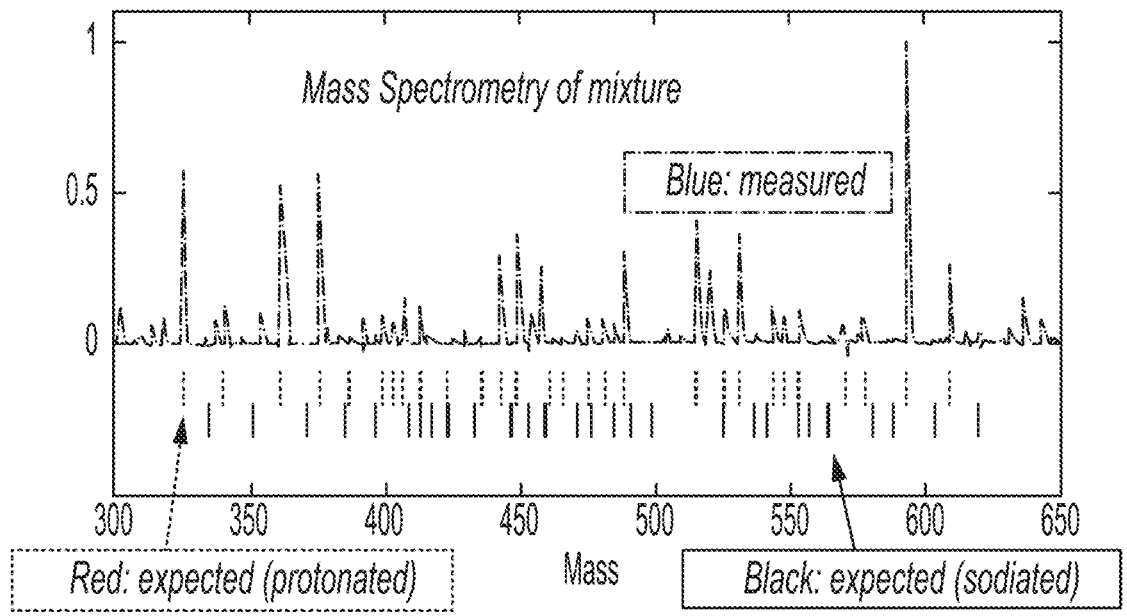
Figure 13:
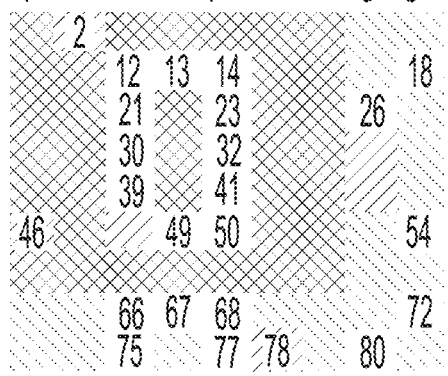
Figure 13:
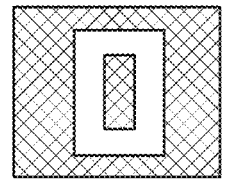

Performance evaluation. Our chemical computation is not limited to images and is extensible to linear classification of any binary dataset. To evaluate the robustness of the computations, we performed a set of experiments using smaller pseudo-random binary vectors. Sixteen 16-element weight vectors (w∈[−1, 1]) were selected at random, as shown in FIG. 13. For each w, we chose three 16-bit data vectors, selected such that one vector is classified with large margin as a mismatch ($\ell$=0), one vector is easily classified as a match ($\ell$=1), and one vector is near the classifier's boundary.

Figure 14:
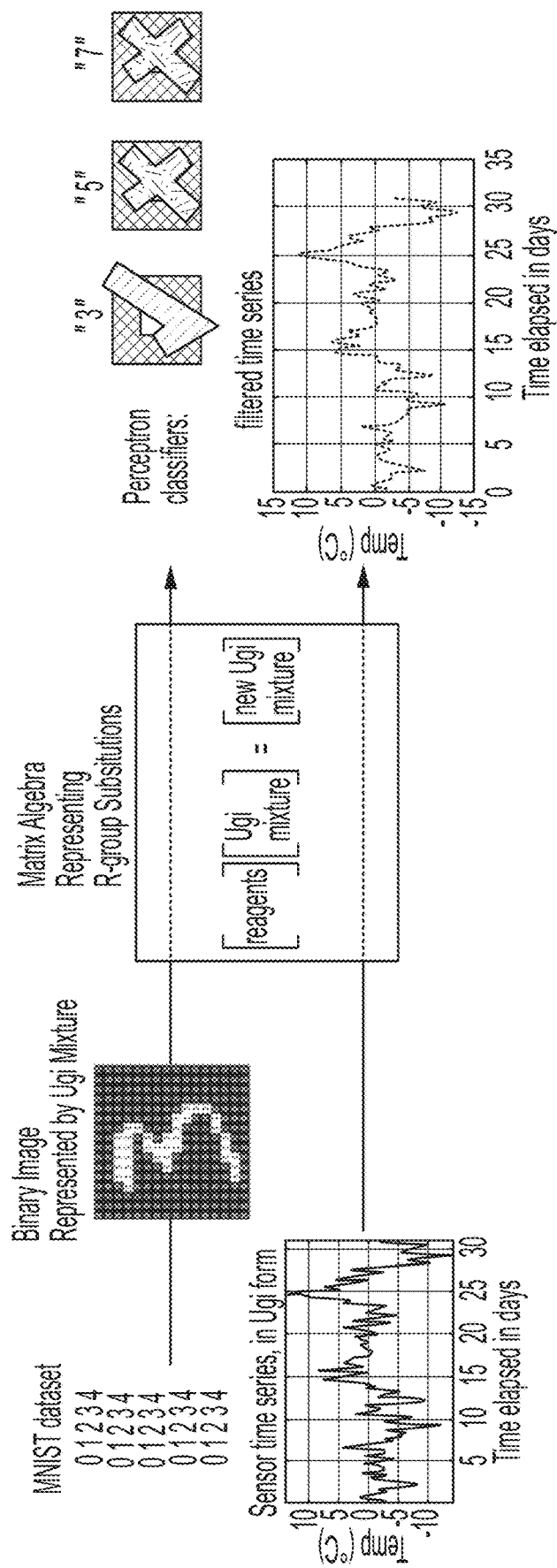
FIG. 14 is a cartoon representation of the computer-aided design(CAD) software suite. Automating repetitive or statistical tasks, and understanding and optimizing tradeoffs among error rate, time constraints, capacity, cost, yield, and complexity.
Figure 14:
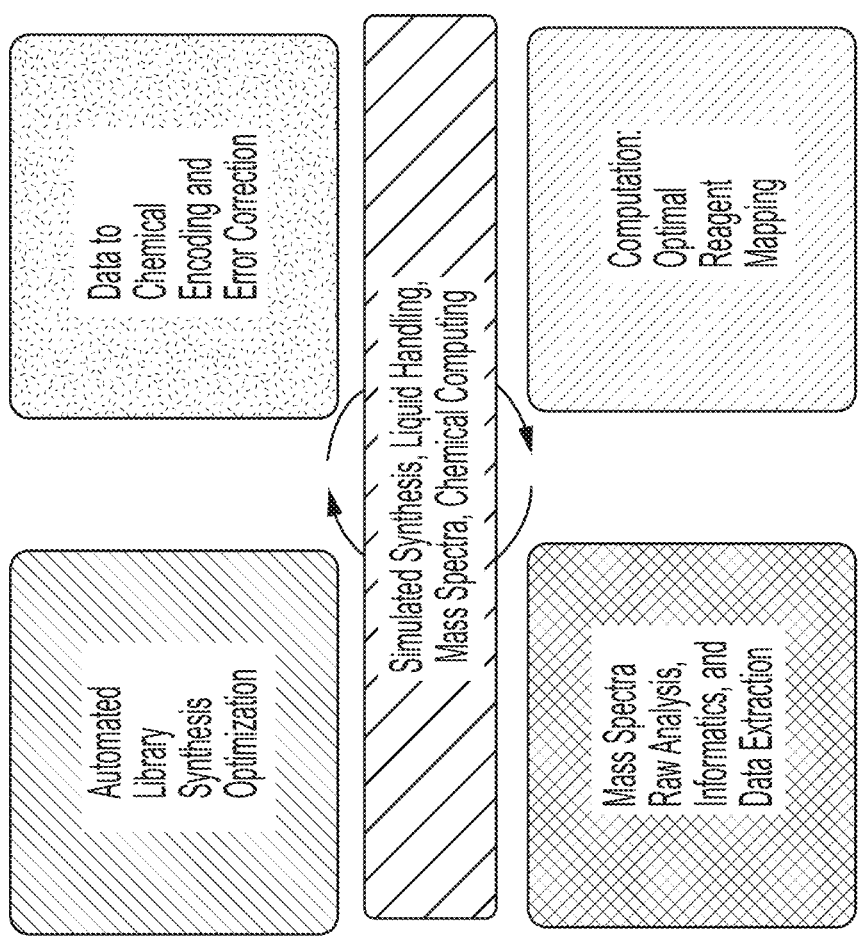
Figure 15:
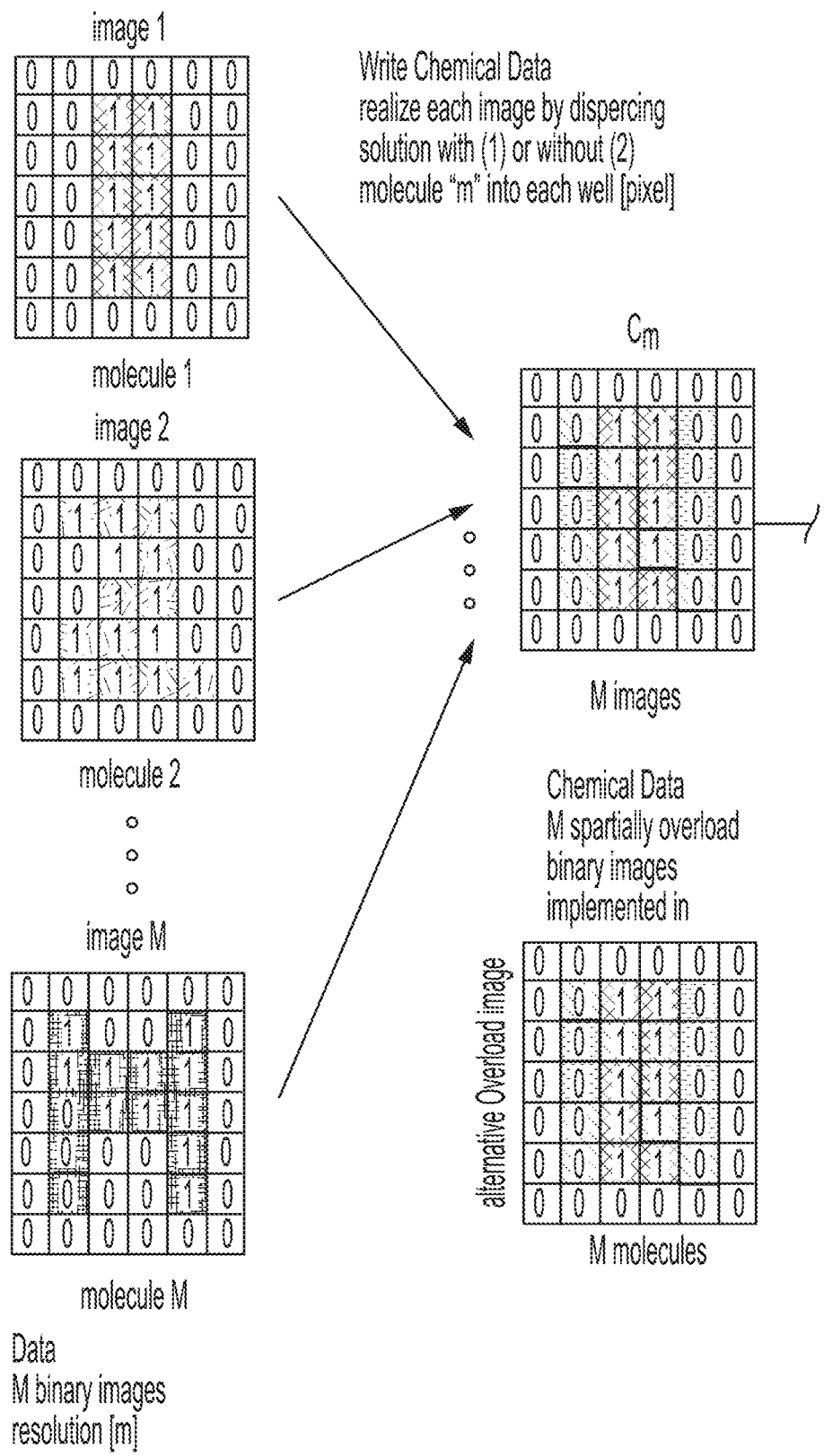
FIG. 15 is a schematic representation of the molecular perceptron concept. See, Arcadia, et al., "Parallelized linear classification with volumetric chemical perceptrons," in, Proceedings of the IEEE Conference on Rebooting Computing (ICRC) (2018) [EXAMPLE 2].
Figure 15:
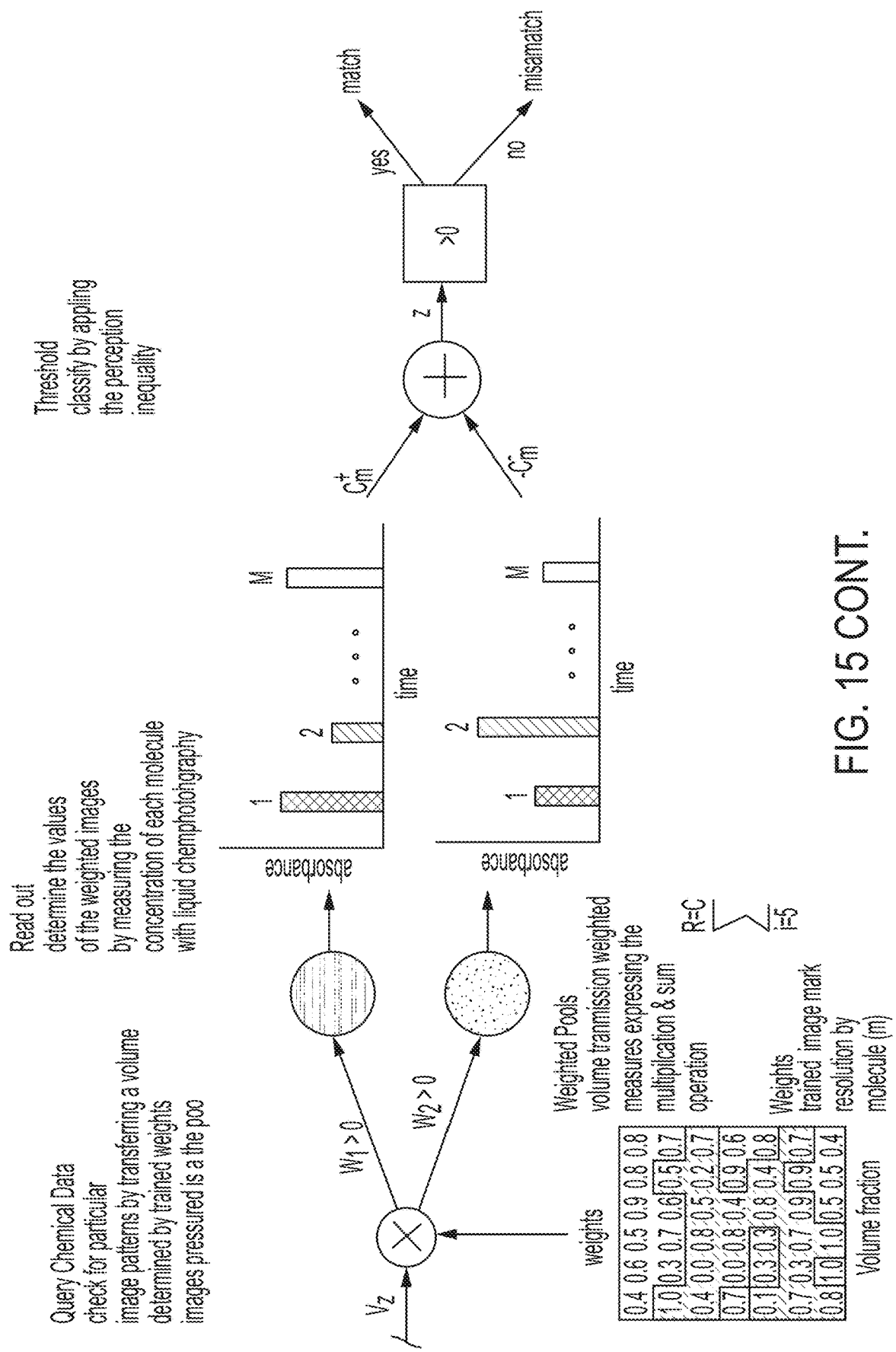
Figure 16:
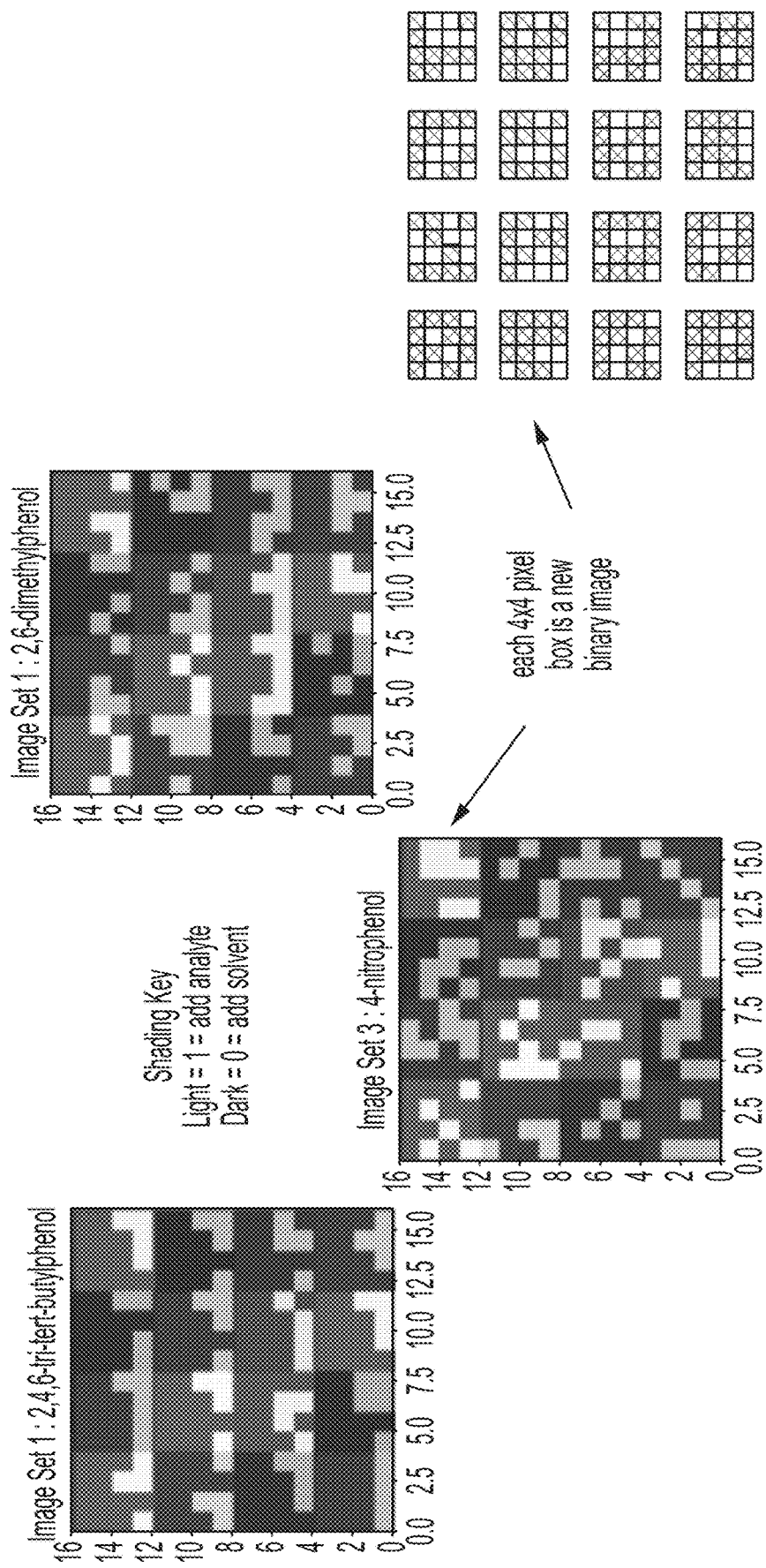
FIG. 16 are chemical image arrays. See, Arcadia, et al., "Parallelized linear classification with volumetric chemical perceptrons," in, Proceedings of the IEEE Conference on Rebooting Computing (ICRC) (2018) [EXAMPLE 2].

The expected and HPLC-measured concentrations of the positively and negatively weighted pools are shown in FIG. 14. The expected and measured values of the differential concentration are also shown. In both cases, deviations from a straight line (y=x) represent errors in the chemical encoding, computation, or measurement. In FIG. 14b, points which appear in the upper left quadrant are false positives, while points which appear in the lower right quadrant are false negatives. Histograms of these errors are also shown.

The classification output is robust to moderate experimental variations, but the exact output concentrations are affected by several sources of experimental variability. Inconsistent pipetting volumes during the initial dataset creation, as well as the tolerance of the weighted summing volumes, will cause variations in the pooled output. Additionally, the HPLC is sensitive to small changes in its sample injection volume, and the chromatogram calibration can drift slightly over time. In total, we observed errors on the scale of 10% of the expected outputs, which naturally has a larger effect on decisions closer to the classifier boundary. The mean differential concentration error was close to zero (0.041 mg/mL), and the 3σ spread was approximately 0.3 mg/mL. The overall chemical classifier accuracy was 96%, correctly classifying 46 out of 48 test vectors.

The utility of this method as a valuable alternative computing model is provided by its ability to scale up to operating in parallel on many datasets. In this EXAMPLE 2, the scale of our demonstrations is limited by the throughput of the automated liquid handler. Between assembling the dataset and performing the classifications, the MNIST demonstration required a total of 1,716 liquid transfers, used 697 disposable pipette tips, and took 24 hours to complete. While this is a considerable amount of time, it does not represent a physical limit, as higher throughput liquid handling systems are common in pharmaceutical laboratories. Moving forward, improved robotics will allow an increase in the computational throughput by several orders of magnitude.

The parallelism of the chemical analysis is another important avenue for improvement. Our demonstrations used a set of only three compounds, but the current system could be readily scaled to several dozen. This would not impact the inference or readout time, but the time to prepare the input data wells would increase. Putting aside the dataset creation time, scaling up to hundreds or thousands of parallel computations would likely require supplementing HPLC with other analytical techniques such as mass spectrometry. Zeng & Kassel, "Developments of a fully automated parallel HPLC/mass spectrometry system for the analytical characterization and preparative purification of combinatorial libraries," Analytical Chemistry, 70(20), 4380-4388 (1998); Shockcor et al., "Combined HPLC, NMR spectroscopy, and ion-trap mass spectrometry with application to the detection and characterization of xenobiotic and endogenous metabolites in human urine," Analytical Chemistry, 68(24), 4431-4435 (1996).

The finite volume of the chemical datasets implies a limit to the number of times that data can be sampled and processed. In the MNIST tests, each well began with a volume of 60 μL, and the classifier weights were scaled to transfer between 0-6.25 μL from each well. Thus, the current system can operate on each data well approximately 20 times. With improved liquid handling tools, the sample volumes can be reduced to make more efficient use of each chemical dataset. These current demonstrations require analyzing two chemical output pools and electronically calculating the differential concentrations of their analytes. To scale up the scope and complexity of our chemical computational system, we can implement methods approaches for cascading multiple computing stages and integrating other operations beyond linear volumetric additions and multiplications.

This EXAMPLE 2 presented a scheme for implementing linear classification operations using chemical mixtures. Binary data is encoded into the chemical composition of an array of liquid samples, and a robotic fluid handler is programmed to perform multiplications and additions as fractional volume transfers and pooling operations. The chemical encoding increases information density and enables parallel computation. The result of these operations is represented in the concentration of chemicals in pooled outputs, which are analyzed using high performance liquid chromatography (HPLC). This EXAMPLE 2 used this system to classify several 16×16 binary MNIST images of handwritten digits, as well as to classify a set of pseudo-random binary vectors. The method's accuracy was demonstrated, producing 55 correct classifications out of 57 operations.

THIS EXAMPLE 2 first step towards a new class of chemical-domain computational engines which can operate on increasingly parallel datasets.

Example 3

Memory Using Mixtures of Small Molecules

Summary Molecular data systems can store information at dramatically higher density than existing electronic media. Molecular memory has previously been based upon custom-built long-chain oligomers (like RNA or DNA). The concomitant need for readout using somewhat cumbersome processes like shotgun sequencing and the like, or even the more modern nanopore sequential readout method.

This EXAMPLE 3 presents a general framework for quantifying chemical memory, which is not limited to polymers and extends to mixtures of molecules of all types. This EXAMPLE 3 shows that the theoretical limit for molecular information is two orders of magnitude denser by mass than DNA. This EXAMPLE 3 demonstrates kilobyte-scale information storage in mixtures of small synthetic molecules, and considers some of the new perspectives that will be necessary to harness the information capacity available from the vast non-genomic chemical space.

This EXAMPLE 3 demonstrates the coding of information using mixtures of small molecules and subsequent en masse readout using combinations of spectrometry, chromatography and spectroscopy. This EXAMPLE 3 used memory representation to formulate the readout problem as a multi-user signature specification/detection problem in suitable signal spaces. This EXAMPLE 3 shows how to detect mixtures of $10^6$ molecules in one pass at relatively high speed.

Introduction. RNA and DNA are information-dense, stable over long periods of time, and energy efficient. Reading information from RNA and DNA is currently cumbersome, whether stochastic methods such as polymer chain reaction (PCR) and shotgun sequencing or emerging more elegant sequential methods using nanopores are used.

This EXAMPLE 3 instead considers the molecular information storage problem with an eye not only toward high information density, but also highly parallel, speedy memory interrogation. The inventors apply bulk probes such as mass spectrometry, spectroscopy, chromatography and other methods to enable readout of megabits or more within seconds or less.

This EXAMPLE 3 first considers information storage using molecules and mixtures of molecules (specifically avoiding long oligomeric approaches such as RNA, DNA or proteins) in a way that can be applied to any chemical system. This EXAMPLE 3 avoids long oligomers (or lattices), instead using natural intermolecular interaction promiscuity available in gas/solution phase mixtures of smaller molecules. This EXAMPLE 3 then considers readout of molecular mixtures as a classification problem in some high dimensional signal space, deriving empirical bounds on the rate at which information can be extracted from the system. This EXAMPLE 3 then applies this thinking to models of a particular chemical system (Ugi molecules) using mass spectrometry as the interrogation method.

Theoretical foundation of molecular information capacity. Where D is the total number of different distinguishable system states, then the memory capacity is upper-bounded by logo. Embedded in this statement is the readout problem (the notion of distinguishability) which is quantified for any given system, as discussed below.

By neglecting potentially resolvable differences in the conformational, vibrational, rotational, and electronic states of the molecules, the enumeration of system state is queried by three simple questions:

(1) Which marbles are present?
(2) How many of each marble is present?
(3) Where are the marbles?

This formulation is sufficiently robust and accurate for capturing the capacity of any molecular memory, even when the quantum states of the molecules are also considered.

Counting the states. The number of unique possible states that a system can realize (regardless of what parameters make the states unique) sets an upper bound on memory capacity. Where there are n distinguishable states overall, then the system can code at most $\log_2 n$ bits. Thus, establishing memory capacity is a question of counting the distinguishable states and the three questions enumerated above allow us to answer this question.

Linear oligomers, such as nucleic acids or proteins, are a well-known form of molecular information storage/representation. For RNA or DNA, there are four bases, so the number, M, of possible N-monomer strands is 4N. When those skilled in the molecular computing art ask which of the M molecules is present, a given strand represents 2N bits. For proteins, N bases drawn from an "alphabet" of 20 amino acids carry $\log_2(20^N)=4.3N$ bits.

These "beads on a necklace" representations are themselves an instance of "where are the marbles?" memory coding in that position, as well as base identity, provides information. those skilled in the molecular computing art will understand two-dimensional or three-dimensional structures, where each position in a lattice represents information. These structures become necessarily large and their interiors less accessible to easy interrogation as memory size grows. Planar lattices could allow easier interrogation, but a subtext of our approach is a desire to utilize the natural promiscuity of molecule interactions in liquid/gas phase for computation. Thus, this EXAMPLE 3 focuses on small molecules (although those skilled in the molecular computing art can use larger scale spatial ordering of molecular mixtures as an information dimension).

For a mixture of molecules where position information is inaccessible (or inconsequential owing to molecular motion), but where those skilled in the molecular computing art can identify the presence or absence of different molecules in a mixture, then for given M molecule types, there are 2M possible system states. Thus, the system can store NI bits.

How many of each type of molecule is present? those skilled in the molecular computing art can use up to Q molecules for storage. That is, a given "bag" can contain any number between zero and Q marbles. This is a typical bin-packing problem [Papoulis, Probability, Random Variables, and Stochastic Processes (McGraw-Hill, New York, third edition, 1991); Feller, An Introduction to Probability Theory and Its Applications, Volume I. (Wiley, third edition, 1968)] that results in:

$$n = \binom{Q+M-1}{M-1}$$ [Equation G]

possibilities. For analytic clarity, let us assume that M»10 and that Q–M» 10 so that Stirling's approximation is reasonably accurate and:

$$\Omega \approx \frac{(Q+M-1)^{Q+M-1} e^{-(Q+M-1)} \sqrt{2\pi(Q+M-1)}}{Q^Q e^{-Q} \sqrt{2\pi Q} \, (M-1)^{(M-1)} e^{-(M-1)} \sqrt{2\pi(M-1)}},$$ [Equation H]

so that $$\log\Omega \approx (Q+M-1)\log(Q+M-1) - Q\log Q - \\ (M-1)\log(M-1) + \frac{1}{2}\log\left(\frac{Q+M-1}{2\pi Q(M-1)}\right)$$ [Equation I]

Let us define Q=αM. This definition results in:

$$\log\Omega \approx (\alpha+1)M\log(\alpha+1)M - \alpha M\log\alpha M - \\ (M-1)\log(M-1) + \frac{1}{2}\log\left(\frac{(\alpha+1)M}{2\pi\alpha M(M-1)}\right),$$ [Equation J]

which reduces to $$\log\Omega \approx M\log(\alpha+1)M - \alpha M\log\frac{\alpha}{\alpha+1} - \\ (M-1)\log(M-1) + \frac{1}{2}\log\left(\frac{\alpha+1}{2\pi\alpha(M-1)}\right)$$ [Equation K]

Storage Capacity and Density Comparisons. In TABLE III, "MOLECULAR STORAGE CAPACITY FOR UGI TRIMERS (K=8) WITH 10, 30 AND 90 R-GROUPS PER SITE. $C_3(N^K, m)$ IS CALCULATED FOR m=1, 10, 100," we compare the storage capacities $C_2$ and $C_3$ (M,m) as a function of N with K=S sites, which corresponds an Ugi "trimer", made from three conjoined Ugi monomers.

| bits/mixture | N = 10 | N = 30 | N = 90 |
|---|---|---|---|
| $C_2$ | $10^8$ | $6.6 \times 10^{11}$ | $4.3 \times 10^{15}$ |
| $C_3(N^K, 1)$ | $2 \times 10^8$ | $1.3 \times 10^{12}$ | $8.6 \times 10^{15}$ |
| $C_3(N^K, 10)$ | $4.8 \times 10^8$ | $3.2 \times 10^{12}$ | $2 \times 10^{16}$ |
| $C_3(N^K, 100)$ | $8.1 \times 10^8$ | $5.3 \times 10^{12}$ | $3.5 \times 10^{16}$ |

A mixture of Ugi trimers can store nearly a gigabit of information with just N=10 unique R-groups. This is much more than a mixture of comparable Ugi monomers (K=4 and N=10), which can store only tens of kilobits. Ugi trimers furthermore have a molecular space-filling volume on the order of 125A$^3$. When the information storage density is 2 bits/molecule, then for Ugi trimer mixtures this implies a maximum storage density of approximately $2 \times 10^{18}$ bytes/mm$^3$. This tremendous information density will lead us to focus on Ugi trimers, sufficiently long, yet synthetically tractable Ugi oligomers, for our GB-scale molecular storage system.

(2) Location: The position of each molecule: Theoretically, an infinite amount of information could be stored via position as it is, for all intents and purposes, a continuous variable. However, a number of practical concerns limit fine position as a chemical information storage mechanism including the need for a rigid supporting lattice, molecular vibration and the (relatively large) probe wavelengths which limit location resolution. Moreover, this project is concerned not only with memory but also with computation which implies a need to foster interactions between molecules. Thus, we focus primarily on unordered mixtures of molecules as an information storage mechanism.

When two solutions are physically separated (or encapsulated), they can contain different sets of molecules so that the information capacity grows linearly with the number of separate mixtures, when one mixture in P separate mixtures represent P×C bits.

Memory capacity motifs and quantum issues. In quantifying molecular memory capacity, two important motifs emerged. First, memory capacity scales linearly in each degree of freedom. Each spatial dimension adds a degree of freedom. However, "tranche" properties of the constituents of molecules such as sensitivity to specific probe types (frequency, reactivity) could also be used as dimensions to increase memory capacity. Second, the numbers of identifiable molecules only increase capacity as the log of those numbers. While quantities like concentration will increase capacity, they do so less efficiently than through adding more degrees of freedom.

When we have M different molecule types, each of which can be stably put into S quantum states where typically S«1\1 because the combinatorial complexity of molecules which drives M can be high while the number of stable and accessible quantum states is generally much smaller. The memory capacity of such a system is log $S^M$=log S+log M. So, whether the design (and probing) of those S stable quantum states should be pursued is a question of how difficult it is to increase S as compared to M.

Quantum entanglement can vastly increase the capacity of any system, because the state is defined by the values of the entangled state probabilities. When each element can occupy one of two states, an N-element system has 2N states, each of which is specified by a complex constant. Even when we suppose those constants are constrained to either 0 or 1, the N-element system represents 22~1 bits. So quantum entanglement is a powerful method of memory storage. For the chemical systems here, controllable entanglement between constituent atoms beyond a single bond-length is unlikely, so that while N might be 2, the gain in distinguishable molecules (a factor of 8, or 3 bits) is minimal.

Comparing the various methods suggests that simple "presence/absence" coding wherein information is represented by the presence or absence of each of M molecule types in a mixture is a good first approach.

Memory and detection using Ugi chemistry. A specific chemical substrate will allow us to formulate the memory storage problem in concrete terms, from coding through detection using mass spectrometry. Because the synthesis of large numbers of different molecules is difficult, we consider theoretical collections of small organic molecules that can be synthesized by multicomponent reactions, such as Ugi reactions. The Ugi reaction is a popular reaction in which four reactants combine to form a new molecule which condenses the four elements onto a peptide-like backbone, while retaining nearly all of the atoms of original inputs. Dömling & Ugi, "Multicomponent reactions with isocyanides." Angewandte Chemie International Edition, 39(18), 3168-3210 (2000); Ugi et al., "Multicomponent reactions in organic chemistry." Endeavour, 18(3), 115 122, (1994); Ugi et al., "The chemistry of isocyanides, their multicomponent reactions and their libraries." Molecules, 8(1), 53-66 (2003).

We consider a set of Ugi molecules created from combinatorial sets of four appropriate reagents available from the Sigma-Aldrich catalog. Using 30 isocyanides, 19 carboxylic acids, 12 amines, and 17 ketones, we can create 116,280 (30×19×12×17) theoretical Ugi products.

We will assume molecule identification via mass spectrometry, a widespread and powerful analytical technique in which molecules are ionized and accelerated in an electromagnetic field, reaching speeds which depend on their masses [6]. Typically an instrument produces a "mass spectrum" identifying the abundance of molecules across a range of measured mass-to-charge ratios. Numerous types of mass spectrometers exist, with different tradeoffs between resolution, speed, and complexity. Analyzing a solution with exactly one pure Ugi product, we expect to see several identifiable peaks in the mass spectrum, corresponding to atomic isotopes and adducts of sodium ions present in the solution. The base mass of the Ugi molecule is approximately equal to the sum of the masses of its four reactants, and the multiple peaks will appear at consistent offsets from this base mass, though their relative amplitudes may vary. For simplicity, each molecule has two isotopes and two possible adducts, allocated in a random fraction. Each peak appears with a finite width determined by the resolution of the instrument, having a standard deviation between I to 0.001 m/z. The total detected peak heights vary with chemical preparation and ionization yield, and for these purposes we assume a log normal distribution.

Example 4

Chemical CPUs: Chemical Computational Processing Via Ugi Reactions

Technical approach. The program goals of this EXAMPLE 4 are (1) to store abstract digital data by taking advantage of small molecule chemical diversity; (2) to develop leading-edge synthesis and analysis techniques that can scale to billions of molecules/day; and (3) to establish scalable strategies for solution-phase information processing using small-molecule reactions.

Regarding combinatorial synthesis. Prior methods: Split pool synthesis of 2.18 million compounds (Schreiber group; see, Schreiber, Int. J. Mass. Spec. (2000)); fully-populated library only; and verification of 456 compounds (0.02%).

This EXAMPLE 4: Synthesis of 30,000 Unique Mixtures of 30,000 compounds via robotics and multicomponent reactions; 30K×30K=900 million synthesis features; create arbitrary library subsets; including 100% quality control (QC).

Regarding mass spectrometry. Prior methods: Identification of >120,000 compounds in 12 hours (Marshall group); amortized 3 compounds/second.

This EXAMPLE 4: Enumeration of 30,000 mixtures×30,000 compounds in 24 hours; >10,000 compounds/second.

Regarding molecular computing; storage. Prior methods (DNA): Stored 200 MB subdivided among DNA oligonucleotides (Strauss/Ceze/Seelig); Data+payload representation; Reed-Solomon codes for error correction; 13 million ~150-base oligos carrying >100 bits of data per molecule.

This EXAMPLE 4: To store >1 billion bytes in unordered small molecules; not inherently sequence-based; 1-100 bits of data per Ugi-derived molecule Regarding molecular computing; computing. Prior methods (DNA): Relies on hybridization interactions, optimized by evolution; solutions to several-destination Hamiltonian path and SAT problems (Adelman/Lipton); several-bit digital logic circuits based on strand displacement (Soloveichik/Bruck) See, Zielinski, Science (2017); Adelman, Scientific American (1998); Qian, Science (2011).

This EXAMPLE 4: Use 1-to-many reactions to perform highly parallel matrix algebra and pattern classification.

Synthesis; Multicomponent Reactions: This EXAMPLE 4 encodes the data in molecules produced via Ugi reactions, which are: high-yielding, combinatorial, soluble in reaction solvents (acetonitrile, methanol; water), with yield stable, nonpolar products, readily characterized by NMR and mass spectrometry, and amenable to tandem reactions, like peptides.

Liquid-phase robotic synthesis. Robotics enables scaling with minimal labor by performing multicomponent reactions in wells and using robotics to form desired mixtures (e.g., Labcyte Echo Liquid Handling System with a 384-well plate).

FT-ICR mass spectrometry. This EXAMPLE 4 relies on a Fourier-Transform Ion Cyclotron Resonance (FT-ICR) mass spectrometer for detection, which determines mass based upon Lorentz's Law: $F=qv \times B$. Mass resolution: $10^6$. Mass range: 100-10000 Da. Loading: $10^6$ to $10^7$ charges. Minimum number of ions for detection: ~100. ~$10^4$ to $10^5$ compounds per loading. See, e.g., Bruker Daltonics SolariX XR 7T FT-ICR, https://www.bruker.com/products/mass-spectrometry-and-separations/ftms/solarix/technical-details.html.

Mitigation of possible risks: (1) Use of heteroatoms to synthesize Ugi molecules to reduce a risk of too many isomers. (2) Smaller mixtures with non-mass dimensions to reduce a risk of too many isomers. (3) Direct storage of mixtures on MALDI plates to reduce risk from fluid handling speeds of 100 Mmb/day (the Labcyte Echo can handle >750,000 transfers/day). (4) Storage of pre-formed mixture libraries; parallel fluid transfers; specialized robotics to reduce risk from fluid handling speeds of 100 Mmb/day. (5) Careful preliminary studies of reaction networks; optical strategies, to reduce the risk of reaction-based computation.

Summary: This EXAMPLE 4 shows how to (1) store digital images, digital audio, and digital weather datasets in mixtures of synthetic small molecules; (2) synthesize data molecules by combinatorial multi-component Ugi reactions; (3) automate synthesis fluid handling will be automated with robotics and high density well plates; (4) use high-performance FT-ICR mass spectrometry for analysis; (5) use reactions targeting specific R-groups to compute on chemical datasets and build classifiers; and (6) optimize the data encoding, synthesis automation, and statistical analysis for error rates and time constraints using custom CAD software.

Example 5

Chemical CPUs: Chemical Computational Processing Via Ugi Reactions

Technical approach. The program goals of this EXAMPLE 5 are (1) to store abstract digital data by taking advantage of small molecule chemical diversity; (2) to develop leading-edge synthesis and analysis techniques that can scale to billions of molecules/day; and (3) to establish scalable strategies for solution-phase information processing using small-molecule reactions.

Regarding storage: This EXAMPLE 5 shows that we can store and detect kilobits of information in hundreds of Ugi compounds.

Regarding computation: This EXAMPLE 5 shows that we have developed a parallel molecular perceptron for image recognition.

Regarding theory. This EXAMPLE 5 shows that we have developed new molecular computing algorithms and analyzed chemical space (see Rose et al., "Computing with Chemicals: Perceptrons Using Mixtures of Small Molecules," in 2018 IEEE International Symposium on Information Theory (ISIT) (Vail, Colo., June 2018), pp. 2236-2240, doi: 10.1109/ISIT.2018.8437814 [EXAMPLE 1]; Arcadia, et al., "Parallelized linear classification with volumetric chemical perceptrons," in, Proceedings of the IEEE Conference on Rebooting Computing (ICRC) (2018) [EXAMPLE 2]:

$$w_i = \Theta^T U^T \gamma_i \qquad \text{[Equation L]}$$

Regarding multicomponent synthesis. Prior methods: Split pool synthesis of 2.18 million compounds (Schreiber group; see, Schreiber, Int. J. Mass. Spec. (2000)); sparse verification of 456 compounds (0.02%).

This EXAMPLE 5: Completed synthesis and characterization of 300 unique Ugi compounds using basic pipetting robot; roughly 1 kilobit of data; characterized nearly all compounds; established concept of using multicomponent reactions for chemical diversity. Continued improved scaling using advanced liquid handling robotics (Labcyte Echo).

Regarding mass spectrometry. Prior methods: Identification of >120,000 compounds in 12 hours (Marshall group); amortized 3 compounds/second.

This EXAMPLE 5: Completed measurements of hundreds of samples, up to 48 compounds in each mixture.

Regarding automation. This EXAMPLE 5: Performed CAD automation of synthesis; significant progress automating analysis of spectra; with improved reliability, repeatability, with 1000 steps/day with 200 nL resolution.

Prior methods (DNA): Stored 200 MB subdivided among DNA oligonucleotides (Strauss/Ceze/Seelig); millions of unique sequences of ~150 base pair polymers.

This EXAMPLE 5: Performed >1 Kbit of data In a diversity of small compounds.

Regarding computing. Prior methods (DNA): Relies on hybridization interactions, optimized by evolution; solutions to several-destination Hamiltonian path and SAT problems (Adelman/Lipton); several-bit digital logic circuits based on strand displacement (Soloveichik/Bruck) See, Zielinski, Science (2017); Adelman, Scientific American (1998); Qian, Science (2011).

This EXAMPLE 5: First to perform small molecule computing based upon volumes/concentrations; developing reaction-based computation; inherently parallel chemical computation; CAD-directed robotic liquid handling.

FT-ICR mass spectrometry. Two liquid-handling systems (Labcyte Echo 550 acoustic droplet liquid handler and Andrew Alliance 1000G pipetting robot) have been installed.

Optimized libraries of molecules for MS/LC detection; Currently growing the library.

Demonstration of Perceptron. The demonstration was show in the EXAMPLES above.

Mitigation of possible risks: (1) Use of heteroatoms to synthesize Ugi molecules to reduce a risk of too many isomers. Completed computational study of mass and non-mass dimension capacities. (2) Smaller mixtures with non-mass dimensions to reduce a risk of too many isomers. Completed computational study of mass and non-mass dimension capacities. (3) Direct storage of mixtures on MALDI plates to reduce risk from fluid handling speeds of 100 Mmb/day (the Labcyte Echo can handle >750,000 transfers/day). Engaged in discussions with supplier about direct transfers to MS, parallelization. (4) Storage of pre-formed mixture libraries; parallel fluid transfers; specialized robotics to reduce risk from fluid handling speeds of 100 Mmb/day. Used volume/concentration-based computing strategies. (5) Careful preliminary studies of reaction networks; optical strategies, to reduce the risk of reaction-based computation. Used volume/concentration-based computing strategies.

Molecular data storage concept. Using a library of M molecules, there are $2^M$ possible un-ordered mixtures. When we create N independent mixtures, there are $(2^M)^N$ possible states (unique data values). This implies $\log_2((2^M)^N)=M \times N$ bits of information, with the presence/absence of each molecule in each mixture representing one bit of data.

Arrayed MALDI mass spectrometry. One MALDI plate can contain individual library elements, data mixtures, intermediate compounds, and calibration standards.

Data mixture generation. When data[i, j]==1, then mixture j should include library compound i. The digital data is mapped onto chemical mixtures, and our software produces an automation script for the robotic liquid handler. Benefits: (1) natural error tolerance; (2) spreads data across multiple compounds and multiple mixtures; and (3) only local data scrambling (not global).

Mass spectrometry mixture analysis. We mapped a 640 bit dataset to N=14 mixtures using an M=48 compound library (a subset of "Library 2"). In the first of these mixtures (column 1), we wrote 22 ones and 26 zeros. Monoisotopic masses of the 22 expected present molecules were calculated. When present, these molecules will usually appear with multiple isotopes and ions. We have another list of 26 expected absent molecules. Using some very simple criteria, this EXAMPLE 5 is at 70-80% accuracy in the first datasets. Improved software and more detailed statistics are in progress.

Summary. In this EXAMPLE 5, we have synthesized three combinatorial Ugi libraries, with 102, 140, and 140 molecules, respectively. (Total: 382). We have written 2 different datasets, each 640 bits, into mixtures of Ugi compounds. (Total: 1.28 Kb). Each dataset was diluted, copied, and its mass spectrum measured multiple times. Simple metrics indicate 70-80% raw readout accuracy. More detailed statistical analyses and software tools are continuing. With the Echo liquid handler, we scale up storage capacities by 2-3 orders of magnitude.

Example 6

Theory of Information Storage in Molecular Mixtures

Foundations of Molecular Information Capacity. The invention provides a chemical perceptron, being the implementation of a perceptron in an artificial (simulated) chemistry. The invention provides a mathematical framework for quantifying chemical memory.

For more information, see Rosenstein et al, "Principles of Information Storage in Small-Molecule Mixtures" arXiv: 1905.02187 (May 6, 2019), incorporated by reference.

When more potential states are available to a given system, it becomes less likely that one particular state will be realized. The information capacity of a system accounts for (i) the number of possible states and (ii) the likelihood of confusing one state for another. When a chemical system has $\Omega$ identifiable states, then its information capacity (C, in bits) has an upper bound of:

$$C \leq \log_2 \Omega \qquad \text{[Equation M]}$$

Because each molecule can be defined only by its chemical identity, those skilled in the molecular computing art can quantify the amount of information represented in a chemical mixture by answering the three following questions:

(1) What is the set of unique molecules which could be present?
(2) Which of these unique molecules is present?
(3) How many copies of each unique molecule are present?

Compare to EXAMPLE 3, discussion of ""marbles". This formulation provides for the precise quantification of any type of molecular memory. This formulation is extensible to cases which include multiple rotational, vibrational, or electronic states of molecules within mixtures.

Ordered Polymers

Nucleic acids have four canonical bases, so the number of possible N-monomer strands is $M=4^N$. When only one of the M molecules may be present, then $\Omega=M$ and the identity of the molecule represents $2^N$ bits.

Similarly, proteins with N monomers drawn from an alphabet of 20 amino acids carry $\log_2 20^N \cong 4.3N$ bits. The information capacity of a single polymer molecule is therefore expressed as:

$$C \leq \log_2 M = N \log_2 B \qquad \text{[Equation N]}$$

where B is the number of different monomers.

Although information is often mapped independently onto substructures (monomers) within a molecule, it is the identity of the whole molecule that holds $\log_2 M$ bits. Those skilled in the molecular computing art understands that when one nucleotide in a nucleic acid polymer changes, the resulting nucleic acid polymer is a different molecule with different genetic information. This understanding is important for generalizing theories of information storage to more diverse non-polymeric molecules.

Unordered Molecular Mixtures. For an unordered mixture of up to Q molecules, when exactly Q molecules are drawn from a library of size M (with potential duplication), then the total number of possible combinations is (M+Q−1)/(M−1). Feller, An Introduction to Probability Theory and Its Applications (John Wiley and Sons, Inc, 1960). When between 0 and Q molecules are selected, then:

$$\Omega = \sum_{q=0}^{Q} \binom{M+Q-1}{M-1} = \frac{Q+1}{M}\binom{M+Q}{M-1} \qquad \text{[Equation O]}$$

The capacity of the system is, therefore:

$$C_1(M, Q) \leq \log_2\left[\frac{Q+1}{M}\binom{M+Q}{M-1}\right] \qquad \text{[Equation P]}$$

When there is no duplication among the Q selections, then:

$$\Omega = \sum_{q=0}^{Q} \binom{M}{q} \qquad \text{[Equation Q]}$$

so that the capacity is:

$$C_2(M, Q) \leq \log_a\left[\sum_{q=0}^{Q}\binom{M}{q}\right] \qquad \text{[Equation R]}$$

When all molecules may be present (Q=M) without duplication, this capacity becomes:

$$C_2(M, M) \leq \log_2\left[\sum_{q=0}^{M}\binom{M}{q}\right] = M\log_2 2 \quad \text{[Equation S]}$$

which is simply M bits.

Figure 19:
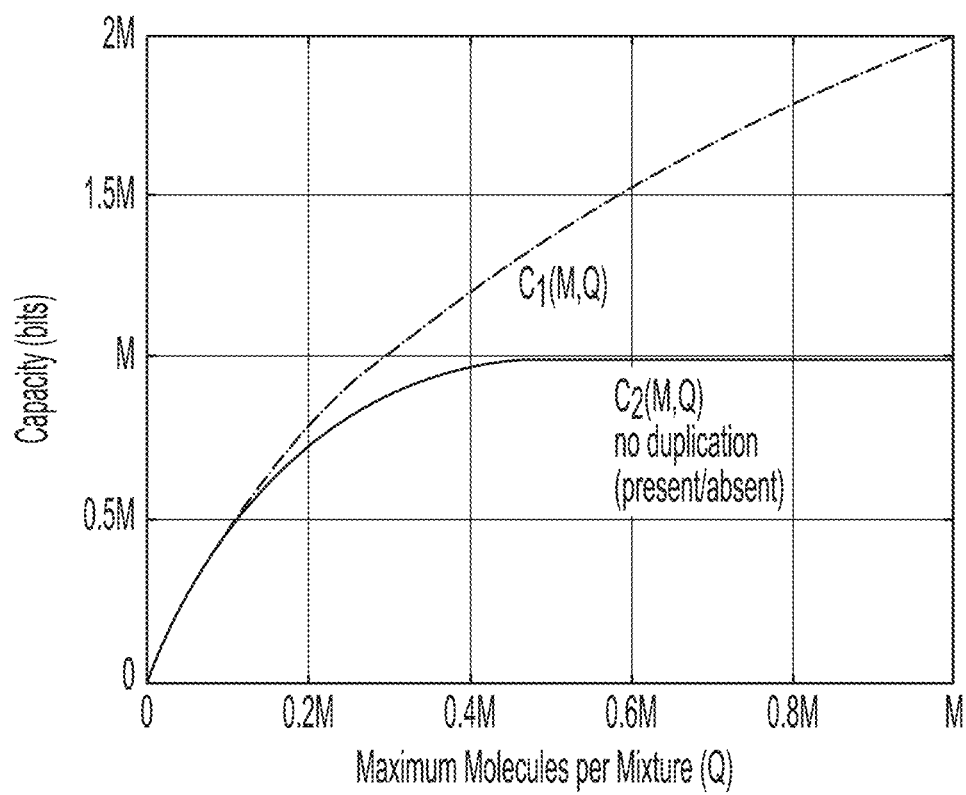
FIG. 19 is a chart showing the information capacity of a mixture as a function of the maximum number of molecules present (Q), from a library of M molecules. When duplication carries no information, the capacity asymptotically approaches $C_2 = M$ bits.

$C_1$ is the larger of these capacities and provides an upper bound on all memory schemes in unordered mixtures. Making use of $C_1$ requires that one knows the exact concentration (count) of each unique molecule. $C_2$ represents the reduced capacity when duplication carries no information, which is also equivalent to classifying each unique molecule as "absent" or "present" above some concentration threshold. Representative curves in FIG. 19 show that, without duplication, there are diminishing returns in information capacity as Q approaches M.

In practice, many copies of each unique molecule will likely be present in a mixture. Rather than counting molecules, one can specify that each of the M molecules may exist at one of L distinguishable concentrations. Thus, the capacity becomes:

$$C_3(M,L) \leq C_2(M,M) \times \log_2 L = M \log_2 L \quad \text{[Equation T]}$$

which reduces to [Equation S] when L=2.

[Equation T] also applies when there are L potential states of each of the M library molecules, which may include chemical modifications or electronic, vibrational, or rotational states. L is the number of states, not the number of dimensions. To reach this upper bound, each molecule's L states is independent. When the states only describe ensembles, the capacity multiplier will be less than $\log_2 L$.

Molecular Data Addressing. There are practical advantages to re-introducing ordering and hierarchy to correspond to concepts of 'addressing' within the data. The choice of chemical addressing scheme can affect information density, the total capacity, and possibilities for random access.

Spatial Addressing. Storing information across a set of independent chemical pools (such as in standard microwell plates) increases capacity linearly with the number of independent wells (W). Because the wells are physically separated, the same library of M potential molecules can be reused in each well. In the limit of very small Q, spatial addressing also describes existing chemical microarrays. Schena et al., Science 270(5235), 467-470 (October 1995); Schirwitz et al., Biointerphases, 7(1), 47 (2012). Also in the limit of very small Q, spatial addressing describes two-dimensional molecular memory. Green et al., Nature, 445: 414 (January 2007); Liu et al., Nature, 347:658, (October 1990).

Sparse Data Mixtures and Address-Payload Coding. Another concept involves the subdivision of M library molecules into groups of size S, and production of sparse mixtures which contain exactly one molecule from each subgroup. A mixture with sparsity S will thus contain M/S molecules. Because each molecule represents an exclusive choice among S possibilities, the total capacity is:

$$C_4(M,S) \leq (M/S)\log_2 S \quad \text{[Equation U]}$$

Figure 20A:
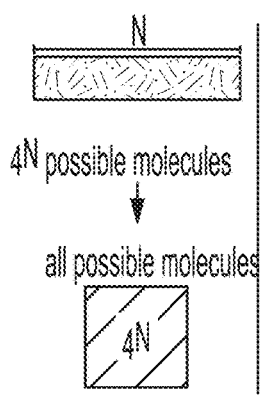
FIG. 20 is a pair of flow diagrams (a) and a chart (b). The flow diagrams in (a) show mixture sparsity and DNA address-payload representations in molecular datasets. By requiring that each mixture contains exactly one kind of molecule per address space (addressable location), one can balance the benefits of smaller data mixtures against a reduced total information capacity for a given library. Chart (b) shows that increasing mixture sparsity (S) produces mixtures with fewer molecules, and confers more in-formation per unique molecule present. The maximum total capacity corresponds to the densest mixtures because the information per molecule scales only logarithmically with the sparsity.
Figure 20A:
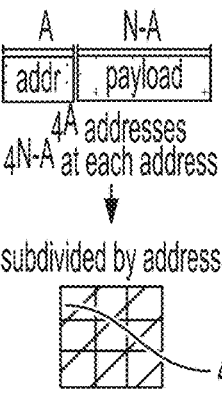

This $C_4$ is less than both C1 and C2. This sparse mixture is identical to an address-payload DNA data representation. Bornholt et al., A DNA-Based Archival Storage System. In Proceedings of the Twenty-First International Conference on Architectural Support for Programming Languages and Operating Systems, ASPLOS '16, pages 637-649 (New York, N.Y., USA, 2016). ACM. See, FIG. 20(a). By assigning A positions in the digital sequence as an 'address' and the remaining N-A positions as a 'payload,' the library of M=4N digital sequences has been subdivided using sparsity S=4N-A, and exactly one digital sequence is included from each of the 4A addresses. This approach has previously been shown to be a productive strategy given constraints on DNA synthesis length. Church, Gao & Kosuri, Science 337(6102), 1628 (September 2012); Organick et al., Nature Biotechnology, 36, 242 (February 2018).

Enforced sparsity reduces the number of valid mixture states (Ω), by disallowing mixtures which contain more than one molecule from the same address space. The information conveyed per molecule increases, but the overall mixture capacity is reduced.

Figure 20B:
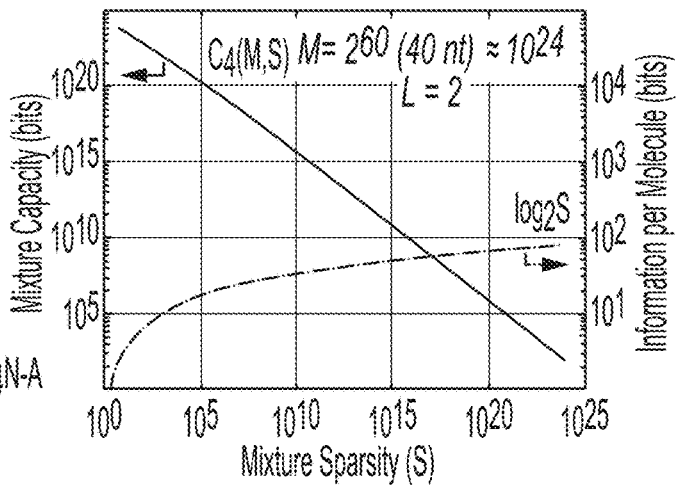

Capacity. As shown in FIG. 20(b), the maximum per-molecule information density occurs for maximum sparsity, but the maximum total mixture capacity is achieved with the minimum sparsity. The maximum mixture capacity is reached when each molecule represents only an address, with no payload.

Figure 21:
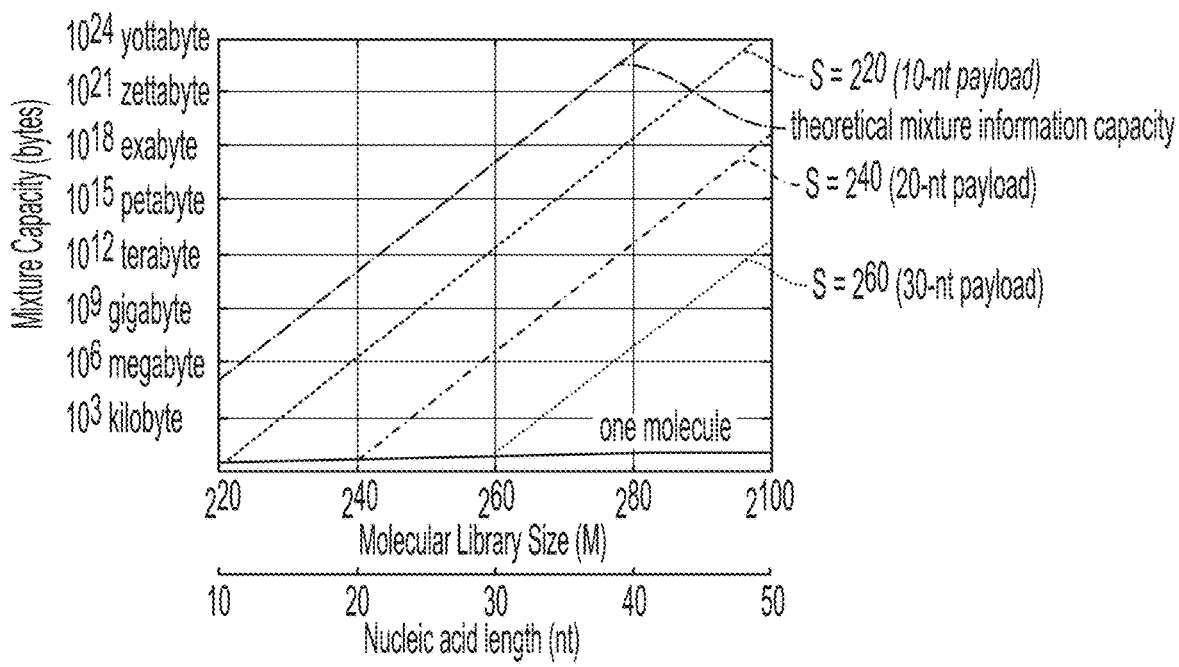
FIG. 21 is a chart showing the information capacity of molecular mixtures. Plotting the capacity for several different sparsities shows the potential of complex chemical mixtures for large-scale data storage. The capacity of one molecule scales logarithmically with the library size (M), while the capacity of a mixture scales linearly. Accordingly, all of the digitized information produced in the world each year could theoretically be stored in one unordered mixture of short 40-nt DNA molecules.

In theory, a library consisting of short DNA oligomers of length N=40 could theoretically be used to either select one molecule conveying 80 bits or to create one unordered molecular mixture which represents 151 zettabytes (151×$10^{21}$ bytes) of data, which is on the scale of all of the digital information produced in the entire world per year. See, FIG. 21. See also, Cisco, The Zettabyte Era: Trends and Analysis (2016); Zhirnov et al., Nature Materials, 15, 366 (March 2016). When only single copies of each molecule were present (or absent), this hypothetical data set would weigh only a few pounds.

Long DNA synthesis and long-read nucleotide sequencing are real bottlenecks for some biological applications. Jain et al., Nature Biotechnology, 36, 338 (January 2018); Kosuri & Church, Nature Methods 11(5), 499-507 (2014). By contrast, mixtures of short polymers can represent any fathomable amount of digital data.

Energy Constraints of Molecular Memory. Any implementation of molecular memory faces constraints in both synthesizing the library and creating the data mixtures. Given library size (M), mixture size (Q), and the number of independent mixtures (W), what constitutes an optimal design? Consider the costs of representing the same information in different configurations. For a mixture of polymers, where the marginal energy per monomer incorporation is ε, then W mixtures of Q unique molecules with length N would require a total energy of:

$$E = \varepsilon WQN \quad \text{[Equation V]}$$

Accordingly, [Equation U] becomes:

$$C \leq Q \log_2(M/S) = Q(\log_2 M - \log_2(M/S)) \quad \text{[Equation W]}$$

For very sparse mixtures (including single molecules), the second term is negligible. Substituting $M=B^N$, the energy per bit (Eb) becomes:

$$E_b = E/C \approx \varepsilon/(\log_2 B) \quad \text{[Equation X]}$$

Accordingly, for very sparse mixtures of polymers, there are energy benefits from increasing monomer diversity (B), although the scaling is sublinear. For dense binary mixtures (large Q), which may contain many unique compounds, [Equation X] indicates that C=M per well. In many datasets, one can also approximate Q≈M/2. Thus:

$$E_b = E/C \approx \varepsilon N/2 \quad \text{[Equation Y]}$$

This [Equation Y] implies that the optimal strategy is to produce mixtures using the simplest molecules (smallest N) capable of yielding mixtures with the desired capacity.

Across multiple dense mixtures, there will be many duplicated syntheses. When the entire library is synthesized ahead of time, the synthesis cost will be amortized, and the energy constraint may be better described by a physical mixing or fluid handling cost ($\gamma$):

$$M/2=\gamma C/2 \qquad \text{[Equation Z]}$$

Thus, the energy per bit is a constant:

$$E_b = E/C \approx \gamma N/2 \qquad \text{[Equation AA]}$$

This [Equation AA] reveals no clear opportunity for the optimization of writing dense molecular mixtures.

To minimize the sizes of both the pre-synthesized library and the array of mixtures, one can optimize for min(M+W) while maintaining C=MW. Geometrically this is a minimum perimeter problem, satisfied by:

$$W \approx M \approx \sqrt{C} \qquad \text{[Equation AB]}$$

This [Equation AB] indicates that, for dense mixtures, one optimum occurs when the data mixtures' spatial diversity and molecular diversity are similar. In summary, a library of M unique molecules can produce a binary mixture representing up to M bits of information. See, [Equation S]. Even among small organic molecules, there are potentially more than 1060 unique compounds. Bohacek et al., Medicinal Research Reviews 16(1), 3-50, (September 1996). Within this space, there will be many potential targets for gigabyte-scale small-molecule libraries.

Diversified Small-Molecule Memory. Combinatorial chemistries are regularly used in pharmaceutical pipelines to explore the space of potential drug candidates [21, 44]. One of the most scalable strategies for generating functional group diversity is using multicomponent reactions (MCRs). Malinakova, Reports in Organic Chemistry, pages 75-90 (2015). Multicomponent reactions which include the Hantzsch, Biginelli, Passerini, and Ugi reactions, are chemical transformations in which three or more reactants combine, mostly independent of the order in which they are added, to form a single, multicomponent product. Because there are hundreds to thousands of different commercially-available possibilities for each reactant, Multicomponent reactions can generate extremely large libraries.

The readout options in unexplored chemical spaces are not as mature as those for DNA, but a single unambiguous measurement of each molecule need not necessarily be present. The goal is to recover the encoded information, which can be designed to tolerate some chemical ambiguity and errors.

Figure 18:
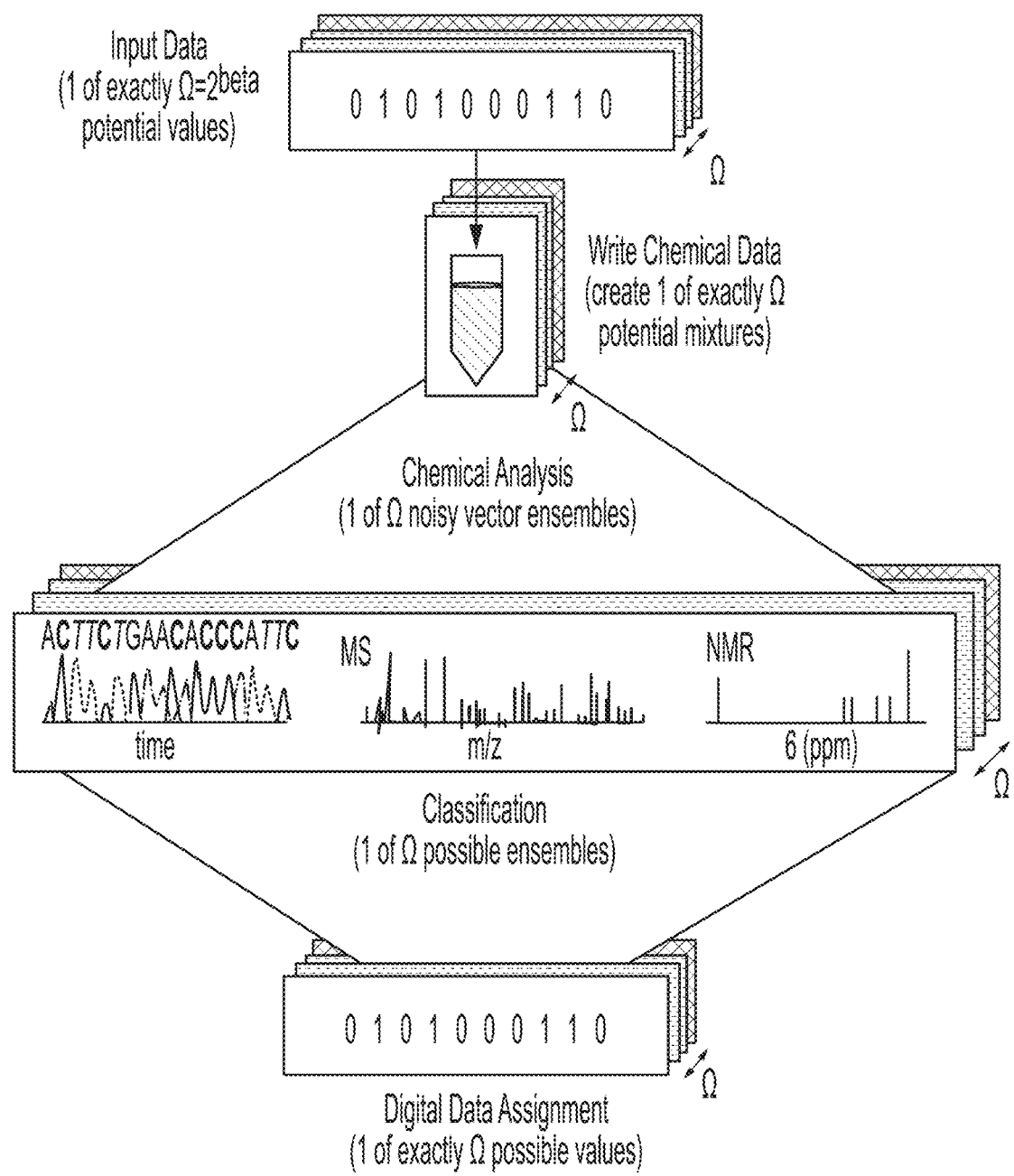
FIG. 18 is a flow diagram showing how information is coded into a mixture of molecules from a predetermined library of chemicals. Reading a chemical memory corresponds to classifying it as one of exactly $\Omega$ values. The shapes of the analysis vectors will be different from the shape of the data, but the number of possible states ($\Omega$) is finite and will be the same at every stage.

Reading Molecular Memories; Detection Signal Spaces. Depending on the chemical library, mass spectrometry, optical spectroscopy, NMR, or chromatography may all be leveraged to analyze molecular mixtures, and thereby read the data. The detection signal space is typically larger than the chemical mixture space, but the critical goal is to uniquely identify each of the C) potential mixtures, as shown in FIG. 18.

A one-to-one correspondence between detection signal space and the molecules in the library is not necessary. Users of the Oxford Nanopore platform have shown that chemical structure can be reliably decoded from extremely complex signals when the signals are repeatable and training datasets are available. Rang et al., Genome Biology, 19(1), 90, (2018). Statistical approaches which identify correlated variables and reduce dimensionality can be used to disambiguate signals from data mixtures of non-genomic compounds. Aeron et al., IEEE Transactions on Information Theory 56(10), 5111-5130 (2010).

Figure 22A:
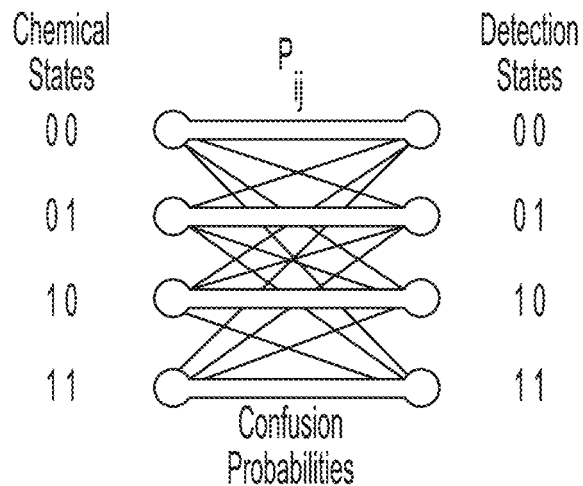
FIG. 22 is a pair of diagrams. Diagram (a) is an illustration of a detection confusion matrix, for M=2 and Ω=4. The confusion probabilities $P_{ij\ (i \neq j)}$ describe the likelihood of errors reading the chemical data, and reduce the effective information capacity. Diagram (b) shows an example of channel coding or error correcting codes (ECC) in molecular information systems. Diagram (b) demonstrates that reduced sets of valid codewords help to mitigate the effects of noise and errors in reading the chemical data.
Figure 22B:
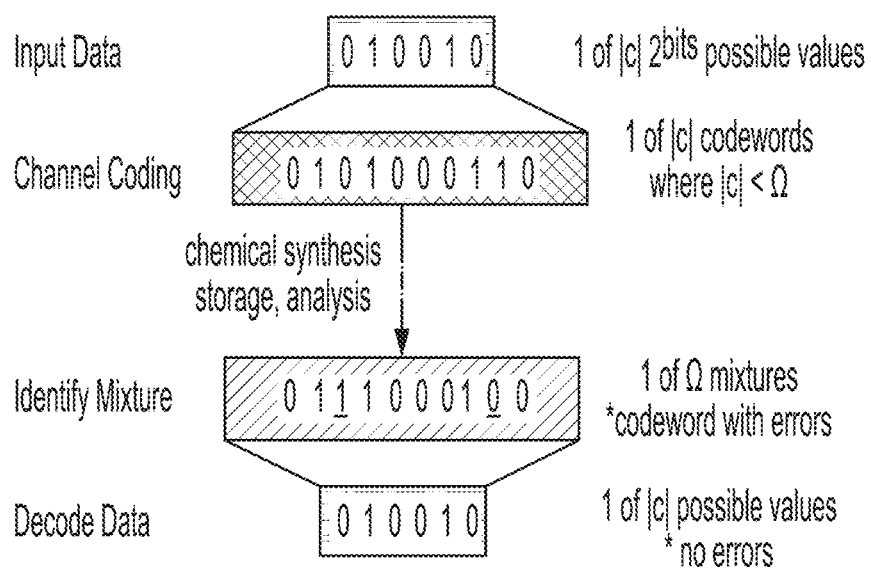

Capacity Under Detection Limits. Detection errors that mistake one mixture for another are likely to occur, but when these errors are probabilistic, then there are many ways to encode data so that retrieval is asymptotically error-free. Cover & Thomas, Elements of information theory. 2nd edition (Wiley, 2012); Polyanskiy et al., IEEE Transactions on Information Theory 56(5), 2307-2359 (2010). The upper limit for the capacity of a memory system can be described by its 'confusion matrix,' which quantifies the probabilities of mistaking one of the $\Omega$ mixtures for another. FIG. 22($a$) shows the confusion matrix for a library of M=2 molecules, which can form $\Omega$=4 possible mixtures. When $P_i \neq P_c$ and assume worst case equiprobable confusion ($P_{ij\,(i\neq j)}=1-P_c/\Omega-1$), then:

$$C'=\log_2 \Omega + P_c \log_2 P_c + (1-P_c)\log_2(1-P_c/\Omega-1) \qquad \text{[Equation AC]}$$

When there is never any confusion ($P_c=1$), the capacity reaches its maximum of $\log_2 \Omega$ bits. When $\Omega$ is large, one can approximate:

$$C' \approx P_c \log_2 \Omega - H_B(P_c) \qquad \text{[Equation AD]}$$

where $H_B(\cdot)$ is the binary entropy function. Cover & Thomas. Elements of information theory (Wiley, $2^{nd}$ edition, 2012).

Thus, the information capacity scales linearly with the probability of correctly identifying the mixture ($P_c$).

Channel Coding and Error Correction. From the capacity expression in [Equation AC], those skilled in the molecular computing art tolerate some errors in identifying mixtures while minimizing errors in the data assignments. It is well-known in the molecular computing art that by spreading data across digital sequences of binary inputs ('codewords') of length Nc, the probability of errors after decoding can be made vanishingly small when the number of valid codewords |c| satisfies:

$$(\log_2 |c|)/N_c < C' \qquad \text{[Equation AD]}$$

where C' is the capacity of the system (in bits) which incorporates expected error rates.

To encode 10 bits of information using a library of M=20 molecules, one can designate only |c|=210 binary mixtures as 'valid' out of the $\Omega$=220 mixtures which are possible. Because |c|<$\Omega$, channel coding can be thought of as another form of strategic sparsity, although it constrains the valid states in more sophisticated ways than limiting the number of molecules present. When analysis noise and errors result in an invalid mixture state, the decoder can classify it as the 'nearest' valid codeword, by some metric. This workflow is shown in FIG. 23($b$).

Successful DNA memory demonstrations have used Reed-Solomon codes and fountain codes, which are robust error correcting codes (ECC). Erlich & Zielinski, Science 355(6328), 950-954 (March 2017). Modern communications systems offer more practical methods for constructing near-capacity codes. Berrou et al., in, Proceedings of ICC '93 IEEE International Conference on Communications, vol. 2, pages 1064-1070 (May 1993). A recent system is "noise guessing," where a codebook is constructed with random binary codewords, and upon detection, a finite series of maximum likelihood noise sequences are applied to the channel output sequentially. Duffy et al., arXiv, (2) (2018) This new "channel-centric" method is both efficient and capacity-achieving in the limit of large $N_c$.

Example 7

Writing Synthetic Metabolomes I

The synthetic metabolome for this EXAMPLE is a diverse set of 36 components including vitamins, nucleosides, nucleotides, amino acids, sugars, and metabolic pathway intermediates. See TABLE IV, "SYNTHETIC METABOLOME LIBRARY."

Synthetic metabolome library List of compounds considered. The shown mass is the monoisotopic mass, as found on PubChem. Kim et al. Nucleic Acids Res. 44(D1):D1202-13 (Jan. 4, 2016) [PubMed PMID: 28400175]

| Key | Name | Description | CID | Mass |
|-----|------|-------------|-----|------|
| aa | cis-Aconitic acid | acid | 643757 | 174.016 |
| cm | Creatine monohydrate | ADP to ATP recycler | 80116 | 149.08 |
| es | Sodium ethyl sulfate | alcohol metabolite | 23680278 | 147.981 |
| gm | Glutamine | amino acid | 738 | 146.069 |
| mt | Methionine | amino acid | 6137 | 149.051 |
| hd | Histidine | amino acid | 6274 | 155.069 |
| pa | Pheylalanine | amino acid | 6140 | 165.079 |
| la | L-(+)-Arginine | amino acid | 6322 | 174.112 |
| ts | Tyrosine | amino acid | 6057 | 181.074 |
| tp | Tryptophan | amino acid | 6305 | 204.09 |
| ga | N-Acetyl-L-glutamic acid | arginine intermediate | 70914 | 189.064 |
| dr | D-(−)-Ribose | carbohydrate | 5311110 | 150.053 |
| ip | Imidazolepropionic acid | histidine metabolite | 70630 | 140.059 |
| pp | 4-Hydroxyphenylpyruvic acid | keto acid | 979 | 180.042 |
| ad | Adenosine 5'-diphosphate sodium | energy recycler | 6022 | 427.029 |
| gl | D-(+)-Galactose | monosaccharide | 6036 | 180.063 |
| td | Thymidine | nucleoside | 5789 | 242.09 |
| cd | Cytidine | nucleoside | 6175 | 243.086 |
| ud | Uridine | nucleoside | 6029 | 244.07 |
| da | 2'-Deoxyadenosine | nucleoside | 13730 | 251.102 |
| mu | 5-Methyluridine | nucleoside | 445408 | 258.085 |
| as | Adenosine | nucleoside | 60961 | 267.097 |
| dm | 2'-Dexoyguanosine hydrate | nucleoside | 9549172 | 269.112 |
| go | Guanosine | nucleoside | 6802 | 283.092 |
| gh | 2'-Deoxyguanosine hydrate | nucleoside | 16218597 | 285.107 |
| ct | Cytidine 5'-triphosphate NaCl | nucleoside | 16219171 | 526.948 |
| gp | D-Glucose 6-phospate sodium salt | pathway initiator | 23702133 | 282.012 |
| na | NADP Disodium | pathway initiator | 2734411 | 787.039 |
| dc | 2'-Deoxycytidine | pyrimidine metab. | 13711 | 227.091 |
| du | 2'-Dexoyuridine | pyrimidine metab. | 13712 | 228.075 |
| ds | Disodium succinate | salted acid | 9020 | 161.99 |
| sc | Trisodium Citrate Dihydrate | salted acide | 71474 | 293.994 |
| so | Sorbitol | sugar alcohol | 5780 | 185.079 |
| th | Thiamine hydrochloride | vitamin | 6202 | 336.058 |
| rf | Roboflavin | vitamin | 493570 | 376.138 |
| pq | Phylloquinone | vitamin | 5284607 | 450.35 |

Chemical Preparation. Reagent grade samples of 36 distinct metabolic compounds shown in TABLE IV were diluted in dimethyl sulfoxide (DMSO, anhydrous), each to a nominal concentration of 25 mM. Several metabolites were initially dissolved in a small fraction (up to <25%) of alternative solvent (de-ionized water with or without 0.5M or 1M hydrochloric acid) to facilitate solvation in DMSO. 10 µL of each compound was aliquoted into a 384-well low dead volume microplate from Labcyte Inc., San Jose, Calif., USA.

Figure 28:
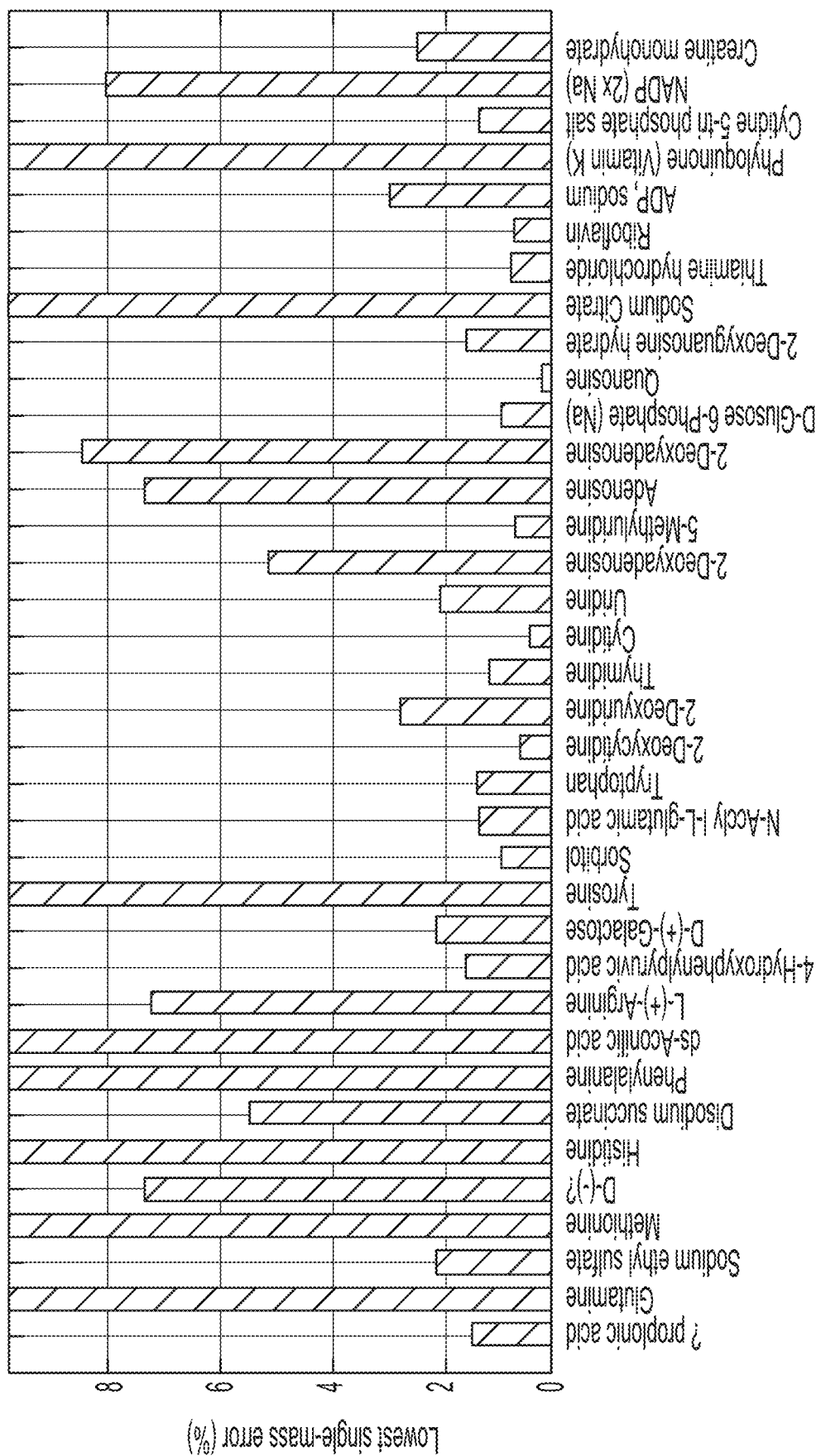
FIG. 28 is a histogram showing error rates for each component of the synthetic metabolome. The data is derived from a directly encoded 1400 spot plate, where each metabolite was patterned pseudo-randomly as present or absent (1400×36=50.4 kbits). Each spot contained a mixture of 3 present metabolites and 33 absent, and so the error rates shown consider a degree of mixture error due to metabolic conversion. 8/36 metabolites have single-best-peak error rates >10%, possibly due to poor uptake and solvation in DMSO. About half of the compounds yield error rates <2%.
Figure 29:
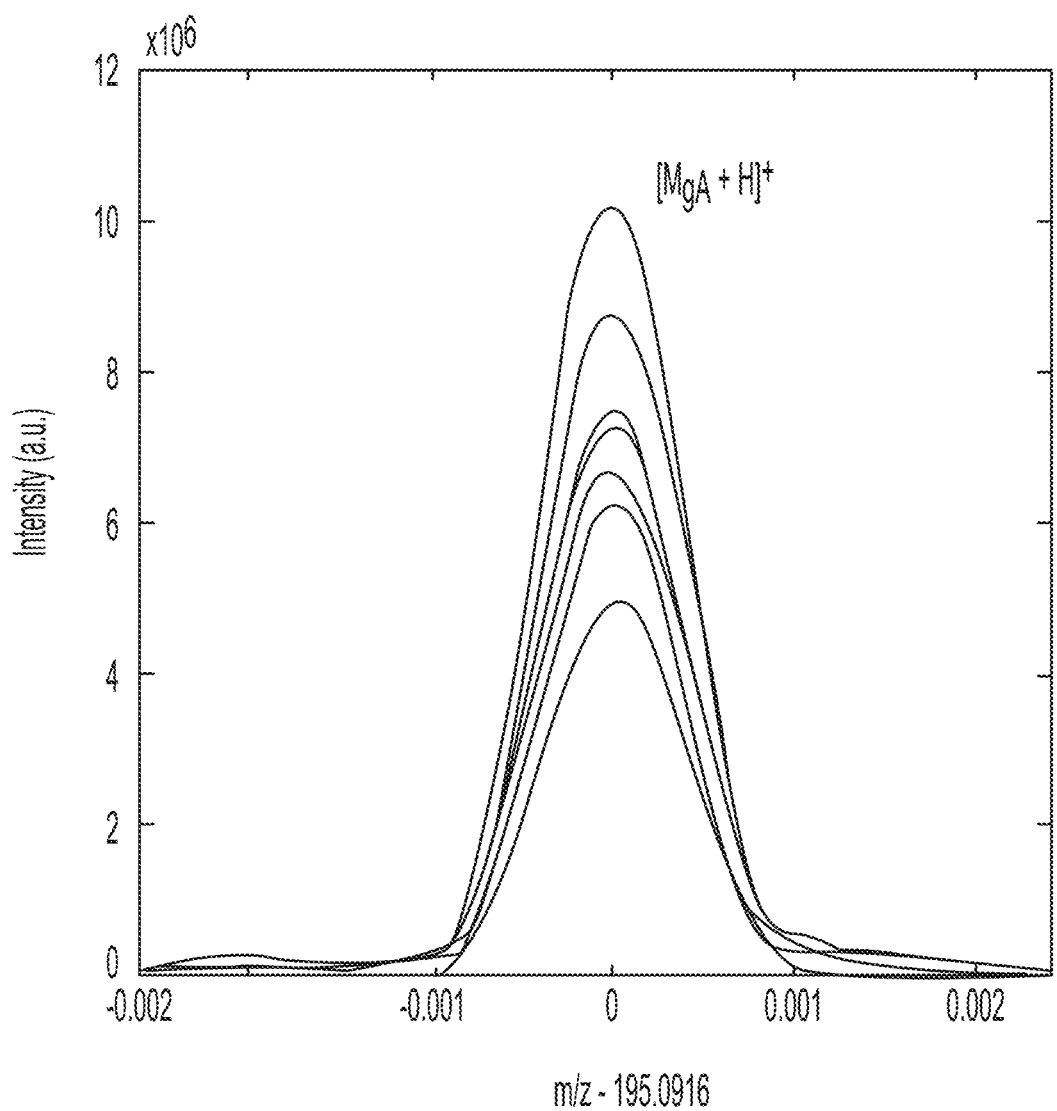
FIG. 29 is a graph showing spectral accuracy and mass discrimination power. Eight repetitions of MALDI mass spectral acquisition are shown centered at m/z=195.0916 (protonated 9-aminoacridine, 4× averaged t=1 s positive mode). Each repetition is from a unique deposition of 40 nL of 18.25 mM matrix in DMSO, air/vacuum dried. The entirety of the peak above background is captured within the spectral window range M±0.001 m/z, regardless of signal intensity.

The read accuracy of each metabolite was found from a 50.4 kbit data plate written using combinatorial mixtures of all 36 metabolites, See, FIG. 28.

Data Mixture Preparation. The inventors then proceeded to assay the spots using Matrix Assisted Laser Desorption Ionization (MALDI) mass spectrometry (MS).

The chemical mixtures were prepared on a 76×120 mm2 stainless steel MALDI plate. To write data with the synthetic metabolome, the inventors used an acoustic liquid handler (Echo 550, Labcyte) to transfer purified metabolic solutions in 2.5 nL increments from the library well-plate onto pre-defined locations on a steel MALDI plate. The nominal droplet transfer volume is 2.5 nL but to reduce variability we typically use two droplets (5 nL) per compound. The destinations of the droplets are programmed to match a standard 2.25 mm pitch 1536-spot (32×48) target. This produces a spatial array of different mixtures of metabolites. The presence (or absence) of each compound in each mixture encodes one bit of information, and thus the total data capacity of a data plate is equal to the size of the metabolome library multiplied by the number of spots on the plate.

After evaporating the solvent, each data plate contains up to 1536 dried spots on a 2.25 mm pitch. See, FIG. 23(b).

After spotting the compounds to the MALDI plate, a MALDI matrix material was added to each location. The inventors selected the matrix 9-Aminoacridine for its compatibility with metabolite libraries, its low background in the small molecule regime, and its support for both positive and negative ion modes. The MALDI plate, containing droplets with both matrix and metabolite mixtures, is left to dry and crystallize overnight (~10 hours).

Once dried, the plate can be stored in a humidity controlled cabinet or analyzed by MALDI-FT-ICR mass spectrometry.

Figure 27:
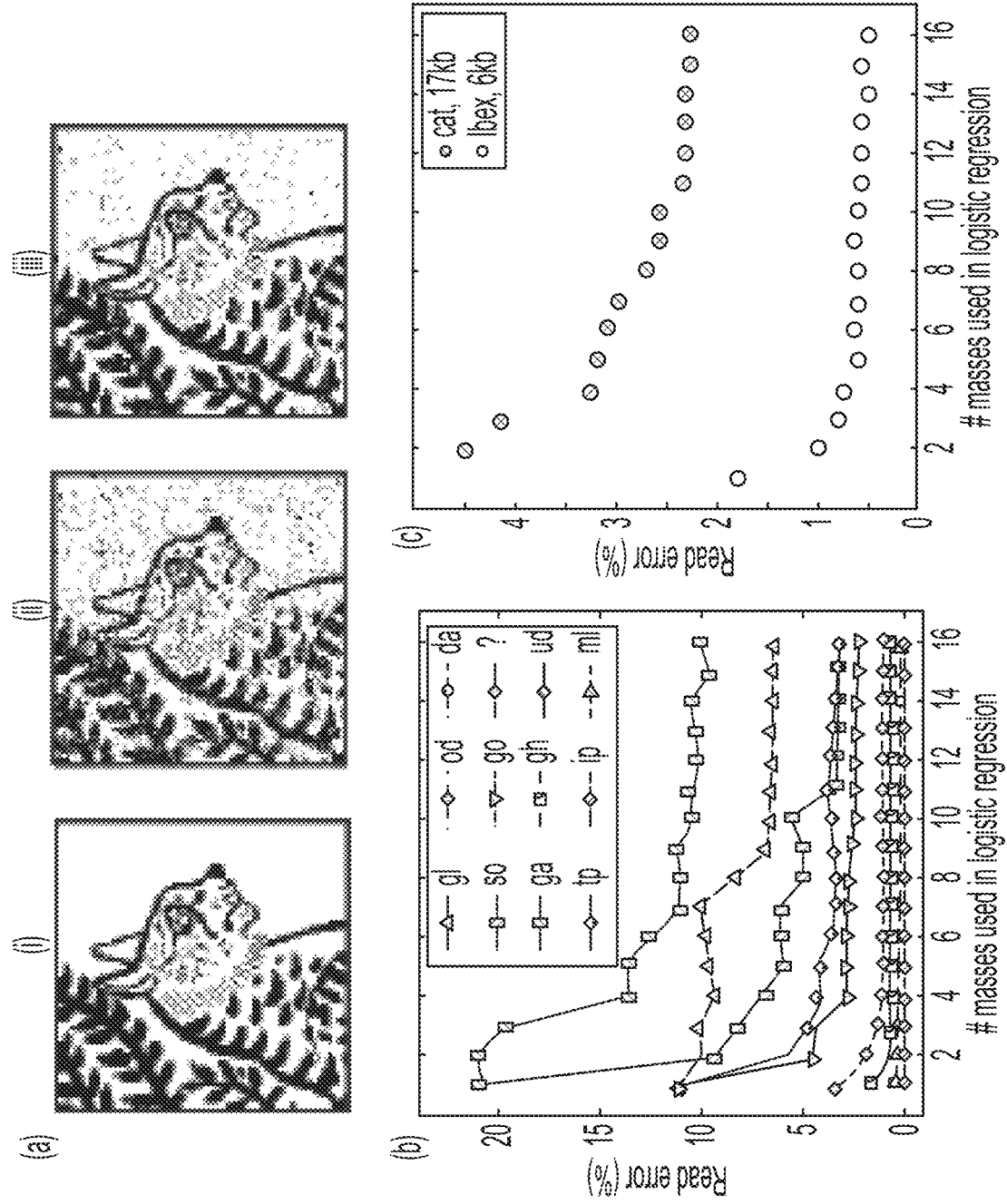
FIG. 27 is a set of images showing the process of logistic regression for multi-peak molecular data readout. Improvements over single-peak classification can be achieved with logistic regression utilizing multiple identifying masses per metabolite. For the cat images (a), image (i) shows 17,424-bit image written into 1452 mixtures from a 12-metabolite library. Cat image (ii) shows an image recovered using one discriminating mass per metabolite. Cat image (iii) show an image recovered using a regression combining 16 peaks per molecule. Chart (b) shows that some compounds achieve low error rates even with single peaks. Other molecules (e.g., sorbitol) do not have an isolated m/z peak that shows high accuracy by themselves. For these compounds, multi-peak logistic regression significantly improves classification. Chart (c) shows cumulative read error rates for the two images as a function of the number of masses used in the logistic regression. The 6,142-pixel ibex image improves from 98% to 99.5% accuracy, while the 17,424-pixel cat image improves from 95.5% to 97.7%.

To prescreen each compound in the synthetic metabolome, a 50.4 kbit data plate was written using combinatorial mixtures of all 36 metabolites. See, the chart in FIG. 27.

Figure 30:
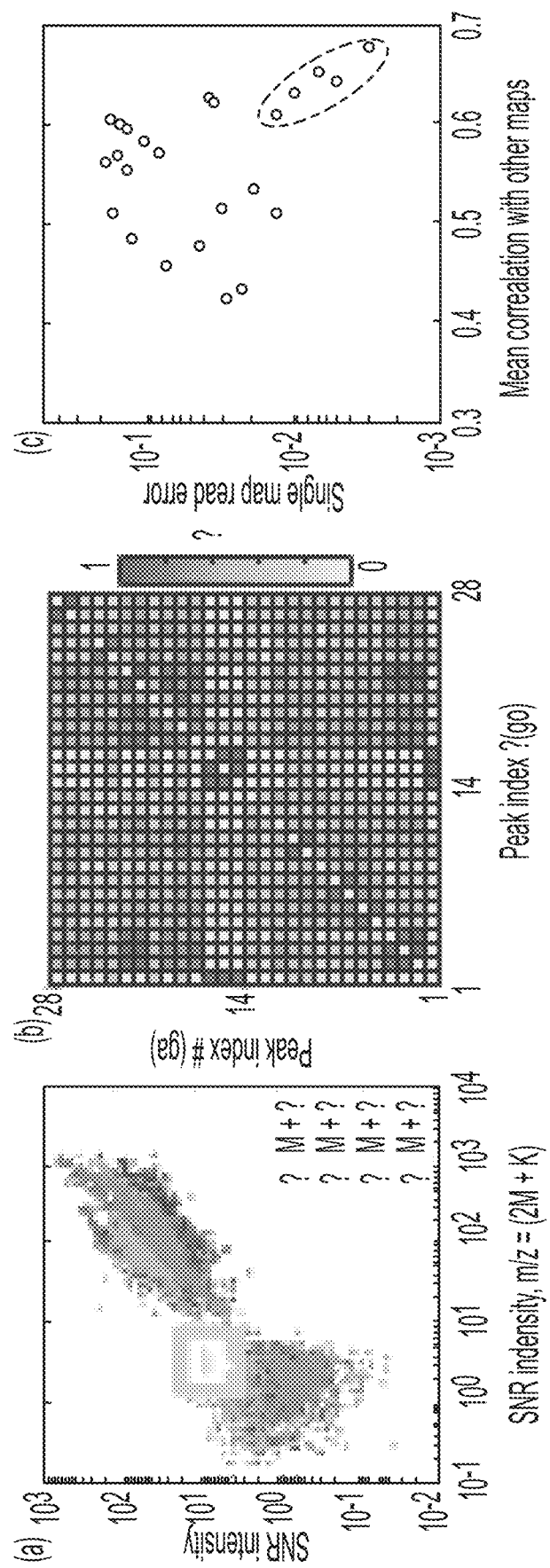
FIG. 30 is a set of images showing the justification of logistic regression from partially correlated errors. Plot (a) shows the SNR intensity of the [2M+K]+ peak of guanosine from 1024 locations is shown plotted against the SNR intensities of other ions for the same compound. SNRs clustered into present and absent states. Matrix (b) shows that each feature mass produces a list of SNRs across all locations. An autocorrelation map is shown for all guanosine feature mass lists correlated with each other. There are clustered groupings of highly correlated SNR lists, but correlations are imperfect. Plot (c) shows the read error for each feature mass is shown plotted against its mean correlation with other guanosine features. Masses which yield the lowest errors are typically more correlated (dotted ellipse).

Ion Cyclotron Mass Spectrometry of Metabolite Mixtures. The inventors used a Fourier-transform ion cyclotron resonance (FT-ICR) mass spectrometer (SolariX 7T, Bruker)

to assay the array of crystallized mixtures. An FT-ICR MS uses a strong magnetic field to excite ions into a periodic orbit, which enables a much finer mass resolution than time-of-flight (ToF) instruments. In these assays, the mass resolution was typically <0.001 Da. See FIG. 30.

Figures 25A, 25B, 25C:
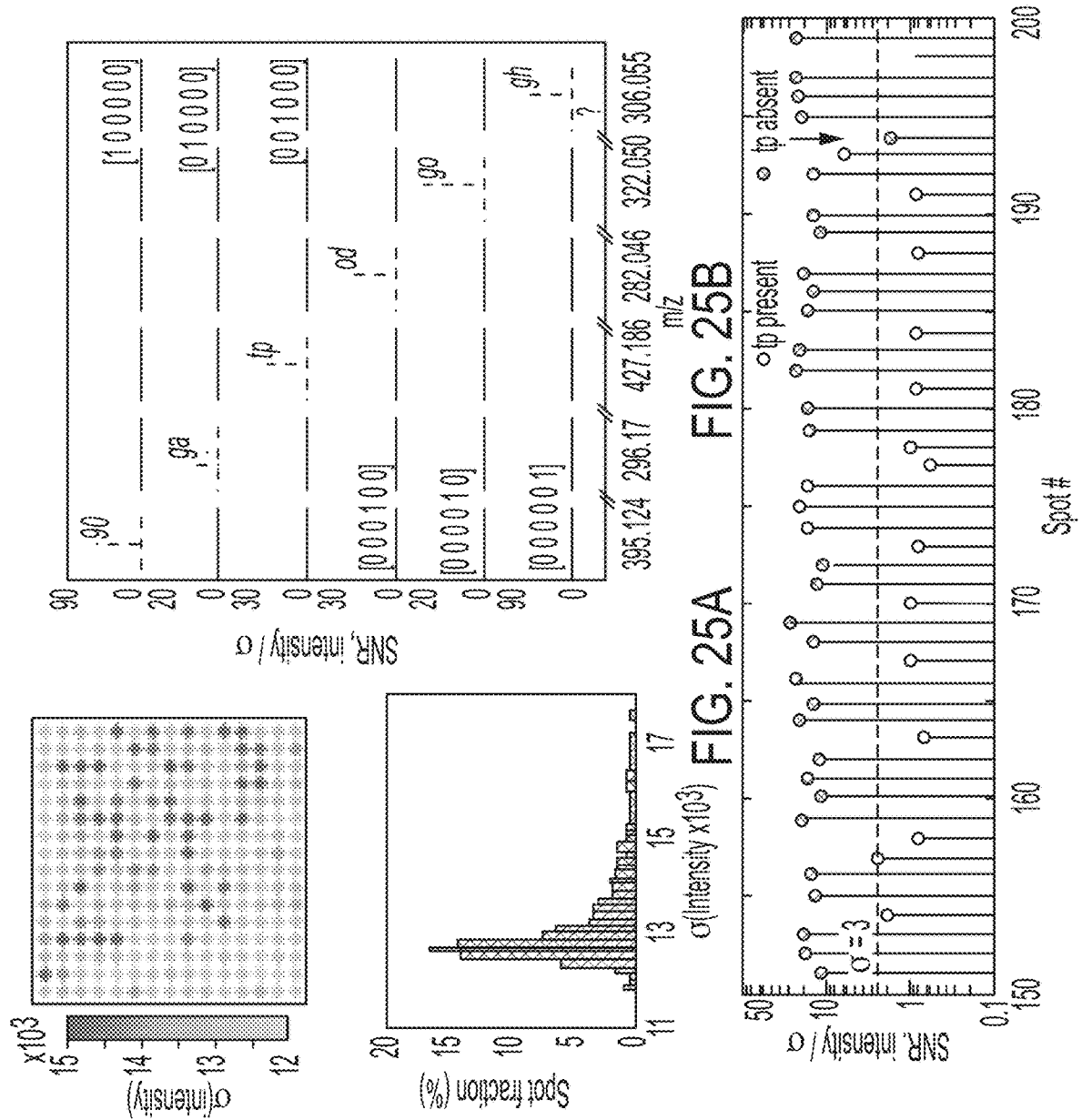
FIG. 25 shows the apparatus and method for spectral background and noise considerations. Matrix (a) shows a heatmap of the standard deviation of the MALDI-FT-ICR-MS spectral background noise from 240 different spots. Below in (a) is a histogram of the background intensity standard deviation. Chart (b) shows the spectra for six metabolites, normalized by the noise standard deviation. The m/z is cropped to six ranges of interest. Six one-hot mixtures are plotted, one for each metabolite. To assign presence/absence, the inventors choose an intensity threshold at an appropriate m/z. Chart (c) shows a 3a threshold applied to the $[2Mtp+K]^+$ tryptophan peak yielded a discrimination accuracy of 96%. Matrix (d) show a hit map of the same tryptophan peak illustrating recovery using the 3a threshold. Interestingly, the few errors are clustered at the edges of the plate.

FIG. 25(a) shows one positive-ion MALDI-FT-ICR mass spectrum for a spot that included a guanosine (go) and 9-aminoacridine (9A) matrix. Protonated matrix adducts are identified at peaks 1 and 6 (blue), along with several adducts of guanosine-labeled (2: Na, 3: K, 4: 2K-H and 5: isopropyl alcohol (IPA)+H). The mass intensities vary by adduct and species. In FIG. 25(a), the intensity of the first peak (protonated matrix at m/z=195.0916±0.001) is shown graphically across 1024 locations. The protonated matrix is identified in 1020 out of 1024 spots 99.6%). The signal-to-noise ratio of each peak is a complex function of the sample preparation, analyte, and adduct.

Example 8

Writing Synthetic Metabolomes II

The inventors have written more than 100 kbits of image data into synthetic metabolomes. See, TABLE V. This number is conservative.

A list of all image data sets written and read with number of repeats. Cumulatively, more than 100 kbits was written into synthetic metabolomes

| Description | bits | R/W repetitions | net kbits |
| --- | --- | --- | --- |
| RI Flag 1781 | 8,904 | 3× | 26.7 |
| Cat drawing | 17,424 | 4× | 69.7 |
| Ibex print | 6,142 | 2× | 12.3 |
| All image data | | | 108.7 |

Example 9

Mass Analysis of Data Plates

Figure 9:
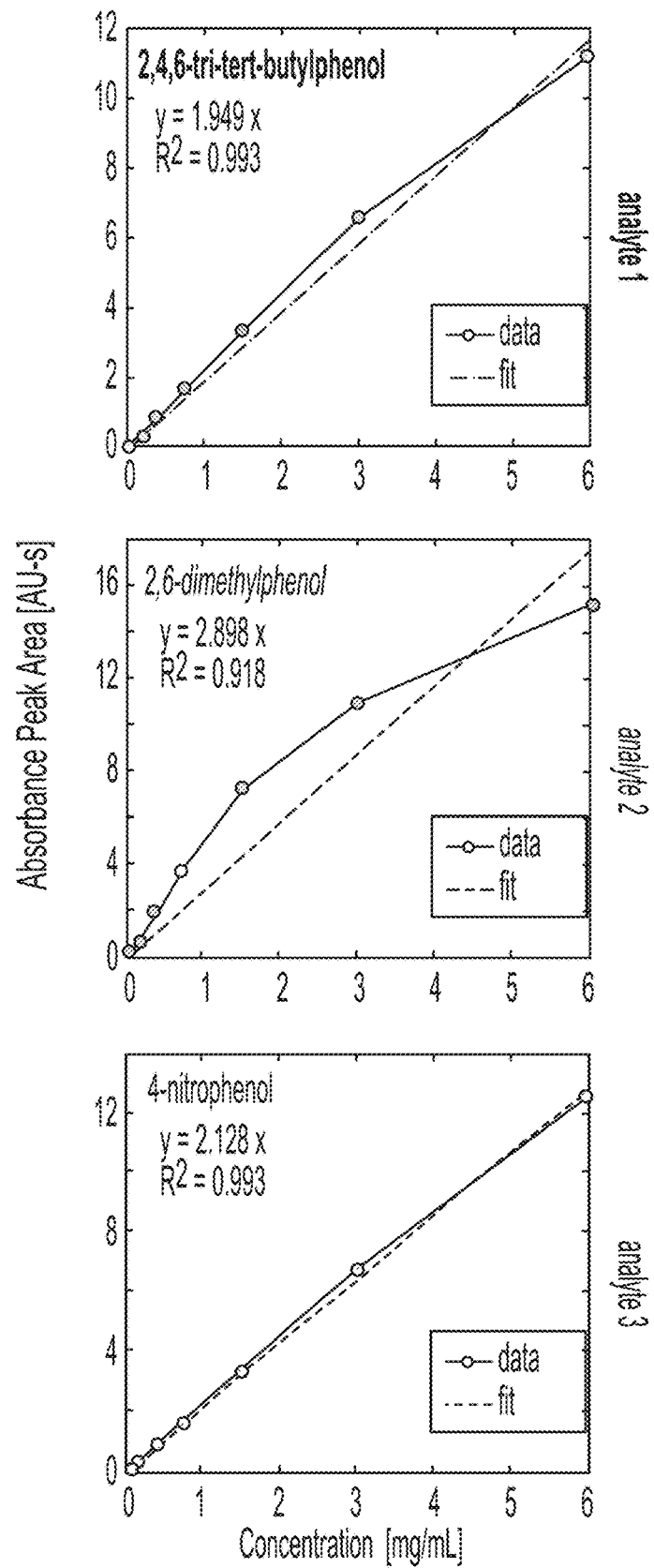
FIG. 9 shows three HPLC concentration calibration curves for the three analytes used in EXAMPLE 2. Using the known elution time of each compound, the area under the absorbance peak are measured and plotted for each analyte at various concentrations.

The inventors selected a subset of 6 metabolites, which were used to encode a 6142-pixel binary image of a Nubian ibex into an array 1024 mixtures. See, FIG. 9. After pseudo-randomly reshuffling bits, to spread the distribution of possible errors, the inventors mapped the data onto the presence or absence of six compounds: sorbitol (so), glutamic acid (ga), tryptophan (tp), cytidine (cd), guanosine (go) and 2-deoxyguanosine hydrate (gh). The plate was written and then assayed using FT-ICR MS.

A Fourier-transform ion cyclotron resonance (FT-ICR) mass spectrometer (SolariX 7T, Bruker) was used to analyze the crystallized metabolite data mixtures. The exact resolution is a function of the measurement time allocated per spectrum. For these experiments, we typically used 0.5-1 sec, yielding a resolution of <0.001 Da (see supplemental figure S2). The instrument is run in MALDI mode (laser power ~22%) and is configured to serially measure the mass spectrum of each mixture on the 48×32 grid. Acquisition for a full plate takes <2 hours.

FIG. 25(a) shows a spatial map and histogram of the spectral background noise observed in 240 independent spots. Spectral noise varies as a result of crystallization differences and small positioning errors. Before further analysis, the inventors divided each spectrum by its a, which provides a more direct comparison of signal strength at multiple locations. The peaks of interest after normalization for the six metabolites are shown in FIG. 25(b). The first row is a spot whose data contains the six bits [1 0 0 0 0 0]. So, only the m/z peak associated with the first metabolite, sorbitol, is present. Similarly, five other 'one-hit' patterns are shown that can be decoded without error.

To decode the mass spectra into binary data, the inventors chose a threshold of 3a as the intensity required to declare the presence of a metabolite. For the tryptophan [2Mtp+K]+ mass shown in FIG. 25(c), this threshold yields a 96% correct classification.

Figure 25D:
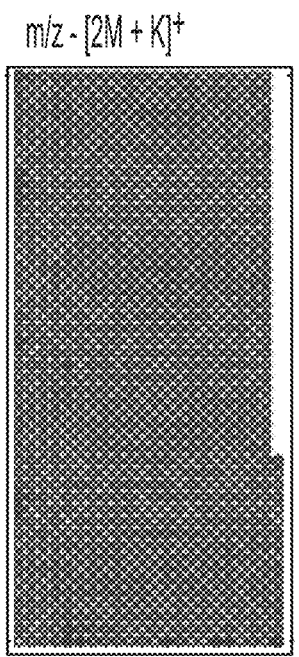

This detection scheme can also be visualized by position on the plate, as shown in FIG. 25(d). The clustering of errors at the edges of the plate suggests that small misalignments between the MALDI laser positions and the droplet spotting locations were a source of error.

Statistical Analysis of Data Plates. The analysis in FIG. 25(d) shows that there are masses which can statistically identify the metabolite contents. In practice, one compound will be associated with multiple peaks, of varying signal-to-noise ratios and usefulness. For a given metabolome, those skilled in the molecular computing art attempt to identify which m/z peaks are most appropriate to identify each library element.

Each high-resolution FT-ICR mass spectrum contains $\sim 2 \times 10^6$ m/z points. By calculating the ensemble average of all mass spectra from the entire plate, the inventors restricted our search to peaks present in this ensemble spectrum (as averaging over spots with exactly the contents), which yields 1444 candidate peaks.

Those skilled in the molecular computing art can test each of these candidate peaks against the encoded dataset, to determine how accurately its intensity predicts the encoded data. See, FIG. 9(a).

Although the inventors identified these peaks without chemical bias, many features can be attributed to known adducts. FIG. 9(b) shows a histogram of the associated adduct masses. Adduct masses were calculated by automated subtraction of integer multiples of the monoisotopic mass of each metabolite from its identifying peak masses. H, Na, Na—H and K adducts are all frequently observed.

FIG. 9(c) shows the number of peaks achieving detection accuracy in the range of 70-100%. Except for sorbitol, there are at least ten peaks that identify each metabolite with >97% accuracy. Selecting the best performing peak for each metabolite, and applying a detection threshold of 2.5a, was sufficient to recover data at about 2% cumulative read/write error. See, FIG. 9(e). FIG. 9(f)-(g) shows the corresponding input and output data images are shown in FIG. 4f-g. The simplicity and success of this analysis are encouraging.

Example 10

Decoding Data from Multiple Peaks Using Logistic Regression

Figure 26:
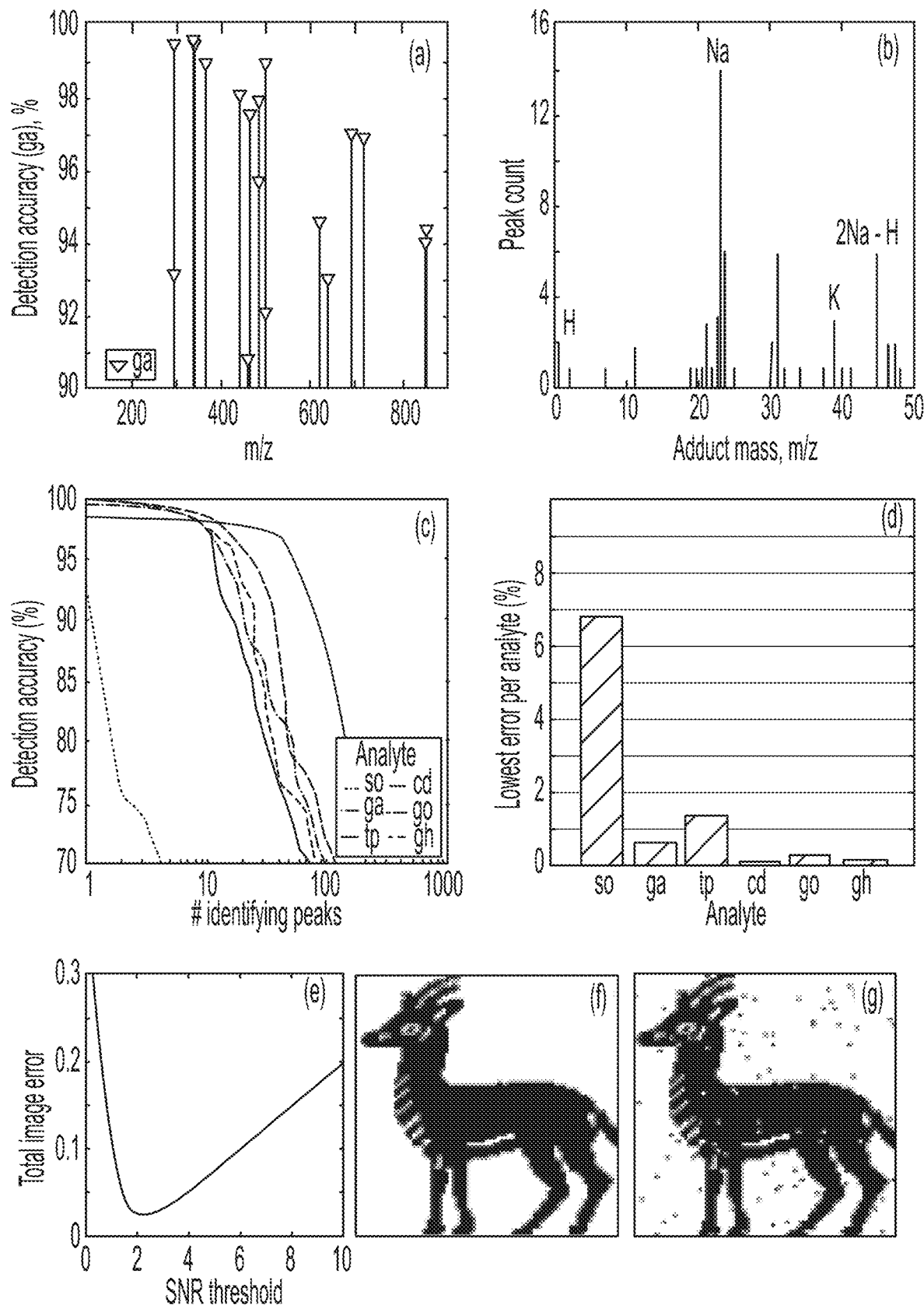
FIG. 26 is a set of images showing the process of identifying discriminating peaks. Chart (a) shows the fraction of correct presence/absence detections over 1024 locations See, glutamic acid (ga). At least 19 separate glutamic acid-affiliated masses were each found to yield a detection error of <10%. Chart (b) is a histogram of the adducts associated with peaks which accurately identify the six metabolites from FIG. 25. After m/z peaks were ranked by accuracy, adducts were found by subtraction of integer multiples of the monoisotopic mass of each metabolite. This statistical metric often automatically finds H, Na, Na—H and K adducts. For each metabolite, the inventors plot the number of peaks achieving a given detection accuracy. Chart (c) shows that, except for sorbitol, each metabolite has at least 10 identifying peaks with >97% accuracy. Chart (d) shows the error of the single best performing peak for each metabolite. Chart (e) shows, using only the best performing mass from chart (d), the error rate for the six metabolites across 1024 locations (6144 bits) as a function of the SNR cutoff. These mixtures encoded the 6142-bit ibex image shown in image (f). Image (g), shows the ibex image that the inventors recovered the with a 2.5a decision threshold, producing approximately 2% cumulative read/write error.

Although multiple m/z features yield similar decoding accuracy, only one peak was selected per metabolite. By assuming that the errors are not correlated (see FIG. 30), the inventors improved the method of the invention by using multiple m/z peaks per metabolite. Using techniques similar to those for the 6 kb ibex image in FIG. 26, these peaks were encoded a 17,424-bit image of a cat using 1,452 spots containing data mixtures from a 12-metabolite library. See, FIG. 27(a). MALDI-MS analysis of the plate took approximately 90 minutes. The inventors used this data to extend the decoding scheme to incorporate multiple m/z features.

After identifying the set of statistically discriminating peaks, the inventors performed a logistic regression using between 1 and 16 of the best-performing peaks. Those metabolites whose single-mass classification began at >99% showed minimal improvements with increasing numbers of features. Sorbitol (so) error rates fell more significantly from 20% to 4% with multi-peak regression. See, FIG. 27(b).

Figure 24A:
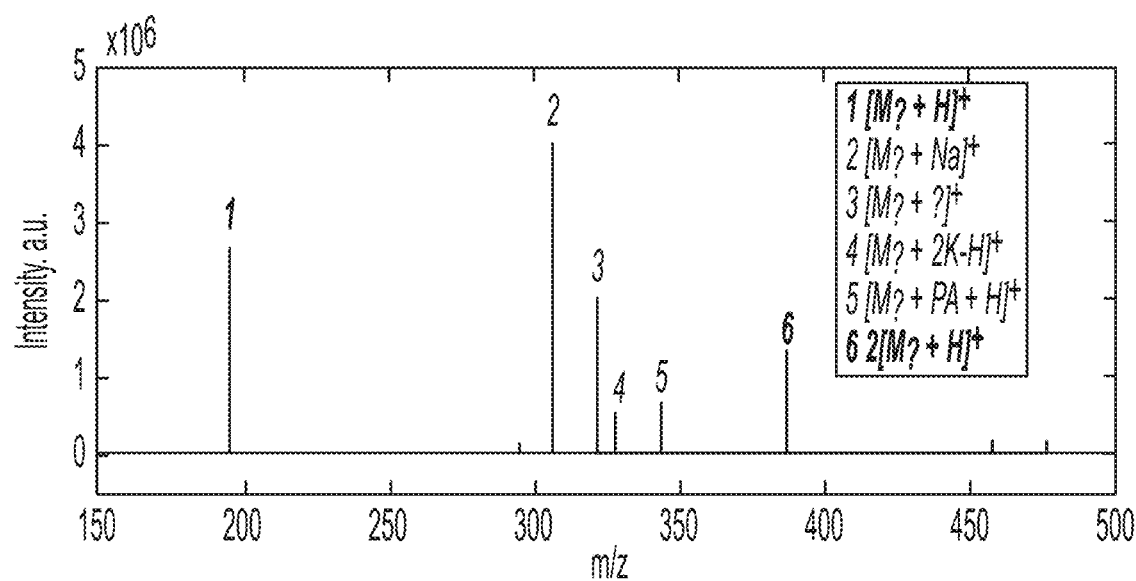
FIG. 24 shows the process of assaying chemical data plates using mass spectrometry. Chart (a) shows a positive mode MALDI-FT-ICR mass spectrum of one spot containing guanosine (go) and 9-aminoacridine (9A) as the matrix compound. Automated analysis of each spot used 4× averaging of 1-second acquisitions. Guanosine ions (2, 3, 4, 5, in red) are present, along with two protonated matrix peaks (1, 6, in blue). Matrix (b) graphically shows the intensity of the protonated matrix (peak 1) at m/z=195.0916±0.001 for a MALDI plate with 1024 independent mixture spots. Protonated aminoacridine is positively identified in 1020 spots (99.6%).
Figure 24B:
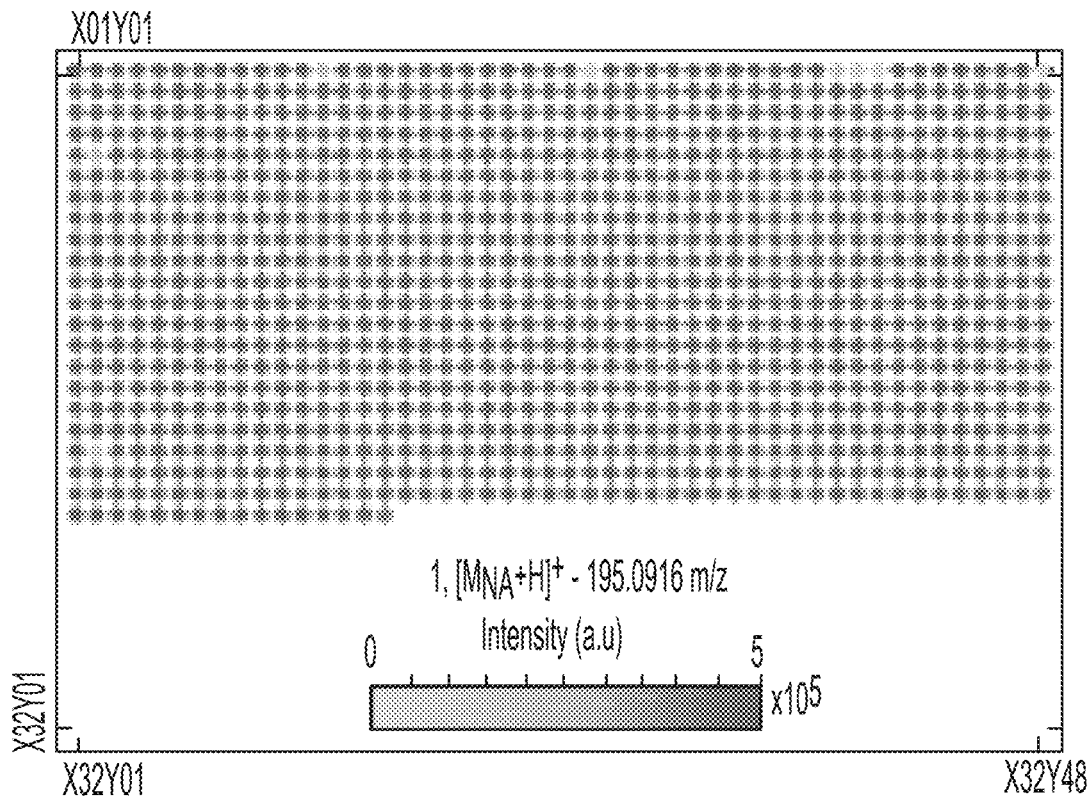

Multi-mass linear regression achieved an accuracy of 97.7% for the whole cat image. See, FIG. 27(c). Cumulative read error rates for the data in FIG. 24 and FIG. 25 are shown as a function of the number of masses used in the logistic regression. An overall error rate <0.5% was achievable from the ibex data set using 16-peak logistic regression.

The inventors presented several kilobyte-scale data sets encoded into synthetic metabolomes using robotic liquid handling, followed by recovery of the data by mass spectrometry. Statistically discriminating m/z features were used to classify the metabolite mixtures and recover the data at 98-99.5% accuracy. Typical write speeds were 5 bits/sec, and aggregate read speeds were 11 bits/sec.

The inventors performed assays where the cumulative concentration of all metabolites was typically 25 mM per spot. When a similar concentration is spread across the whole human metabolome (125,000 elements, with half present on average), then each metabolite is present at 0.4 µM concentration.

The method of the invention can be performed by assaying with MALDI mass spectroscopy. Sub-zeptomole mass spectrometry and nanomolar concentration detection have been available for nearly two decades. Belov et al., Anal. Chem. 72(10), 2271-2279 (2000); Tang et al., J. Bact. 189, 940-949 (2007). Therefore, µM detection of a whole metabolome can be demonstrated, and typical whole metabolome profiling identifies on the order of 10,000 ion peaks. Lu, Annu. Rev. Biochem. 86, 277{304 (2017).

Due consideration of interconversion of metabolites in the analysis will, therefore, reduce errors.

Other Embodiments

The contents of all references cited herein are incorporated by reference in their entireties. In case of conflict, the present application, including any definitions herein, will control.

Having thus described in detail preferred embodiments of the present invention, other embodiments will be evident to those skilled in the molecular computing art. The foregoing detailed description is illustrative and not restrictive. The spirit and scope of the present invention are not limited to the above examples but are encompassed by the following claims.

We claim:

1. A method for computing with chemicals, the method comprising the steps of:
    (a) encoding an abstract digital data into a plurality of liquid volumes of a plurality of chemicals to obtain a dataset;
    (b) translating the dataset into a chemical form;
    (c) creating the data set using spectrometry, spectroscopy, or a combination of both assay methods;
    (d) querying the dataset by performing a volumetric operation to obtain a perceptron; and
    (e) analyzing the perceptron for identifying chemical structure, concentration, or another characteristic of at least one of the chemicals,
    thereby developing a chemical computational language.

2. The method of claim 1, wherein the abstract digital data comprises a binary computer language.

3. The method of claim 1, wherein translating further comprises assembling a library of chemicals in the dataset.

4. The method of claim 1, wherein volumetric operation is performed robotically.

5. The method of claim 1, wherein volumetric operation further comprises a programmed standard volumetric transfer.

6. The method of claim 1 wherein, the plurality of liquid volumes of the plurality of chemicals are a mixture of different chemical molecules.

7. The method of claim 6, wherein the abstract digital data comprises presence or absence of chemical molecules in the mixture.

8. The method of claim 1, wherein spectrometry comprises mass spectrometry.

9. The method of claim 1, wherein spectroscopy comprises at least one of:
    ultraviolet-visible spectroscopy, Rydberg spectroscopy, Infrared spectroscopy, fluorescence spectroscopy, and absorption spectroscopy.

10. A method for computing with chemicals, the method comprising the steps of:
    (a) encoding digital data into a plurality of chemicals to obtain a dataset and
    (b) translating the dataset into a chemical form;
    (c) reading the data set using spectrometry and/or spectroscopy and querying the dataset by performing an operation to obtain a perceptron; and
    (d) analyzing the perceptron for identifying chemical structure, concentration, or another characteristic of at least one of the chemicals,
    thereby developing a chemical computational language.

11. The method of claim 10, wherein the operation further comprises at least one of a volumetric transfer or a chemical reaction.

12. The method of claim 11, further comprising the step of measuring a rate constant and/or an equilibrium constant of the chemical reaction.

13. The method of claim 11, wherein the chemical reaction further comprises an Ugi reaction to obtain at least one Ugi product molecule.

14. The method of claim 11, wherein reacting further comprises substituting the reaction groups.

15. The method of claim 10, further comprising the step of synthesizing a new chemical.

16. The method of claim 10, wherein digital data comprises a computer language.

17. The method of claim 10, wherein the plurality of chemicals further comprises a plurality of liquid volumes.

18. The method of claim 10, wherein the plurality of chemicals are a mixture of different chemical molecules.

19. The method of claim 18, wherein the digital data comprises presence or absence of chemical molecules in the mixture.

20. The method of claim 10, wherein spectrometry comprises mass spectrometry.

21. The method of claim 10, wherein spectroscopy comprises at least one of:
    ultraviolet-visible spectroscopy, Rydberg spectroscopy, Infrared spectroscopy, fluorescence spectroscopy, and absorption spectroscopy.

22. The method of claim 10, wherein the plurality of chemicals comprise reaction groups.

23. The method of claim 10, wherein reacting further comprises changing pH of at least one of the plurality of chemicals.

* * * * *